(12) United States Patent
Fujisawa et al.

(10) Patent No.: US 7,181,179 B2
(45) Date of Patent: Feb. 20, 2007

(54) HAND-HELD ELECTRONIC DEVICE

(75) Inventors: Teruhiko Fujisawa, Shiojiri (JP); Hiroyuki Chihara, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 600 days.

(21) Appl. No.: 10/048,441

(22) PCT Filed: May 30, 2001

(86) PCT No.: PCT/JP01/04539

§ 371 (c)(1),
(2), (4) Date: Jan. 29, 2002

(87) PCT Pub. No.: WO01/92970

PCT Pub. Date: Dec. 6, 2001

(65) Prior Publication Data

US 2002/0107054 A1   Aug. 8, 2002

(30) Foreign Application Priority Data

May 30, 2000  (JP)  ............................. 2000-161282
Jun. 15, 2000  (JP)  ............................. 2000-180381

(51) Int. Cl.
    *H04B 1/00*  (2006.01)
(52) U.S. Cl. .................. 455/129; 127/550.1; 127/418; 127/419; 127/420; 127/572; 127/90.3
(58) Field of Classification Search ............. 455/550.1, 455/556.1, 558, 566, 572, 573, 575.6, 90.1, 455/90.3, 95, 100, 41.1, 41.2; 235/380, 951; 340/5.1, 10.34
See application file for complete search history.

(56) References Cited

U.S. PATENT DOCUMENTS 5,235,563 A     8/1993  Ganter et al. .................. 368/47
5,354,975 A *  10/1994  Ishibashi et al. ............. 235/380
5,440,300 A *   8/1995  Spillman, Jr. ............. 340/10.34
5,473,145 A    12/1995  Wallerstorfer et al. ...... 235/382
5,970,393 A *  10/1999  Khorrami et al. ........... 455/129
6,489,883 B1 * 12/2002  Iiyama et al. ................ 340/5.1
6,703,920 B2 *  3/2004  Zimmer .................. 340/10.34
6,786,407 B1 *  9/2004  Takasugi .................... 235/451
2002/0094829 A1*  7/2002  Ritter ......................... 455/517
2003/0189483 A1* 10/2003  Saitoh et al. .............. 340/10.1

(Continued)

FOREIGN PATENT DOCUMENTS

DE    195 31 625    3/1996

(Continued)

*Primary Examiner*—Temica Beamer
*Assistant Examiner*—Joy Contee

(57) ABSTRACT

A hand-held electronic device comprises an IC-card chip unit, a watch CPU, a power source unit, a display unit, and a switch connected between the power source unit and the IC-card chip unit. The watch CPU has a power supply controlling unit. The IC-card chip unit performs contactless data communication with an external transmitter-receiver in close range. The watch CPU operates on power from the power source unit, receives data from the IC-card chip unit to display the data on the display unit or to process the data before displaying them on the display unit. The power supply controlling unit closes a switch at least during the period of time that the watch CPU receives data from the IC-card chip unit, thereby causing power to be supplied from the power source unit to the IC-card chip unit.

97 Claims, 27 Drawing Sheets

U.S. PATENT DOCUMENTS

2005/0178845 A1 * 8/2005 Desfontaines et al. ...... 235/492

FOREIGN PATENT DOCUMENTS

| | | |
|---|---|---|
| DE | 196 13 491 A1 | 10/1997 |
| EP | 0 875 851 | 11/1998 |
| GB | 2 180 677 | 4/1987 |
| GB | 2 292 866 | 3/1996 |
| JP | 1-137388 | 5/1989 |
| JP | 2-300886 | 12/1990 |
| JP | 4-190480 | 7/1992 |
| JP | 4241082 | 8/1992 |
| JP | 5-59557 | 8/1993 |
| JP | 5-87173 | 11/1993 |
| JP | 08-167014 | 6/1996 |
| JP | 8-167014 | 6/1996 |
| JP | 09-311920 | 12/1997 |
| JP | 9-311920 | 12/1997 |
| JP | 10-154215 | 6/1998 |
| JP | 10-206560 | 8/1998 |
| JP | 10302028 | 11/1998 |
| JP | 11-064554 | 3/1999 |
| JP | 11-101976 | 4/1999 |
| JP | 11-184999 | 7/1999 |
| JP | 11345292 | 12/1999 |
| JP | 2000-286761 | 10/2000 |
| JP | 2001-006007 | 1/2001 |
| WO | WO 97/29448 | 8/1997 |

* cited by examiner

HAND-HELD ELECTRONIC DEVICE

TECHNICAL FIELD

The present invention relates to a hand-held electronic device such as watches and portable phones.

BACKGROUND ART

Magnetic cards are known as an information recording medium for recording various information. Although those magnetic cards can be manufactured cheaply, they are not capable of recording a large amount of information. There has also been a problem that security protection is difficult to ensure in the magnetic cards. In order to solve these problems, IC cards have been developed and spread in recent years, and those IC cards are capable of storing a large amount of information and the security protection is easy to ensure.

Of such IC cards, contactless IC cards are excellent in its functionality for performing high speed data exchanges only by bringing an IC card close to a reader/writer. Further, the contactless IC cards offer an advantage of not requiring maintenance. Thus, it is desired that the contactless IC cards be applied to various purposes such as train tickets, commutation tickets, and ski lift cards.

Because this type of contactless IC cards are not capable of displaying the contents of data on a standalone basis, confirming remaining value information and history information stored in an IC card requires an external data reading and displaying device for reading and displaying these information. This is because conventional contactless IC cards are made to operate on power derived from received signal from an external device, and, with such weak power, it is hard to operate a displaying device provided in the IC cards for displaying remaining values and the like.

However, it has caused inconvenience for users that, when a user utilizes contactless IC cards as electronic money of small amount or train ride tickets, the user cannot confirm the amount used and remaining value if a data reading and displaying device is not available close by.

Additionally, there are problems of having a small communication range and being vulnerable to noise because conventional contactless IC cards cannot obtain a large amount of power, being driven by rectifying the power of received signal.

DISCLOSURE OF INVENTION

The present invention aims at providing a hand-held electronic device that can be used in the same way as conventional contactless ID cards without loss of portability, the device being capable of displaying data contents.

In order to achieve such an object, the present invention provides a hand-held electronic device comprising a contactless communication unit for performing contactless data communication with an external transmitter-receiver; a power source; a display unit; an information processing unit which operates on power from said power source, for receiving data from the contactless communication unit to display the data on the display unit or process the data before displaying them on the display unit; and a power supply controlling unit for causing the power source to supply power to the contactless communication unit at least during the period of time that the information processing unit receives data from the contactless communication unit.

The hand-held electronic device enables the use of contactless IC cards in the same way as the conventional contactless IC cards without loss of portability as well as the displaying of data contents acquired through contactless data communication with the external transmitter-receiver on the spot, thereby enhancing operability for users.

In one preferred embodiment, the hand-held electronic device further comprises a switch inserted between the power source and the contactless communication unit, and the power supply controlling unit closes the switch, thereby causing the power source to supply power to the contactless communication unit. The switch is, for example, a transistor. Further, the contactless communication unit includes an antenna and a high-frequency circuit connected thereto. The contactless communication unit has a clock generating unit for generating clock from carrier received from the external transmitter-receiver and receives data from the external transmitter-receiver by the clock.

In another preferred embodiment, the hand-held electronic device further comprises a power voltage generating circuit for generating power voltage from signal received from the external transmitter-receiver through contactless communication unit to supply the generated power voltage to a circuit in the contactless communication unit. The power voltage generating circuit includes, for example, a rectifier circuit for rectifying receive signal to generate power voltage.

The contactless communication unit may comprise a non-volatile memory. In this embodiment, the contactless communication unit writes acquired data by the contactless data communication to the non-volatile memory or updates data in the non-volatile memory through the contactless data communication. The information processing unit receives data read from the non-volatile memory from the contactless communication unit.

In another preferred embodiment, the contactless communication unit may further comprises a non-volatile memory and a power voltage generating circuit for generating power voltage from receive signal. In this embodiment, the contactless communication unit, when it locates within the communication range of the external transmitter-receiver, performs contactless data communication utilizing power voltage generated by the power voltage generating circuit, and writes in the non-volatile memory acquired data through the contactless data communication or updates data in the non-volatile memory through the contactless data communication. The information processing unit receives data read from the non-volatile memory from the contactless communication unit.

In another preferred embodiment, the hand-held electronic device comprises a carrier detecting unit for detecting carrier transmitted from the external transmitter-receiver. In this embodiment, when carrier is being detected by the carrier detecting unit, the contactless communication unit performs contactless data communication with the external transmitter-receiver, and when carrier is not being detected by the carrier detecting unit, the information processing unit receives data from the contactless communication unit.

It is preferable to configure the carrier detecting unit so as to operate on power from the power source.

In another preferred embodiment, the contactless communication unit further comprises a carrier detecting unit for detecting carrier transmitted from the external transmitter-receiver, a non-volatile memory, and a power voltage generating circuit for generating power voltage from signal received from the external transmitter-receiver to supply the generated power voltage to a circuit in the contactless communication unit including the non-volatile memory. In this embodiment, the contactless communication unit, when carrier is being detected by the carrier detecting unit, performs the contactless data communication utilizing generated power voltage by the power voltage generating circuit; and writes into the non-volatile memory data acquired by said contactless data communication or updates data in the non-volatile memory through the contactless data communication. The information processing unit, when carrier is not being detected by the carrier detecting unit, receives from the contactless communication unit data read from the non-volatile memory.

In one preferred embodiment, when it changes from a state where carrier is being detected by the carrier detecting unit to a state where carrier is not being detected by the carrier detecting unit, with this as a trigger, data transfer from the contactless communication unit to the information processing unit is initiated.

In another preferred embodiment, the hand-held electronic device comprises a carrier detecting unit for detecting carrier transmitted from the external transmitter-receiver, and, when carrier is being detected from the carrier detecting unit, the contactless communication unit performs contactless data communication with the external transmitter-receiver and the information processing unit receives data from the contactless communication unit.

It is possible to configure the hand-held electronic device so that the power is supplied from the power source to the contactless communication unit and that data are transferred from the contactless communication unit to the information processing unit according to operation to an operational member.

In another preferred embodiment, the power supply controlling unit, when data signal is transmitted from the contactless communication unit to the external transmitter-receiver, causes the power source to supply power to the contactless communication unit.

This embodiment enables the utilization of power supplied from the power source when transmitting data signal to the external transmitter-receiver, which increases the transmission power or the degree of modulation, thereby enabling the reliable transmission of data signal to a more remote location.

In one preferred embodiment, the information processing unit, upon receiving data from the contactless communication unit, displays the data or results obtained by processing the data on the display unit.

The information processing unit, when the termination of a display operation is instructed by the operator, may terminate the display operation. This embodiment enables a user to timely confirm results of the contactless data communication with the external transmitter-receiver.

Further, the information processing unit may terminate the display operation after maintaining the display operation for a predetermined period of time. The display operation is automatically terminated according to this embodiment, thereby minimizing power consumption. In this case, it is also possible to immediately terminate the display operation when the termination of the display operation is instructed by operation to the operational member.

Further, following the termination of the display operation, it is possible to resume the display operation when the start of the display is instructed by operation to the operational member.

This embodiment enables a user to display results of the contactless data communication anytime for confirmation.

The information processing unit, when it does not display data received from the contactless communication unit or results obtained by processing the data on the display unit, may display other information on the display unit.

This embodiment enables the display unit to be used for purposes other than confirming results of the contactless data communication, thereby making the hand-held electronic device more useful.

In one preferred embodiment, the information processing unit has a timekeeping unit for performing timekeeping operations to generate time information. In this embodiment, when the received data from the contactless communication unit or the results obtained by processing the data are not displayed, the information processing unit displays the time information obtained from the timekeeping unit.

In one preferred embodiment, the hand-held electronic device comprises a timekeeping unit for performing timekeeping operations to generate time information and an analog hand display unit for automatically driving analog hands based on the time information to perform time display operations.

In this case, the display unit may be configured by transparent liquid crystal display element positioned in front of the analog hands. A user is able to visually identify the analog hands through the transparent liquid crystal display element. Alternatively, the display unit may be configured by a transparent organic electroluminescence light emitting element positioned in rear of the analog hands.

The analog hand display unit includes a driving motor which stepwisely drives the analog hands. In one preferred embodiment, the hand-held electronic device comprises a motor drive prohibiting unit which inhibits the supply of driving signal to the driving motor, during the period of time that the contactless communication unit is performing contactless data communication with the external transmitter-receiver.

In such an embodiment, the motor is not driven during the contactless data communication, thereby preventing noise from occurring, the noise adversely affecting the contactless data communication.

In one preferred embodiment, the hand-held electronic device comprises a display prohibiting unit for suspending a display operation of the display unit.

In such a hand-held electronic device, no display operation is performed during the period of time that the contactless communication is being performed, thereby protecting the contactless data communication from noise that occur along with display operations.

In one preferred embodiment, the display prohibiting unit detects that radio communication start signal is received from the external transmitter-receiver by the contactless communication unit, thereby detecting the start of the contactless data communication. Further, the display prohibiting unit resumes the display operation of the display unit when acquired data by the contactless data communication are written into the memory, alternatively when data in the memory have been updated through the contactless data communication.

The hand-held electronic device may be provided with a controller for causing the contactless data communication to be divided into multiple times and performed intermittently. In this case, the display prohibiting unit causes a display operation of the display unit to be suspended when the contactless data communication are initiated or resumed, and the operation to be resumed when the contactless data communication is suspended or terminated.

A hand-held electronic device sometimes has a lighting unit which is placed on front or back side of the display unit, for lighting the display unit. In such an embodiment, it is preferable to provide a light prohibiting unit for prohibiting the lighting unit to perform lighting operations during the period of the contactless data communication.

The hand-held electronic device provided by the present invention has, for example, the shape of a wristwatch that can be mounted on the arm of a user. The power source is, for example, a battery.

The present invention further provides a hand-held electronic device comprising a contactless communication unit for performing contactless data communication with an external transmitter-receiver; a carrier detecting unit for detecting carrier transmitted from the external transmitter-receiver; a power source; a power supply controlling unit for causing the power source to supply power to the contactless communication unit during the period of time that carrier is being detected by the carrier detecting unit; an information processing unit which operates on power from the power source, for receiving data obtained from the contactless communication unit through the contactless data communication within the period of time that carrier is being detected by the carrier detecting unit to display the data on the display unit, or to process the data before displaying them on the display unit.

Using such a hand-held electronic device, even if the contactless communication unit has no circuit for generating power voltage, power from the power source is supplied to the contactless communication unit during the period of time that carrier is being detected, thereby performing data transmission from the contactless communication unit to the information processing unit during the contactless data communication with the external transmitter-receiver.

Furthermore, the present invention provides a radio device for watches comprising a casing detachable from a watch and radio communication means, provided with the casing, for performing data exchanges with an external radio device through radio communication.

Using such a radio device for watches, a user can easily add a contactless IC card function to his own watch.

The present invention can be carried out not only in such embodiments as to produce the hand-held electronic device with respect to the present invention for sale, but also in such embodiments as to record a program for controlling the hand-held electronic device in a recording medium for distribution or to distribute the program through a telecommunication line for distribution.

BEST MODE OF CARRYING OUT THE INVENTION

[1] First Embodiment
[1.1] Summary of Configuration

Figure 1:
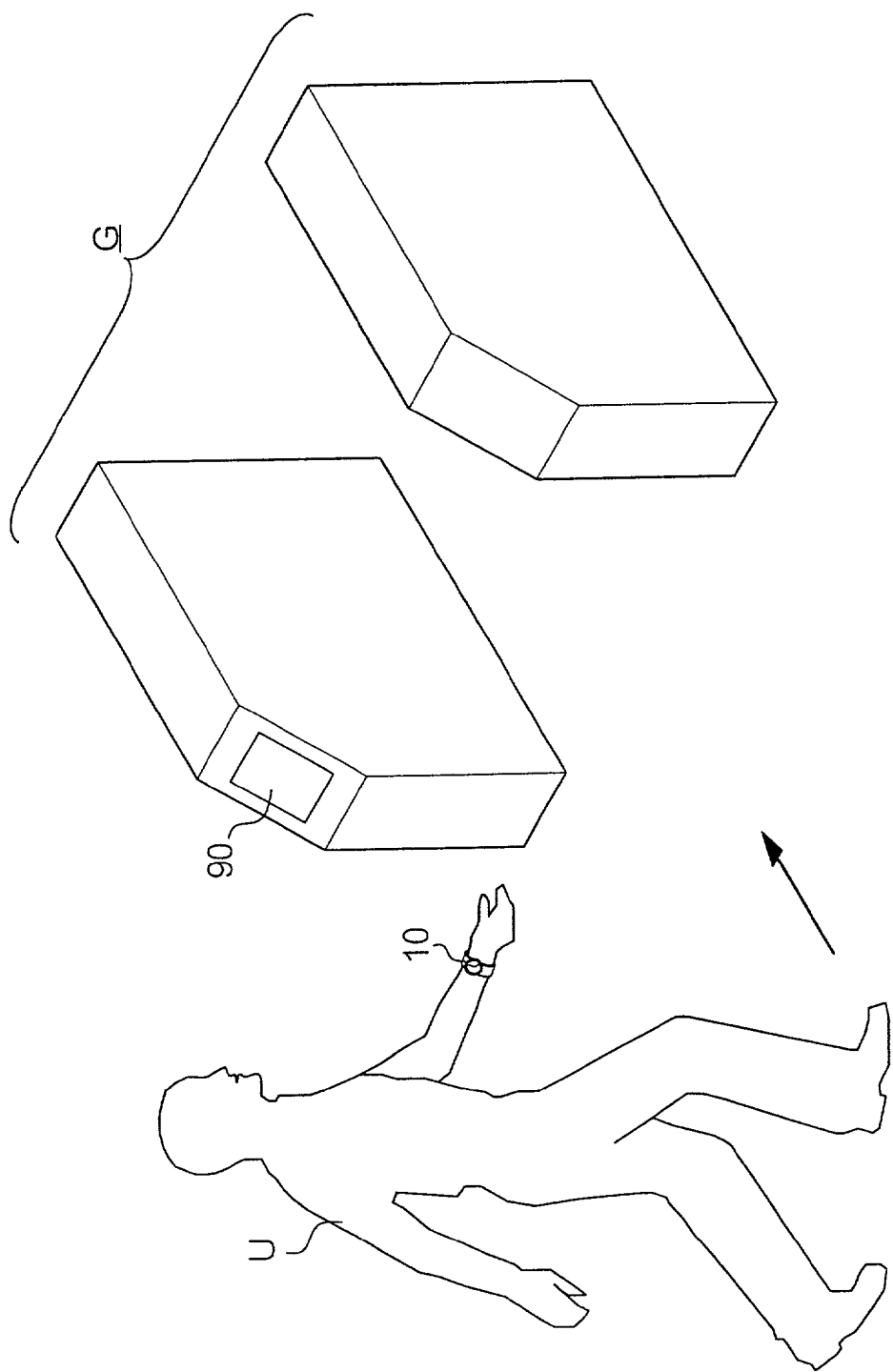
FIG. 1 is a perspective view showing how a user carrying a wristwatch-type electronic device passes through a gate, the electronic device being a first embodiment of the present invention.

FIG. 1 is a perspective view of a data communication system that serves a wristwatch-type electronic device 10. As shown in the figure, user U wears the wristwatch-type electronic device 10 on the arm and passes through gate G.

Gate G is for example a ticket gate of a train station. Gate G is provided with an external transmitter-receiver 90. The external transmitter-receiver device 90, when the wristwatch-type electronic device 10 passes through gate G, performs bi-directional data communications with the wristwatch-type electronic device 10.

The data communications generally employ carrier (carrier signal) of 13.56 [MHz] or 125 [kHz], and is weak radio communication where transmission output levels of the both devices are limited to low. For this reason, a range of several centimeters in distance from the external transmitter-receiver 90 is a circle where communications can be performed (hereinafter referred to as a communication range). Therefore, in performing bi-directional data communications, a user is required to bring the wristwatch-type electronic device 10 close to the antenna of the external transmitter-receiver 90.

Figure 2:
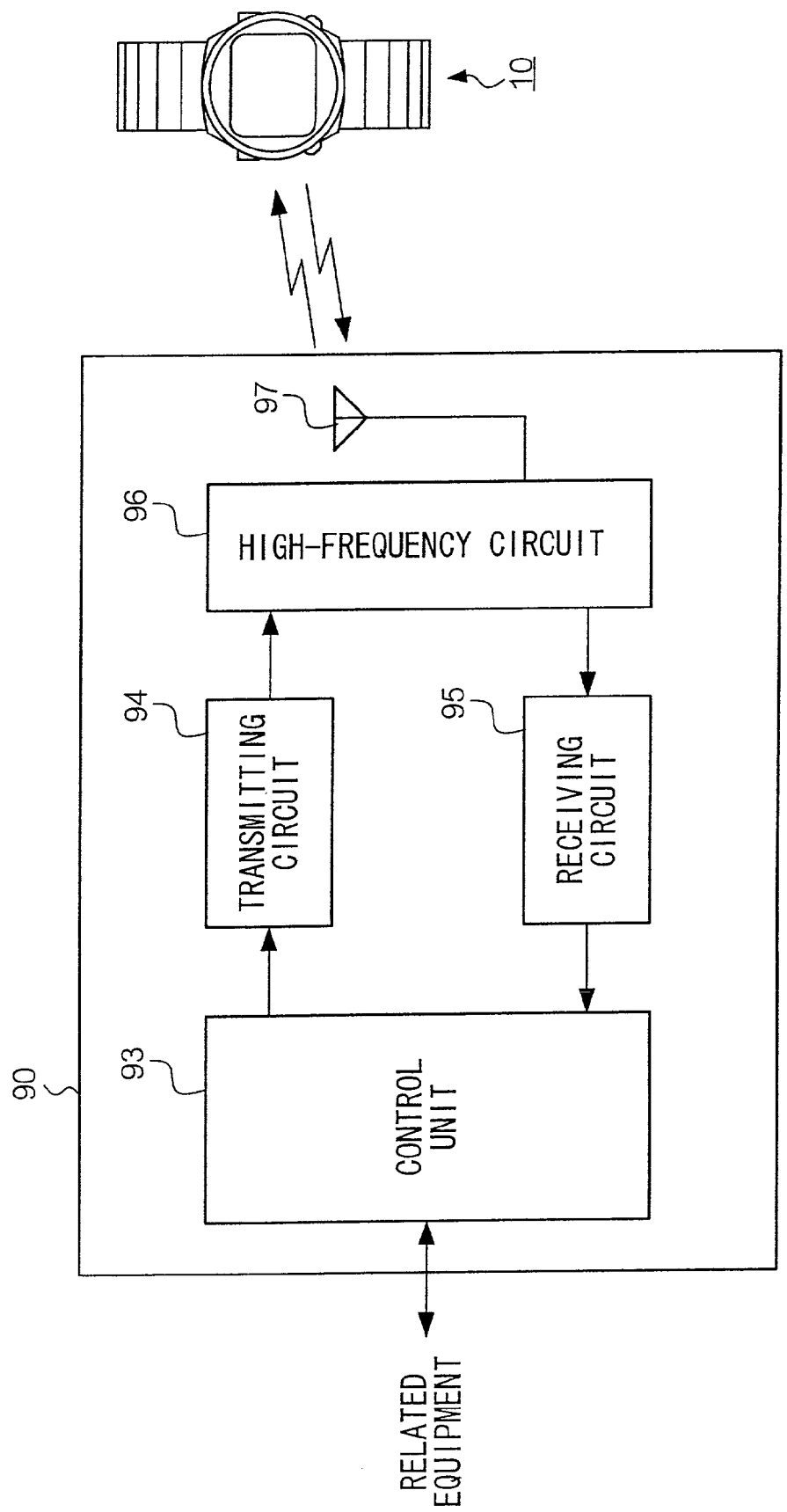
FIG. 2 is a block diagram showing a configuration of an external transmitter-receiver provided in the gate.

FIG. 2 is a block diagram showing a configuration of the external transmitter-receiver 90. In the external transmitter-receiver 90, a control unit 93 controls the entire external transmitter-receiver 90. A transmitting circuit 94 generates and outputs transmit control signal under the control of the control unit 93. A receiving circuit 95 receives receive signal at an antenna 97 through a high-frequency circuit 96, and demodulates received data from the receive signal so as to output the demodulated received data to the control unit 93. The high-frequency circuit 96 generates transmission signal based on the transmit control signal so as to transmit the transmission signal to the wristwatch-type electronic device 10 through the antenna 97, and outputs to the receiving circuit 95 the receive signal received by the antenna 97 from the wristwatch-type electronic device 10 as well.

Figure 3:
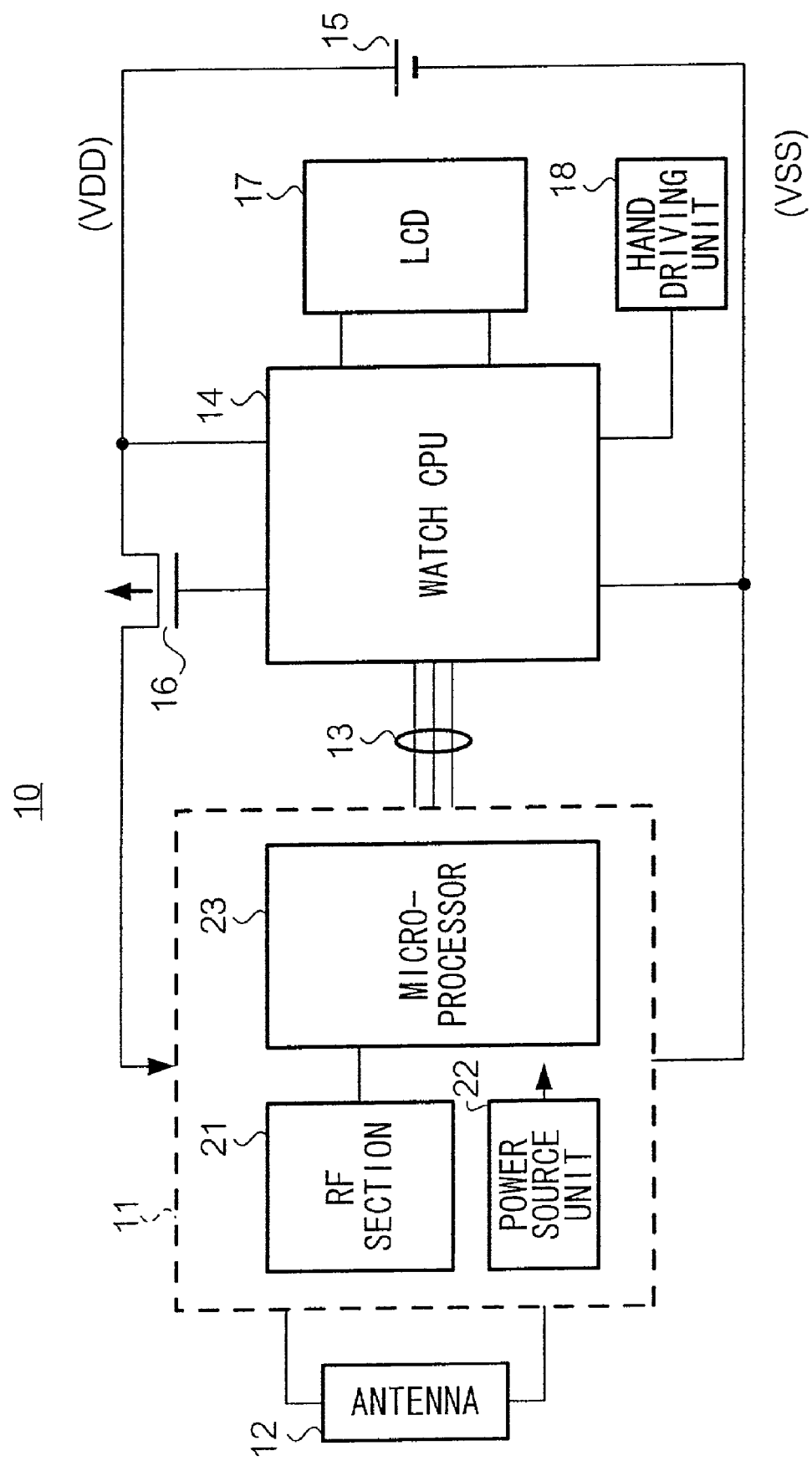
FIG. 3 is a block diagram showing a configuration of the electronic device.

FIG. 3 is a block diagram showing a configuration of the wristwatch-type electronic device 10 with regard to the present invention.

In the wristwatch-type electronic device 10, a watch CPU 14, a liquid crystal display (LCD) 17, and a hand driving unit 18 are components for conducting mainly a watch function and an information processing function. The hand driving unit 18 comprises an hour hand, a minute hand, and a second hand; a stepping motor for driving these hands; and a driving circuit for driving the stepping motor.

Figure 4:
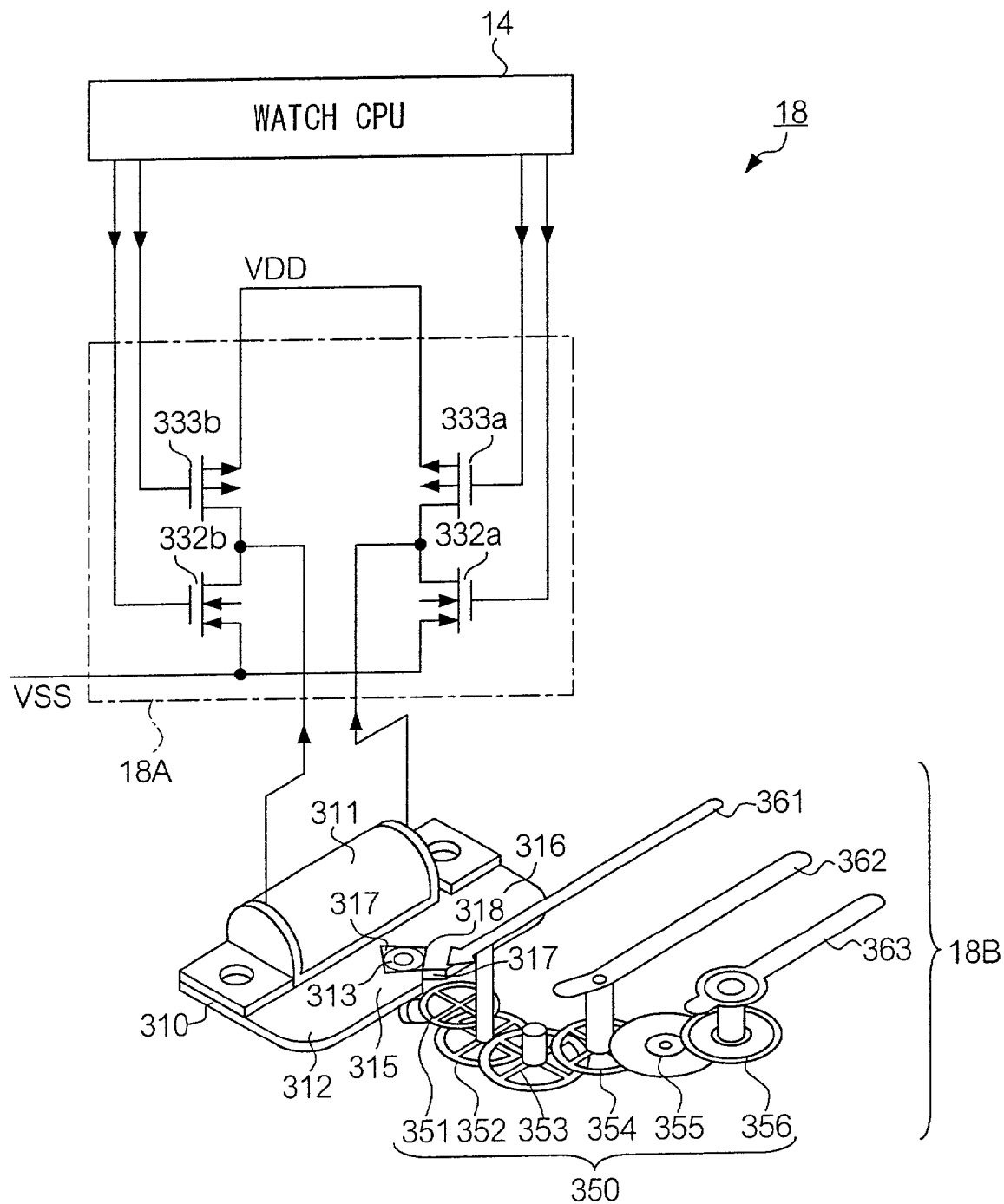
FIG. 4 is a diagram showing a configuration of a hand driving unit of the electronic device.

As shown in FIG. 4, the hand driving unit 18 comprises a driving circuit 18A and a driving mechanism 18B. In the driving mechanism 18B, the stepping motor 310 is equipped with a driving coil 311 for generating magnetic forces with driving pulses supplied from the driving circuit 318A; a stator 312 that is excited by the driving coil 311; and a rotor 313 which rotates under a magnetic field produced inside the stator 312. Magnetic saturation portions 317 are provided in the stator 312 so that the magnetic forces generated by the driving coil 311 produce different magnetic poles in respective phases (poles) 315 and 316 around the rotor 313. Also, in order to restrict the direction of rotation of the rotor 313, an inner notch 318 is formed in an appropriate position along an inner periphery of the stator 312. When the stator 312 is excited by the driving coil 311 in this structure, cogging torque is produced, so that the rotor 313 stops in an appropriate position.

The rotation of the rotor 313 of the stepping motor 310 is transmitted to respective hands by a wheel train 350 which comprises a fifth wheel 351 meshing with the rotor 313 through a pinion, a fourth wheel 352, a third wheel 353, a second wheel 354, a minute wheel 355, and an hour wheel 356. A second hand 361 is connected to a shaft of the fourth wheel 352, a minute hand 362 is connected to a shaft of the second wheel 354, and an hour hand 363 is connected to a shaft of the hour wheel 356. With the rotation of the rotor 313, those hands are rotated to indicate the time.

The driving circuit 18A supplies driving pulses of various waveforms to the stepping motor 310 by following driving instructions from the watch CPU 14. The driving circuit 18A comprises a bridge circuit made up of a p-channel MOS transistor 333a, an n-channel MOS transistor 332a, a p-channel MOS transistor 333b, and an n-channel transistor 332b. The driving coil 311 of the stepping motor 311 is inserted between a node connecting the p-channel MOS transistor 333a and the n-channel MOS transistor 332a and another node connecting the p-channel MOS transistor 333b and the n-channel transistor 332b. By applying control pulses from the watch CPU 14 to each gate electrode of those MOS transistor 332a, 332b, 333a, and 333b, driving pulses are supplied to the driving coil 311, thereby driving the rotor 313.

In FIG. 3, the watch CPU 14 performs a timekeeping operation so as to display the current time with the hour hand, minute hand, and second hand of the hand driving unit 18, and also performs various information processing as necessary and displays a result of the processing on the LCD 17.

Further, an IC-card chip unit 11 and an antenna 12 connected thereto are components for mainly conducting the function of a contactless IC card for performing data communications with the external transmitter-receiver 90. The IC-card chip unit 11 is equipped with a radio frequency (RF) unit 21 for receiving receive signal input through the antenna 12, a power supply unit 22 for generating driving power from received signal input through the antenna 12, and a microprocessor 23 for controlling the entire IC-card chip unit 11. The IC-card chip unit 11 is connected to the watch CPU 14 through a data interface 13.

A battery 15 is a power source for supplying power to a carrier detector not shown, the watch CPU 14 and the LCD 17. The battery 15 is also connected to the IC-card chip unit 11 through a switch transistor 16. While the switch transistor 16 is on, power is supplied from the battery 15 to the IC-card chip unit 11. The watch CPU 14 causes the battery 15 to supply power to the IC-card chip unit 11 through the switch transistor 16, thereby permitting data exchanges with the microprocessor 23 through the data interface 13.

[1.2] Detailed Configuration

Figure 5:
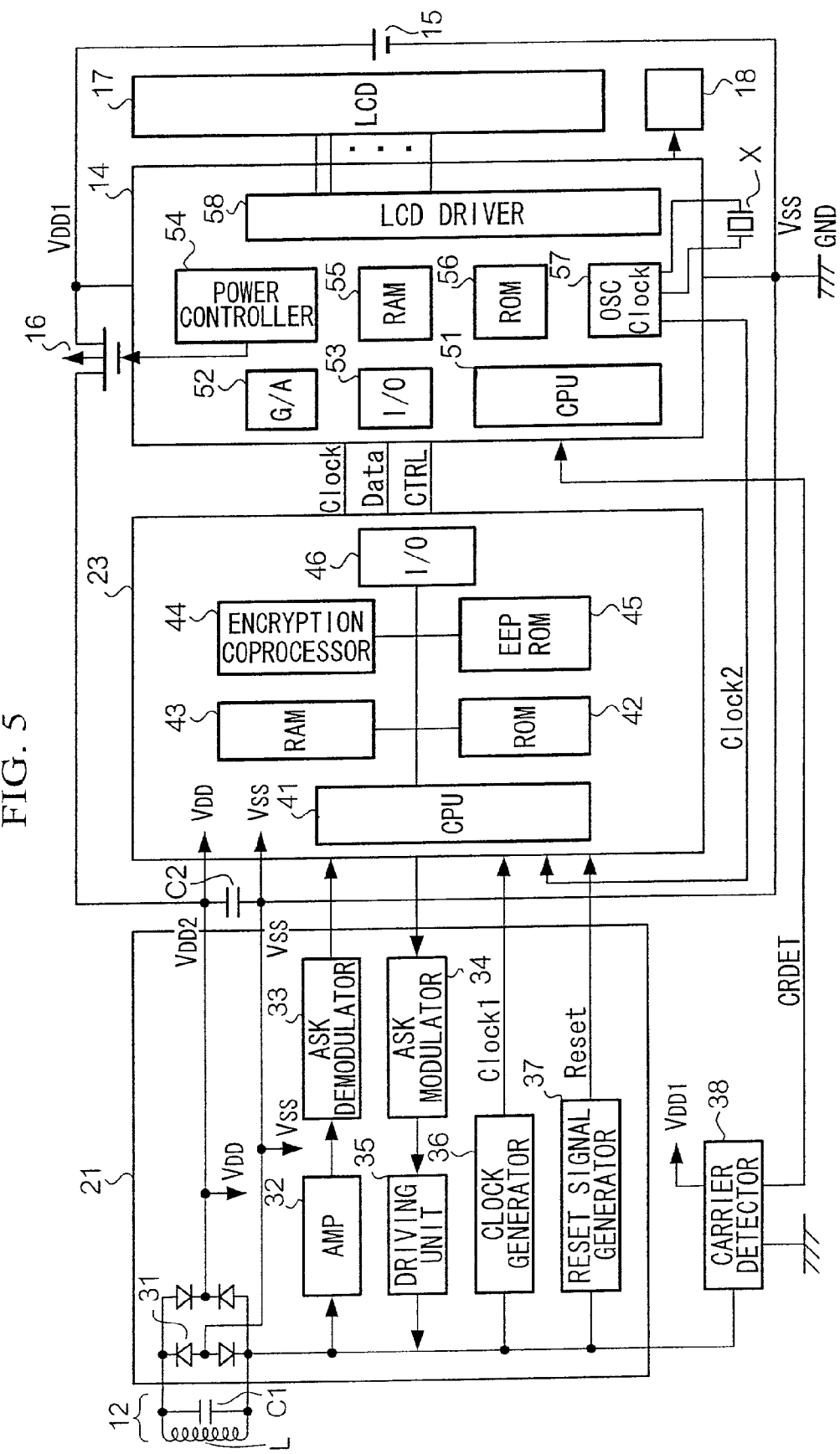
FIG. 5 is a block diagram showing a detailed configuration of the electronic device.

FIG. 5 is a block diagram showing the configuration of the wristwatch-type electronic device 10 as shown in FIG. 3 further in detail.

[1.2.1] Antenna

As shown in FIG. 5, the antenna 12 is equipped with a coil L and a tuning capacitor Cl.

[1.2.2] RF Unit

The RF unit 21 is a circuit for performing a function as a contactless communication unit with respect to the present invention. The RF unit 21 is equipped with a rectifier circuit 31 for rectifying receive signal at the antenna 12 and supplying as direct power (VDD, VSS) through a smoothing capacitor C2; an amplifier 32 for amplifying analog receive signal for output, the analog receive signal having been input through the antenna 12; an amplitude-shift keying (ASK) demodulating unit 33 for ASK demodulating the analog receive signal for output as receive data; an ASK modulator 34 for ASK modulating the transmission data entered from the microprocessor 23 for output as transmit control signal; a driving unit 35 for generating analog transmission signal based on the transmit control signal; a clock generator 36 for forming clock pulses CLOCK1 based on the analog receive signal entered through the antenna 12; and a reset signal generator 37 for generating reset signal RESET based on the analog receive signal entered through the antenna 12.

[1.2.3] Microprocessor

The microprocessor 23 is equipped with a CPU 41 for controlling the entire microprocessor 23; a ROM 42 in which control programs and control data are stored; a RAM 43 for storing various data temporarily as a work area; an encryption coprocessor 44 for performing various processings for encryption instead of the CPU; an electrically erasable and programmable ROM (EEPROM) 45 for storing various data that need to be stored in a nonvolatile manner such as received data; and an I/O unit 46 for performing an interface operation between the microprocessor 23 and the watch CPU 14.

[1.2.4] Watch CPU

The watch CPU 14 is equipped with a CPU 51 for controlling the entire watch CPU 14; a gate array unit 52 for various processings; an I/O unit 53 for performing an interface operation between the watch CPU 14 and the microprocessor 23; a power controller 54 for controlling whether or not to supply power from the battery 15 to the microprocessor 23; a RAM 55 for temporarily storing various data; a ROM 56 in which control programs and control data are stored; a clock oscillator 57 for performing time-keeping operations as well as generating and outputting clock pulses CLOCK2 based on oscillation frequency of an externally connected crystal oscillator X; and an LCD driver 58 for driving a liquid crystal display (LCD) 17.

[1.3] Carrier Detector

Next, a configuration of the carrier detector will be described with reference to FIG. 6.

The carrier detector 38 is equipped with an operational amplifier 61 for amplifying analog receive signal entered through the coil L and the tuning capacitor C1 forming the antenna 12 for output as amplified analog receive signal; a diode detector 62 for performing diode detection of the amplified analog receive signal to output detection signal SD1; an emission resistance R1 for emitting electric charges reserved in the diode detector 62 when detecting diode; and a buffer unit 63 for outputting carrier detecting signal CRDET after buffering the output signal from the diode detector 62.

The diode detector 62 is equipped with a diode D1 whose anode is connected to the output terminal of the operational amplifier 61, and a condenser whose one terminal is connected to the cathode terminal of the diode D1 and whose the other terminal is connected to a low-potential-side power source GND.

The buffer unit 63 comprises a first NOT circuit NOT1 to the input terminal of which the cathode terminal of the diode D1 is connected, where the first NOT circuit NOT1 reverses the detection signal SD1 and outputs as reversed detection signal/SD1; and a second NOT circuit NOT2 to the input terminal of which the output terminal of the first NOT circuit NOT1 is connected, where the second NOT circuit NOT2 reverses the input reversed detection signal/SD1 and outputs as carrier detecting signal CRDET. Power is supplied to the carrier detector 38 from the battery 15.

Figure 7:
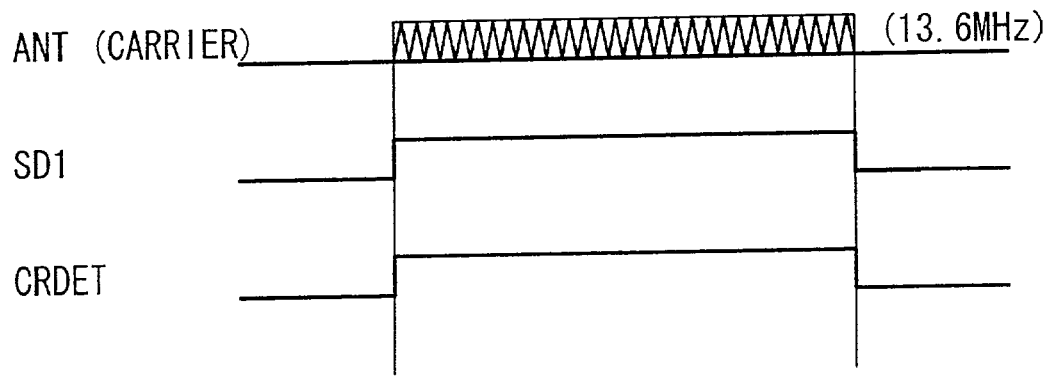
FIG. 7 is a diagram showing waveforms of each section of the carrier detector.

FIG. 7 shows waveforms of each part of the carrier detector.

Analog receive signal ANT received by the antenna 12 is, for example, signal acquired by modulating carrier with the frequency of 13.6 MHz. When diode detection is performed as for the analog receive signal ANT by the diode detector 62, detection signal SD1 whose waveform is almost equal to the envelope of the carrier is output to the buffer 63. The buffer 63 effectively performs a waveform-shaping opera-tion of the detection signal SD1 and outputs as carrier detecting signal CRDET as shown.

[1.4] Operation of the Embodiment

Figure 8:
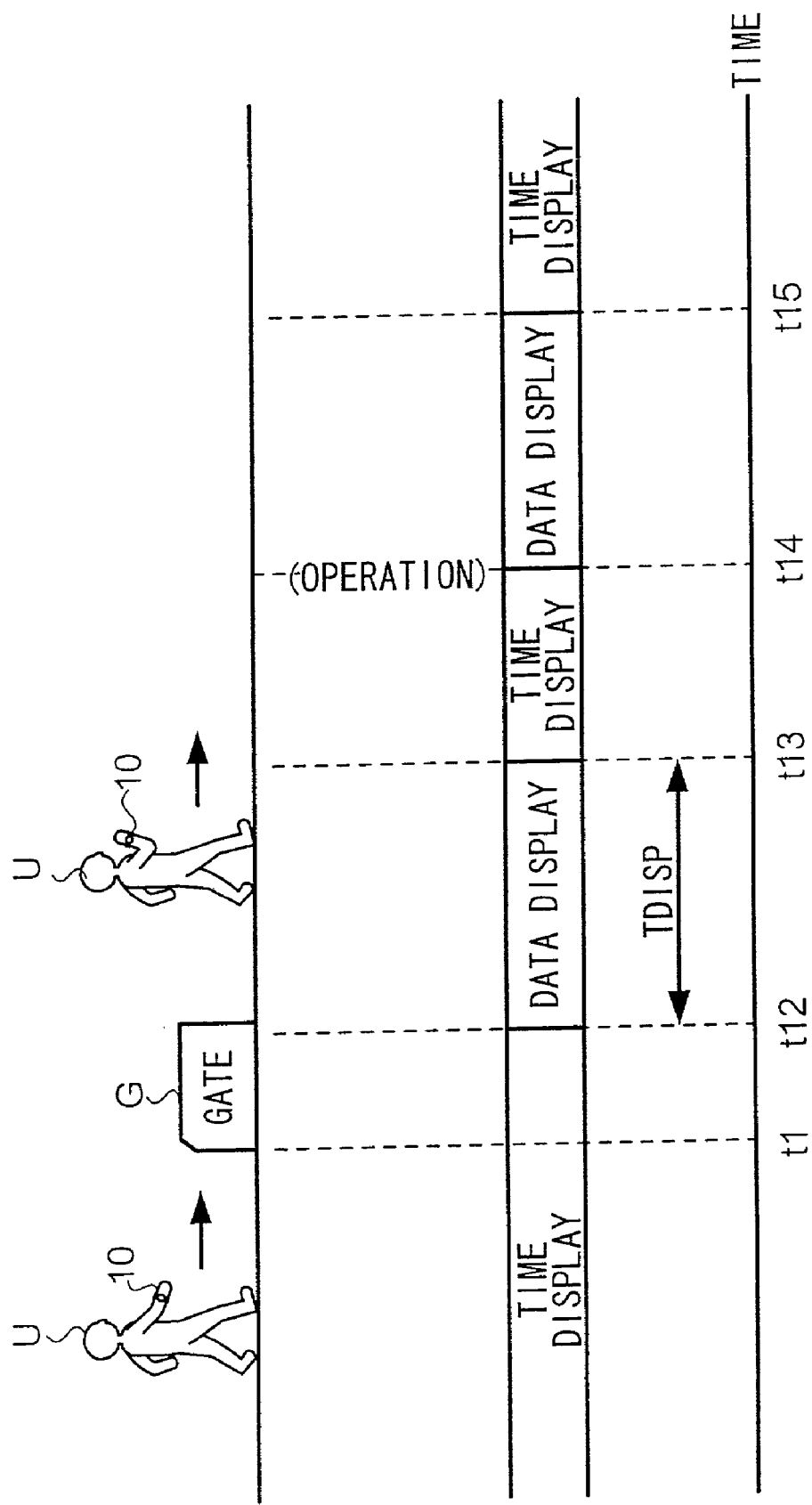
FIG. 8 and 9 are time charts showing an operation of the electronic device.
Figure 9:
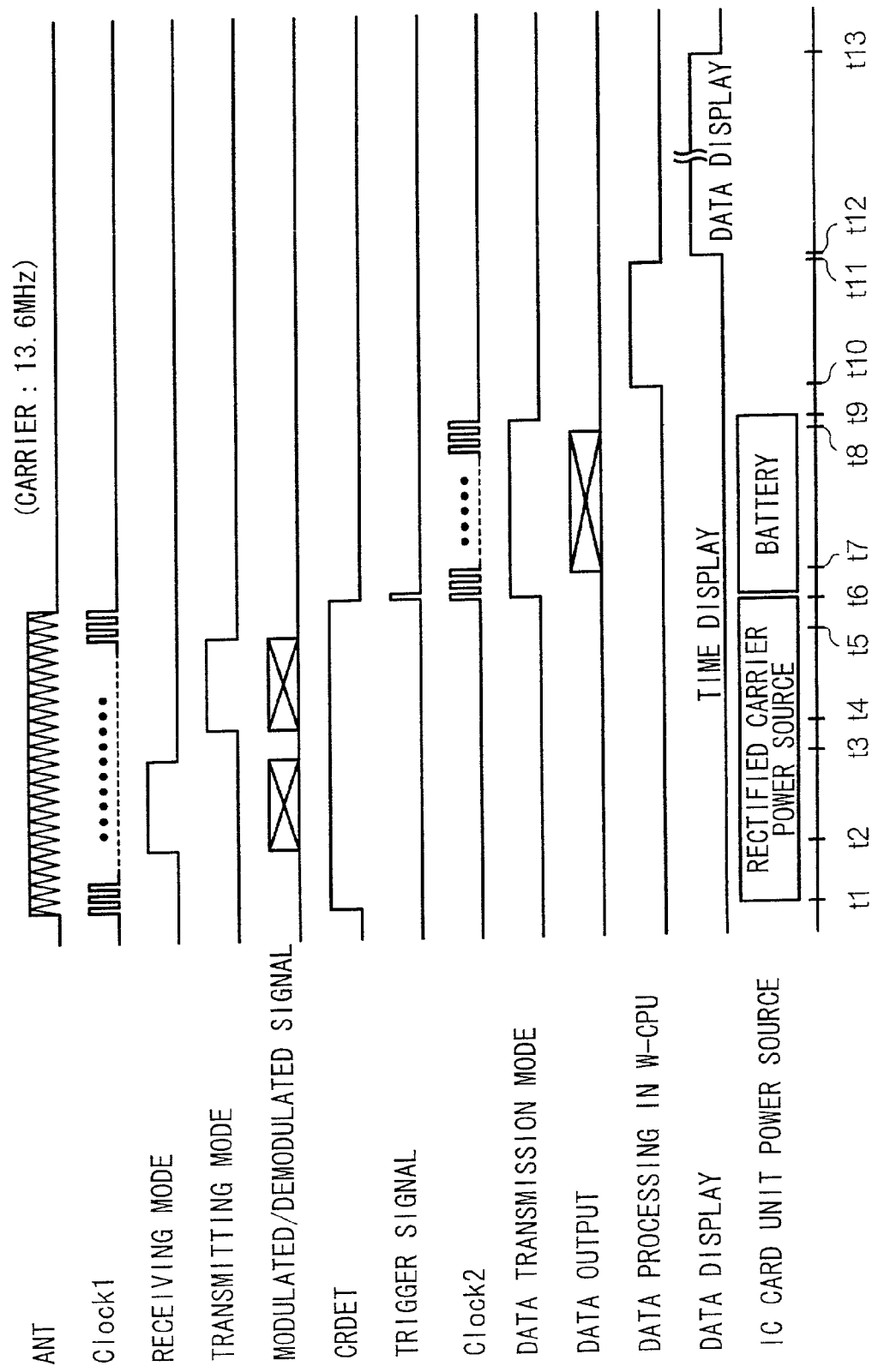
Figure 10A:
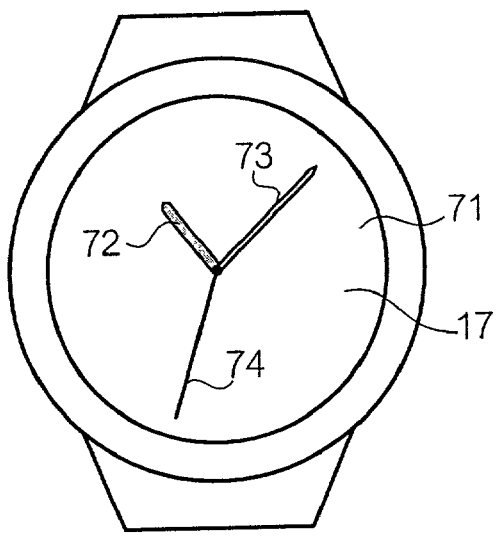
FIG. 10A and 10B are diagrams showing display examples of the electronic device.
Figure 10B:
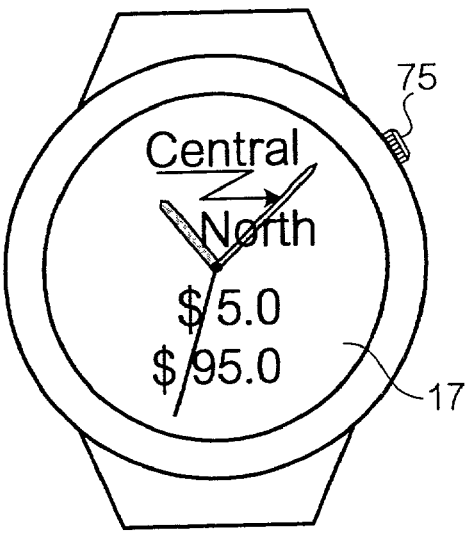

FIG. 8 is a time chart showing an operational example of the present embodiment. The time chart shows that a user carrying a wristwatch-type electronic device 10 passes through a gate equipped with an external transmitter-receiver, along with operations of the wristwatch-type electronic device 10 during the shown period. In the operational example, the IC-card chip unit 11 of the wristwatch-type electronic device 10 functions as a prepaid card. FIG. 9 is a time chart showing detailed operations of the wristwatch-type electronic device 10 during the period from time t1 to time t13 of the time chart shown in FIG. 8. Additionally, FIG. 10A and 10B show examples of a display screen displayed on a display unit of the wristwatch-type electronic device 10 in this operational example. An operation of the present embodiment will be described hereinafter with reference to these figures.

First of all, as shown in FIG. 8, we assume that user U is walking toward gate G. At this point of time, the wristwatch-type electronic device 10 is in a time displaying state (time display mode), nothing is displayed on the LCD 17 of the wristwatch-type electronic device 10 as shown in FIG. 10A, and we can see through a dial 71, an hour hand 72, a minute hand 73, and a second hand 74 positioned in rear of the LCD 17. Further, inside the wristwatch-type electronic device 10, the switch transistor 16 is in off state, and no power is supplied to the IC-card chip unit 11 from the battery 15.

Then, user U reaches gate G, for example, at time t1, and, when the wristwatch-type electronic device 10 enters the communication range of the external transmitter-receiver 90, an operation shown in FIG. 9 is initiated.

First, at time t1 when analog receive signal ANT (only carrier at this point) is received from the external transmitter-receiver 90 through the antenna 12, the analog receive signal ANT is rectified by the rectifier circuit 31 and supplied to the microprocessor 23 as direct power (VDD, VSS) through the smoothing condenser C2. Further, the carrier detector 38 changes carrier detecting signal CRDET to level "H".

During the period when the analog receive signal ANT is being received, the clock generator 36 performs an envelope waveform shaping of carrier included in the analog receive signal ANT. Gate signal is acquired by the waveform shaping, the gate signal being made level "H" during the period of time that carrier is being input. The clock generator 36 outputs clock signal CLOCK1 to the microprocessor 23 during the period of time that the gate signal is at level "H".

Since the IC-card chip unit 11 does not receive power supply from the battery 15 at this time, the IC-card chip unit 11 operates on the direct power (VDD, VSS: referred to as carrier rectified power in FIG. 8) supplied from the rectifier circuit 31. Then, at time t2 when a predetermined amount of time has elapsed since the start of receiving the analog receive signal ANT is detected, the CPU 41 regards the receive-mode-state signal as level "H" and enters a receive state.

Subsequently, the amplifier 32 amplifies analog receive signal input from the antenna for output to the ASK demodulator 33. The ASK demodulator 33 ASK demodulates the analog receive signal to generate receive data for output to the microprocessor 23. Then, at time t3, when it is found that no more digital receive signal is to be input to the ASK demodulator 33, the CPU 41 changes the receive-mode-state signal to level "L" and enters a standby state.

At time t4, the CPU 41 changes the transmission-mode-state signal to level "H" and outputs transmission data to the ASK modulator 34 so as to transmit signal to the external transmitter-receiver 90. Subsequently, the ASK modulator 34 ASK modulates the transmission data given from the CPU 41 for output to the driving unit 35. The driving unit 35 generates analog transmission signal based on the transmit control signal and transmits the generated signal to the external transmitter-receiver 90 through the antenna 12. Then, when the outputting of the transmission data is completed at time t5, the CPU 41 changes the transmission mode state signal to level "L".

Bi-directional data communications are thus performed between the IC-card chip unit 11 of the wristwatch-type electronic device 10 and the external transmitter-receiver 90. The bi-directional data communications are repeated as many times as needed. Information as to transactions and final balance are exchanged through the bi-directional data communications between the external transmitter-receiver 90 and the IC-card chip unit 11, and in the IC-card chip unit 11 of the wristwatch-type electronic device 10, the transaction information are recorded in the EEPROM 45, and data of the remaining value contained in the prepaid card in the EEPROM 45 is updated. Further, the completion of updating the balance data is reported from the IC-card chip unit 11 to the external transmitter-receiver 90 inside gate G.

At time t6, when no more carrier is input from the antenna 12, the carrier detector 38 turning the carrier detection signal CRDET into level "L", the CPU 41 of the IC-card chip unit 11 switches trigger signal to level "H" through the I/O unit 46, the trigger signal being control signal CTRL.

Subsequently, the clock oscillator 57 of the watch CPU 14 generates clock signal CLOCK2 based on oscillation frequency of an externally connected crystal oscillator X for output to the microprocessor 23. Additionally, the power controller 54 turns on the switch transistor 16, so that power is supplied to the IC-card chip unit 11 from the battery 15. Further, the watch CPU 14 changes the IC-card chip unit 11 to a data transmission mode.

Then, at time t7, the CPU 41 of the microprocessor 23 reads data from the EEPROM 45 and transfers the data to the RAM 55 of the watch CPU 14 through the I/O unit 46.

When the data is transferred by the CPU 41 and the transfer of the data is completed at time t8, the watch CPU 14 cancels the data transmission mode at time t9. At the same time the power controller 54 turns off the switch transistor 16, so that the power supply to the IC-card chip unit 11 from the battery 15 is stopped.

At time t10, the CPU 51 of the watch CPU 14 conducts various processings, for example, a format conversion of data that are received from the IC-card chip unit 11 and are stored in the RAM 55.

Then, at time t11, when the processing on the data received from the IC-card chip unit 11 is completed, the CPU 51 controls the LCD driver 58 while transferring the processed data to the LCD driver 58, so that the data will be displayed on the LCD 17 during the period between time t12 to time t13. In this case, the battery 15 is used as driving power for the LCD 17. FIG. 10B shows examples of transaction information and the remaining value of the prepaid card displayed on the LCD 17 at this time. To be more concrete, the fare (the amount used) of $5 from Central Station to North Station as well as the value remaining in the prepaid card, $95, are displayed.

When it turns to time t13 when an automatic data displaying time TDISP has elapsed since time t12, where the TDISP has been set in advance for the data confirmation, the wristwatch-type electronic device 10 again enters a time displaying state (time displaying mode). As shown in FIG. 10A, nothing is displayed on the LCD 17, and we can see through a dial 71, an hour hand 72, a minute hand 73, and a second hand 74 that are positioned in rear of the LCD 17.

When the user pushes down a display button 75 at a later time, for example, at time t14, the wristwatch-type electronic device 10 enters a data displaying mode (a manual data displaying mode) as shown in FIG. 8. The CPU 51 of the watch CPU 14 reads data that are received from the IC-card chip unit 11 and are stored in the RAM 55, and performs all sorts of processings such as a format conversion on the data to be transmitted to the LCD driver 58. As a result, the amount used most recently and the remaining value of the prepaid card are displayed on the LCD 17 as shown in FIG. 10B.

Then, at time t15 when a pre-set display time has elapsed, the wristwatch-type electronic device 10 again enters a time displaying state (time displaying mode).

In cases where the user pushes down the display button 75 even before the pre-set display time has elapsed, this action of pushing down the button causes the wristwatch-type electronic device 10 to enter a time displaying state (time displaying mode).

[1.5] Effects of the First Embodiment

The first embodiment as described above enables displaying of the stored data contents on the spot without undermining mobility while maintaining the specifications of the conventional contactless IC cards, thus enhancing operability for users.

Especially the effective utilization of power source such as the battery of wearable electronic devices, a type of hand-held electronic devices, and the display function thereof enables displaying of data contents such as the remaining value and history of the contactless IC-card unit for a certain period of time since the point of accessing the IC-card or at any time necessary by a switching operation, thus considerably enhancing the convenience for users.

Furthermore, in cases where a wristwatch-type electronic device is configured as a wearable electronic device, the effects of aesthetic design quality of the watch appearance and its display visibility can be achieved at the same time by combining time display hands and a transparent display element. The combination especially with a light-emitting display element increases the visibility in using the device, thus further enriching the effects.

[1.6] Modifications of the Embodiment

[1.6.1] First Modification

In the present modification, during the period when data communications are being performed between the wristwatch-type electronic device 10 and the external transmitter-receiver 90, the watch CPU 14 of the wristwatch-type electronic device 10 suspends the operation of the stepping motor of the hand driving unit 18. After the data communications are completed, the watch CPU 14 transmits to the hand driving unit 18 an instruction for driving the stepping motor step by step by the number of steps equivalent to the suspended period. The present modification enables a more stable data communication because no driving of the stepping motor for time display during data communications prevents electromagnetic noise from occurring.

[1.6.2] Second Modification

Figure 11A:
FIG. 11A and 11B are diagrams showing display examples of a modification in the embodiment.
Figure 11B:
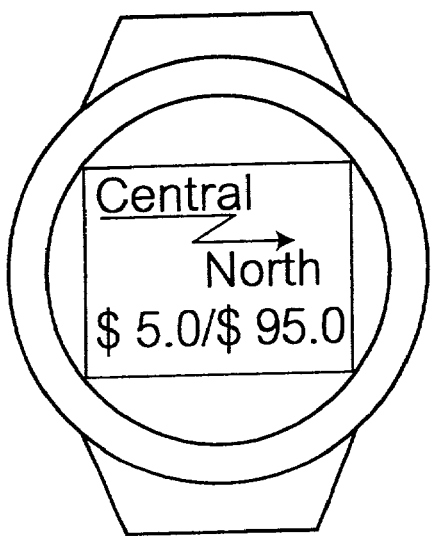

The above first embodiment shows a wristwatch-type electronic device which performs an analog time display using an hour hand, a minute hand, and a second hand as an example. The present modification suggests a wristwatch-type electronic device which performs digital display of the current time. In the present modification, two types of LCD are positioned under the cover plate of the wristwatch-type electronic device, one of which is a transparent LCD. The transparent LCD is positioned right behind the cover plate for displaying data stored in the IC-card unit such as remaining value of a prepaid card. The other type of LCD is positioned further behind the transparent LCD for displaying the current time. FIG. 11A and FIG. 11B show display examples of the wristwatch-type electronic device in the present modification. In the examples, the IC-card chip unit 11 functions as a prepaid card in the same way as in the first embodiment.

In a time display state, the LCD 17 displays the current date and day (April 3, Sunday) and the current time (twelve o'clock thirty-seven minutes forty-six seconds) as shown in FIG. 11A. When a user pushes down the display button 75 in this state, the amount used most recently (the fare of $5 from Central Station to North Station) and the remaining value of the prepaid card ($95) are displayed on the LCD 17 in addition to the date, day, and current time, as shown in FIG. 1B.

[1.6.3] Third Modification

In the above embodiment, a description is given as to a wristwatch-type electronic device, but the present invention can be also applied to a compact hand-held electronic device comprising a display unit and an independent power source (battery) exclusively for the display unit.

[1.6.4] Fourth Modification

Various embodiments of a compact hand-held electronic device can be envisioned such as a calculator, Personal Digital Assistant (PDA), a translator, a pedometer, and a portable sphygmomanometer. Those embodiments may employ various modes such as necklace-type, pendant-type, and others.

[1.6.5] Fifth Modification

While in the above embodiment power is supplied from the battery to the IC-card chip unit when data are read out from the non-volatile memory of the IC-card chip unit, power may be supplied also when the IC-card chip unit transmits data signal to the external transmitter-receiver. By doing so, it is possible to increase the transmission power of the IC-card chip unit as well as the degree of modulation, thereby extending a communication range.

[2] Second Embodiment

[2.1] Summary of Configuration

Figure 12:
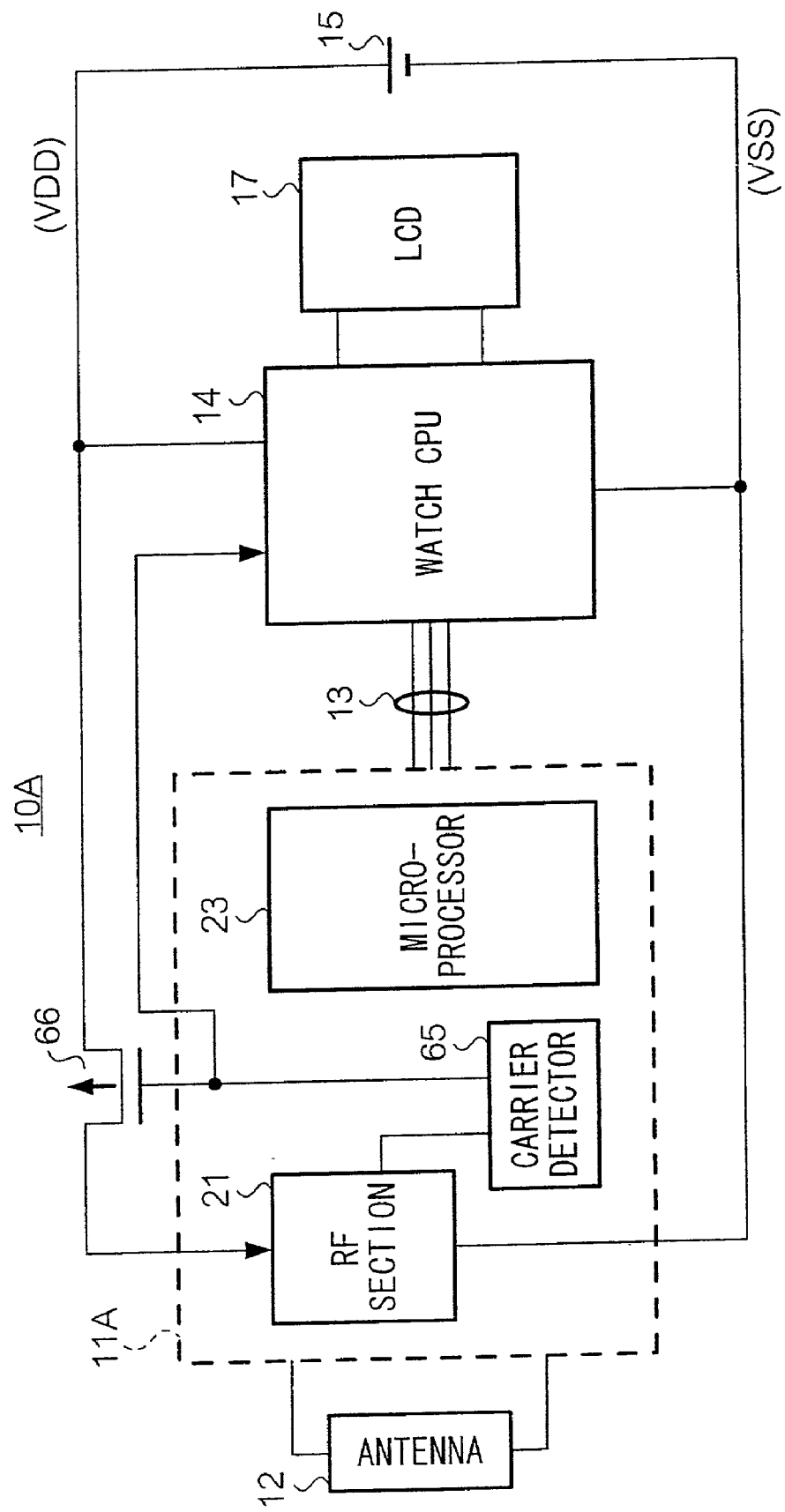
FIG. 12 is a block diagram showing a configuration of a wristwatch-type electronic device which is a second embodiment of the present invention.

FIG. 12 is a block diagram showing a configuration of a wristwatch-type electronic device 10A which is a second embodiment of the present invention. The wristwatch-type electronic device 10A is broadly divided into an IC-card chip unit 11A for carrying out an IC-card function; an antenna 12 that is connected to the IC-card chip unit 11A; a crystal liquid display (LCD) 17 for performing display operations of every kind; a watch CPU 14 that is connected to the IC-card chip unit 11A through a data interface 13 and controls the entire wristwatch-type electronic device, time-keeping operations, and displaying operations of the LCD 17; a battery 15 for supplying power to the wristwatch-type electronic device 10A; and a switch transistor 66 for controlling power supply to the IC-card chip unit 11A from the battery 15 based on control signal from a carrier detector as will be described hereinafter.

The IC-card chip unit 11A comprises an RF unit 21 for receiving receive signal input through the antenna 12; a carrier detector 65 for performing carrier detection of analog receive signal input through the antenna 12; and a microprocessor 23 for controlling the entire IC-card chip unit 11A.

[2.2] Detailed Configuration

Figure 13:
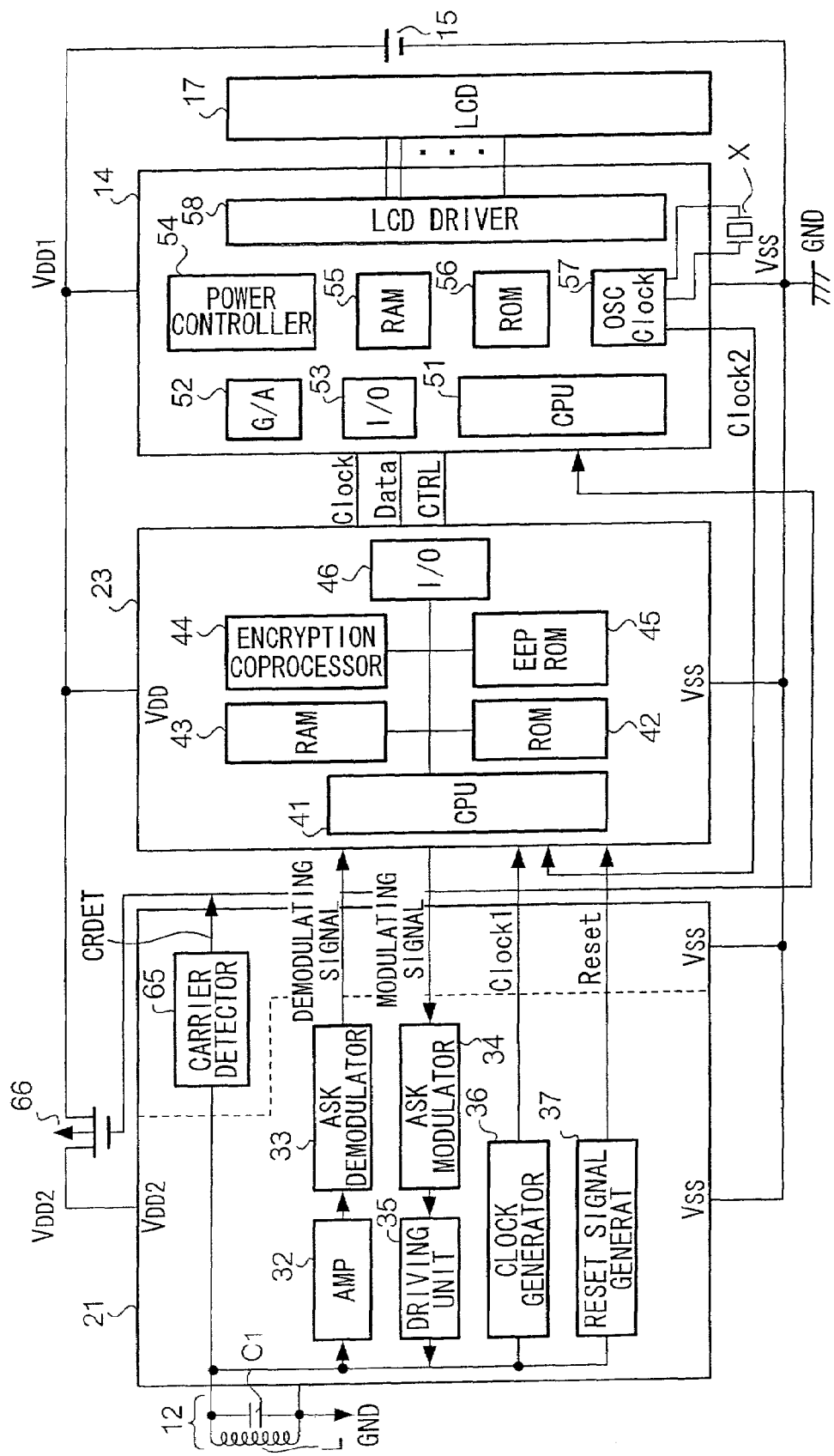
FIG. 13 is a block diagram showing a detailed configuration of the electronic device.

FIG. 13 shows a block diagram of a detailed configuration of the wristwatch-type electronic device 10A.

In FIG. 13, the same reference numerals are employed for the same parts as the first embodiment shown in FIG. 3, and a detailed description thereof will be omitted.

In the present embodiment, power is supplied from the battery 15 to the RF unit 21 when it operates.

The RF unit 21 comprises a carrier detector 65 for performing carrier detection of analog receive signal input through the antenna 12; an amplifier 32 for amplifying the analog receive signal input through the antenna 12, for output; an ASK demodulator 33 for ASK demodulating the analog receive signal for output as receive data; an ASK modulator 34 for ASK modulating transmission data entered from the microprocessor 23 for output as transmit control signal; a driving unit 35 for generating analog transmission signal based on the transmit control signal; a clock generator 36 for forming clock pulses CLOCK1 based on the analog receive signal entered through the antenna 12; and a reset signal generator 37 for generating reset signal RESET based on the analog receive signal entered through the antenna 12.

Figure 6:
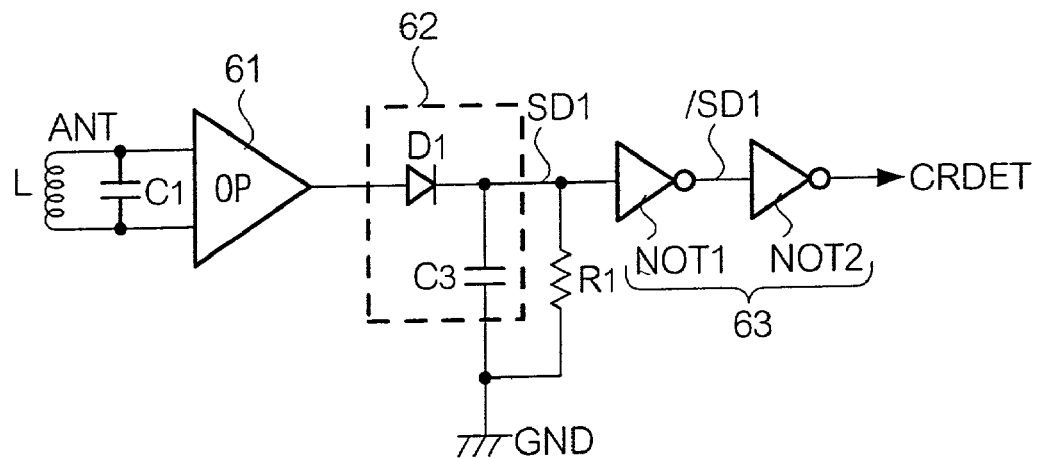
FIG. 6 is a circuit diagram showing a configuration of a carrier detector provided in the electronic device.

In this case, the configuration of the carrier detector 65 is same as the configuration of the carrier detector 38 shown in FIG. 6.

Of these components, while power is supplied from the battery 15 at all times to the carrier detector 65, it is when carrier is detected by the carrier detector 65 and carrier detection signal changes to level "L", causing the switch transistor 66 to be turned on, that power is supplied from the battery 15 to the amplifier 32, the ASK demodulator 33, the ASK modulator 34, the driving unit 35, the clock generator 36, and the reset signal generator 37.

[2.3] Operation

Next, an operation of the wristwatch-type electronic device 10A will be described.

When analog receive signal (only carrier at this point) is input from an external transmitter-receiver 90 (refer to FIG. 1 and FIG. 2) through a coil L and a tuning capacitor C1 of the antenna 12, the carrier detector 65 detects carrier and outputs carrier detecting signal CRDET of level "L".

Subsequently, the switch transistor 66 turns an ON state, which in turn causes power supply from the battery 15 to the amplifier 32, the ASK demodulator 33, the ASK modulator 34, the driving unit 35, the clock generator 36, and the reset signal generator 37, all of which are then made an operative state.

As analog receive signal is input, the clock generator 36 generates clock signal CLOCK1 for output to the microprocessor 23 during the period when carrier is being input.

When a predetermined amount of time has elapsed since the incoming of the carrier is detected, the IC-card chip unit 11A enters a receiving state.

Subsequently, the amplifier 32 amplifies the analog receive signal for output to the ASK demodulator 33.

The ASK demodulator 33 ASK demodulates the analog receive signal into receive data for output to the microprocessor 23.

When no more digital receive signal is input, the ASK demodulator 33 enters a standby state.

Subsequently, the CPU 41 outputs transmission data to the ASK modulator 34 so as to transmit signal to an external card reader/writer (not shown).

Subsequently, the ASK modulator 34 ASK modulates the transmission data input by the CPU 41 into transmit control signal for output to the driving unit 35.

The driving unit 35 generates analog transmission signal based on the transmit control signal for output to the antenna 12, through which the signal is transmitted to the external card reader/writer.

When no more carrier is input from the antenna 12, carrier detecting signal CRDET turning level "H" at the carrier detector 65, the switch transistor 66 becomes an OFF state. As a result, power supply from the battery 15 to the amplifier 32, the ASK demodulator 33, the ASK modulator 34, the driving unit 35, the clock generator 36, and the reset signal generator 37 will be suspended, and these parts become an inoperative state.

The CPU 41 of the microprocessor 23 then reads data for display from the EEPROM 45, and the data are transferred through the I/O unit 46 to the RAM 55 of the watch CPU 14.

The CPU 41 conducts the data transfer, and when the data transfer is complete, a data transfer mode is cancelled.

Further, the CPU 51 of the watch CPU 14 performs all sorts of processings such as format conversion of data that are received from the IC-card chip unit 11 and are stored in the RAM 55.

When the processings on the data from the IC-card chip unit 11A are completed, the CPU 51 transfers the processed data to the LCD driver 58 and controls the LCD driver 58 in the meantime so as to display the data on the LCD 17.

[2.4] Effects of the Second Embodiment

The present embodiment inhibits the unnecessary increase in electric power consumption because power is supplied to the RF unit from a battery exclusively for time display when the incoming of carrier from outside is detected. Additionally, utilizing power from the battery when modulating data enables the increase in the degree of modulation or transmission power, thus extending the communication range. As a result, the convenience for users is enhanced.

Further, the present embodiment prevents leakage current from the power source for time display when the IC-card chip unit is in an inoperative mode because power source is controlled through the switch transistor so as to supply power for time display to the IC-card chip unit only when data is read from the IC-card chip unit to the watch CPU and the like for the purpose of displaying data.

Further, it is possible to control leakage current at the IC-card chip unit while in the inoperative state, by continuously or intermittently operating at least the carrier detecting circuit among the components of the IC-card chip unit by the power source for time display and, for the other components, supplying power from the power source for time display at the point where carrier is detected. In this case, the carrier detector utilizes a watch IC technique, thereby enabling the change of the operating current to several microampere (μA) order.

Further, since the carrier detecting circuit detects presence or absence of electromagnetic carrier and performs a switching operation of the operational mode of the IC-card chip unit, it is possible to switch the operational mode easily at a relevant timing. In this case, communication between the IC-card chip unit and an external device is not hindered because data is transmitted, with timing of having transferred from a carrier detecting state to a carrier non-detecting state, between the microprocessor of the IC-card chip unit and another part of the wristwatch-type electronic device such as the watch CPU.

[2.5] Modifications of the Second Embodiment

[2.5.1] First Modification

In the above embodiment, a description is given as to a wristwatch-type electronic device, but the present invention can be also applied to a compact hand-held electronic device comprising a display unit and an independent power (battery) for the display unit.

[2.5.2] Second Modification

Various embodiments of a compact hand-held electronic device can be envisioned such as a calculator, Personal Digital Assistant (PDA), a translator, a pedometer, and a portable sphygmomanometer. Those embodiments may employ various modes such as necklace-type, pendant-type, and others.

[3] Third Embodiment

[3.1] Configuration

Figure 14:
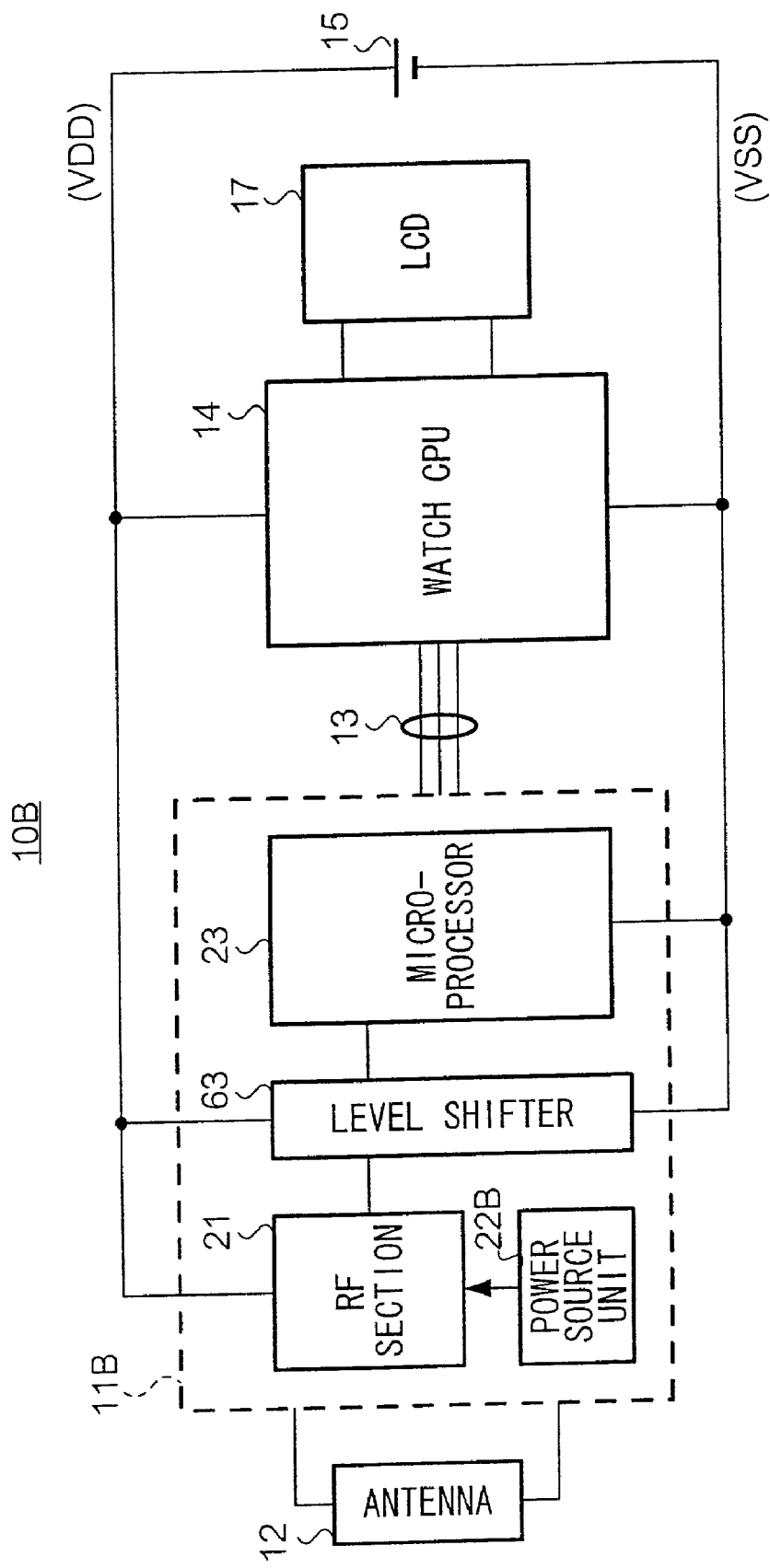
FIG. 14 is a block diagram showing a configuration of a wristwatch-type electronic device which is a third embodiment of the present invention.

FIG. 14 is a block diagram showing a configuration of the wristwatch-type electronic device 10B, which is a third embodiment of the present invention. In FIG. 14, the same parts as the first embodiments are given the same reference numerals, and a detailed description thereof will be omitted.

In FIG. 14, the following points are different from the first embodiment shown in FIG. 3:

in the above first embodiment, the power source unit 22 generates driving power from receive signal input through the antenna 12, for supply to the entire IC-card chip unit 11. On the other hand, a power source unit 22B is provided in the present embodiment instead of the power source unit 22 in the first embodiment, and the power source unit 22B generates driving power from receive signal input through an antenna 12 and supplies the generated power to an RF unit 21;

in the present embodiment, a level shifter 63 is added for adapting the voltage level of output signal of the RF unit 21 to the voltage level of the microprocessor 23;

in the above first embodiment, the switch transistor 16 is provided for controlling power supply from the battery 15 to the IC-card chip unit 11 if necessary. On the other hand, no switch transistor 16 is provided in the present embodiment; and in the present embodiment, power is supplied to the level shifter 63 and the microprocessor 23 from the battery 15.

[3.2] Operation

Next, an operation of the wristwatch-type electronic device 10B will be described. In the following descriptions, an operation of the IC-card chip unit 11B as of the input of analog receive signal will be mainly described because the operation in transmitting analog transmission signal, the operation of the microprocessor of the IC-card chip unit 11B, and the operation of the watch CPU are the same as those of the first embodiment.

When analog receive signal (only carrier at this point) is input from an external card reader/writer (not shown) through a coil L and a tuning capacitor C1 of the antenna 12, a rectifier circuit 31 rectifies the analog receive signal for supply to the RF unit 21 as direct power (VDD, VSS) through a smoothing condenser C2.

When a predetermined time has elapsed after the incoming of the carrier was detected, the IC-card chip unit 11B enters a receiving state and outputs the received data to the level shifter 63.

The level shifter 63 adapts the voltage level of the received data to the voltage level of the microprocessor 23 for output to the microprocessor 23.

Subsequently, the microprocessor 23 operates on power supplied from the battery 15 and performs various processings on the received data.

When no more digital receive signal is input, the microprocessor 23 enters a standby state.

[3.3] Effects of the Embodiment

The third embodiment as described above enables a more stable operation of the microprocessor 23 of the IC-card chip unit 11B since it operates on power constantly supplied from the battery 15.

Further, the RF unit, whose leakage current is relatively high during its inoperative state, utilizes power generated by rectifying electromagnetic carrier transmitted from outside; and the microprocessor of the IC-card chip unit, whose leakage current is relatively low during its inoperative state, utilizes power for time display, thus enabling the controlling of leakage current by a simple configuration and the transfer of data to the watch CPU in a state where no power is generated by rectifying electromagnetic carrier.

[3.4] Modifications of the Second Embodiment

[3.4.1] First Modification

In the above embodiment, a description is given as to a wristwatch-type electronic device, but the present invention can be also applied to a compact hand-held electronic device comprising a display unit and an independent power (battery) for the display unit.

[3.4.2] Second Modification

Various embodiments of a compact hand-held electronic device can be envisioned such as a calculator, Personal Digital Assistant (PDA), a translator, a pedometer, and a portable sphygmomanometer. Those embodiments may employ various modes such as necklace-type, pendant-type, and others.

[4] Fourth Embodiment

In the above first to third embodiments, the IC-card chip unit which implements the same functions as contactless IC cards is mounted on a hand-held information device equipped with a liquid crystal display or an organic electroluminescence (EL) light-emitting display for displaying various information, thereby enabling a user to confirm information on the amount used and the remaining value stored in a contactless IC card.

However, the display devices such as a liquid crystal display and an organic EL light-emitting display operate in digital control and generate electromagnetic noise during the operation. There are various causes for the electromagnetic noise, among which this type of electromagnetic noise occurs when alternating waveform is applied to a display panel of the liquid crystal display or organic EL light-emitting display, or when an ON/OFF switching operation of a boosting circuit for boosting the driving power of the display panel is performed. When this type of electromagnetic noise occurs from a display device, transmission sensitivity of the IC-card chip unit is deteriorated, by which a communication range is decreased and possible communication errors can take place.

This problem is aggravated especially in a wristwatch-shaped hand-held information device, which is too compact to position a display unit of a liquid crystal display or an organic EL light-emitting display and the antenna of an IC-card chip unit away from each other.

The present embodiment offers a suggestion for such a problem. The present embodiment provides a hand-held information device capable of inhibiting the deterioration of communication sensitivity, the decrease of a communication range, and the communication errors of the IC-card chip unit even in cases where a display unit of the hand-held communication device and the antenna of the IC-card chip unit cannot be positioned apart from each other due to the limited size of the device.

[4.1] Summary of Configuration

Figure 15:
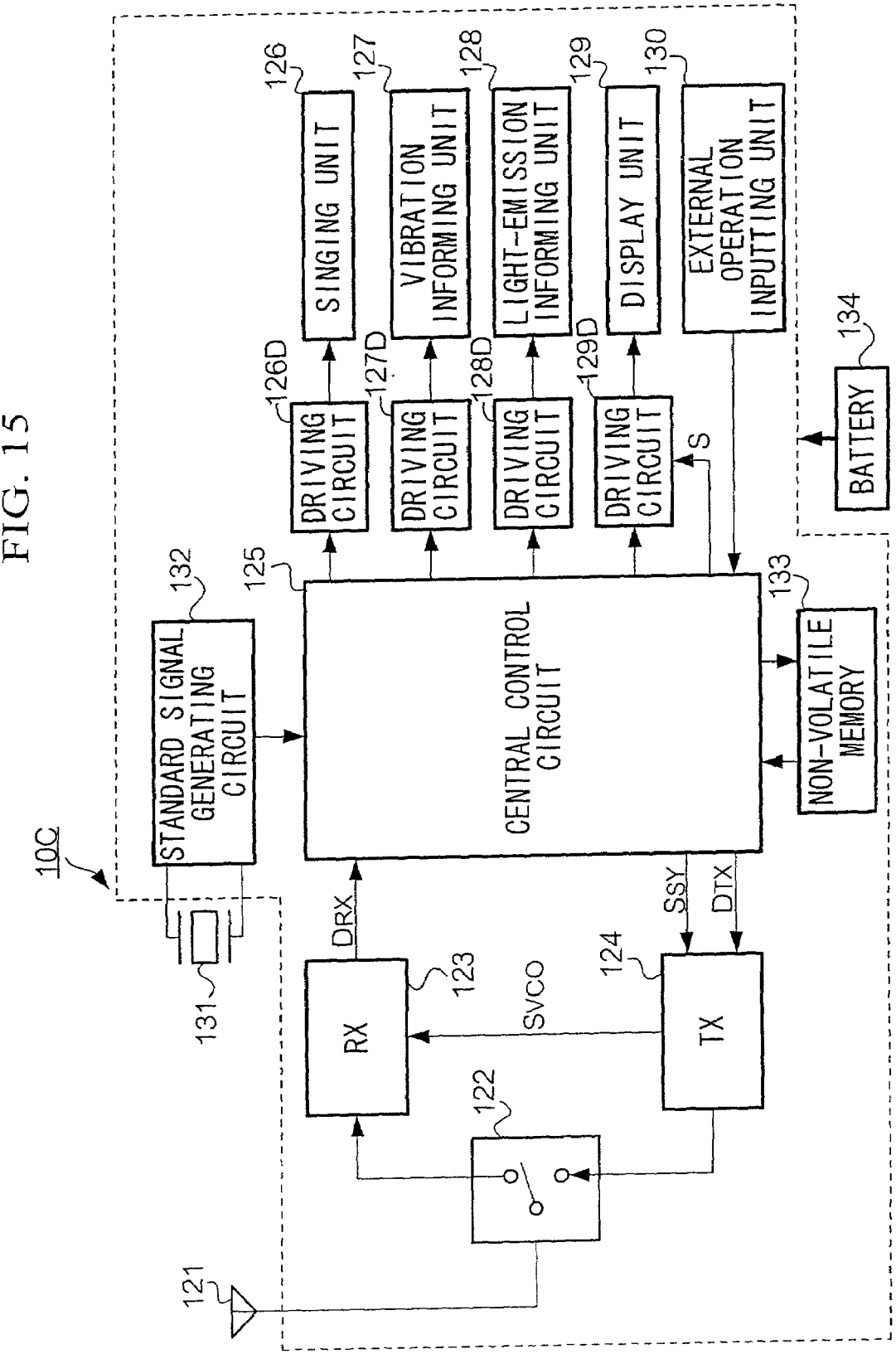
FIG. 15 is a block diagram showing a configuration of a wristwatch-type electronic device which is a fourth embodiment of the present invention.

FIG. 15 is a block diagram showing a configuration of a wristwatch-type electronic device 10C which is a fourth embodiment of the present invention. Like the wristwatch-type electronic device in the above first to fourth embodiments, the wristwatch-type electronic device 10C performs contactless data communication with an external transmitter-receiver provided with gate G as shown in FIG. 1. The external transmitter-receiver is configured basically in the same way as the external transmitter-receiver 90 as shown in the aforementioned FIG. 2. Therefore, the external transmitter-receiver that communicates with the wristwatch-type electronic device 10C will be hereinafter referred to as the external transmitter-receiver 90. Also, FIG. 2 will be referred to if necessary in describing the operation of the external transmitter-receiver 90.

As shown in FIG. 15, the wristwatch-type electronic device 10C comprises an antenna 121, a switching circuit 122, a receiving circuit 123, a transmitting circuit 124, and a central control circuit 125.

The switching circuit 122 is a device for selecting either an input terminal of the receiving circuit 123 or an output terminal of the transmitting circuit 124 to connect the selected terminal to the antenna 121. The receiving circuit 123 demodulates signal from the external transmitter-receiver 90 (refer to FIG. 1 and FIG. 2) received through the antenna 121 based on oscillation signal SVCO from the transmitting circuit 124, for output to the central control circuit 125 as receive data DRX. The transmitting circuit 124 modulates transmission data DTX input from the central control circuit 125 based on synthesizer control signal SSY input from the central control circuit 125, for output to the external transmitter-receiver 90 through the antenna 121.

The central control circuit 125 controls the entire wristwatch-type electronic device 10C.

Further, the wristwatch-type electronic device 10C comprises a singing unit 126, a driving circuit 126D, a vibration informing unit 127, a driving circuit 127D, light-emission informing unit 128, a driving circuit 128D, a display unit 129, a driving circuit 129D, an external operation inputting unit 130, an oscillator 131, a standard signal generating circuit 132, a non-volatile memory 133, and a battery 134.

The singing unit 126 is driven by the driving circuit 126D under the control of the central control unit 125 and informs a user of various situations by means of a buzzer or electric sound. The vibration informing unit 127 is driven by the driving circuit 127D under the control of the central control unit 125 and informs a user of various situations by means of vibration. The light-emission informing unit 128 is provided with light emitting elements such as light emitting diode (LED), driven by the driving circuit 128D under the control of the central control unit 125 and informs a user of various situations by means of light. The display unit 129 is composed of a liquid crystal display panel and others and displays various information driven by the driving circuit 129D under the control of the central control circuit 125. The external operation inputting unit 130 comprises buttons and a touch panel, by which a user performs various operations. The standard signal generating circuit 132 outputs various standard signal generated based on source oscillation signal generated by the oscillator 131. The non-volatile memory 133 comprises EEPROM or a flash memory and stores various data such as an identification number unique to the wristwatch-type electronic device 10C and receive data. The battery 134 supplies power to the wristwatch-type electronic device 10C.

While power for the wristwatch-type electronic device 10C is usually supplied from the battery 134, it is possible, in cases where data communication is performed with the external transmitter-receiver 90 (refer to FIG. 1 and FIG. 2) as in the case of conventional contactless IC cards, to rectify carrier wave (carrier signal) transmitted from the external transmitter-receiver 90 into driving power.

Further, in the central control circuit 125, it is possible to contain an encryption circuit for encrypting data if necessary.

[4.2] Configurations of Receiving Circuit and Transmitting Circuit

Figure 16:
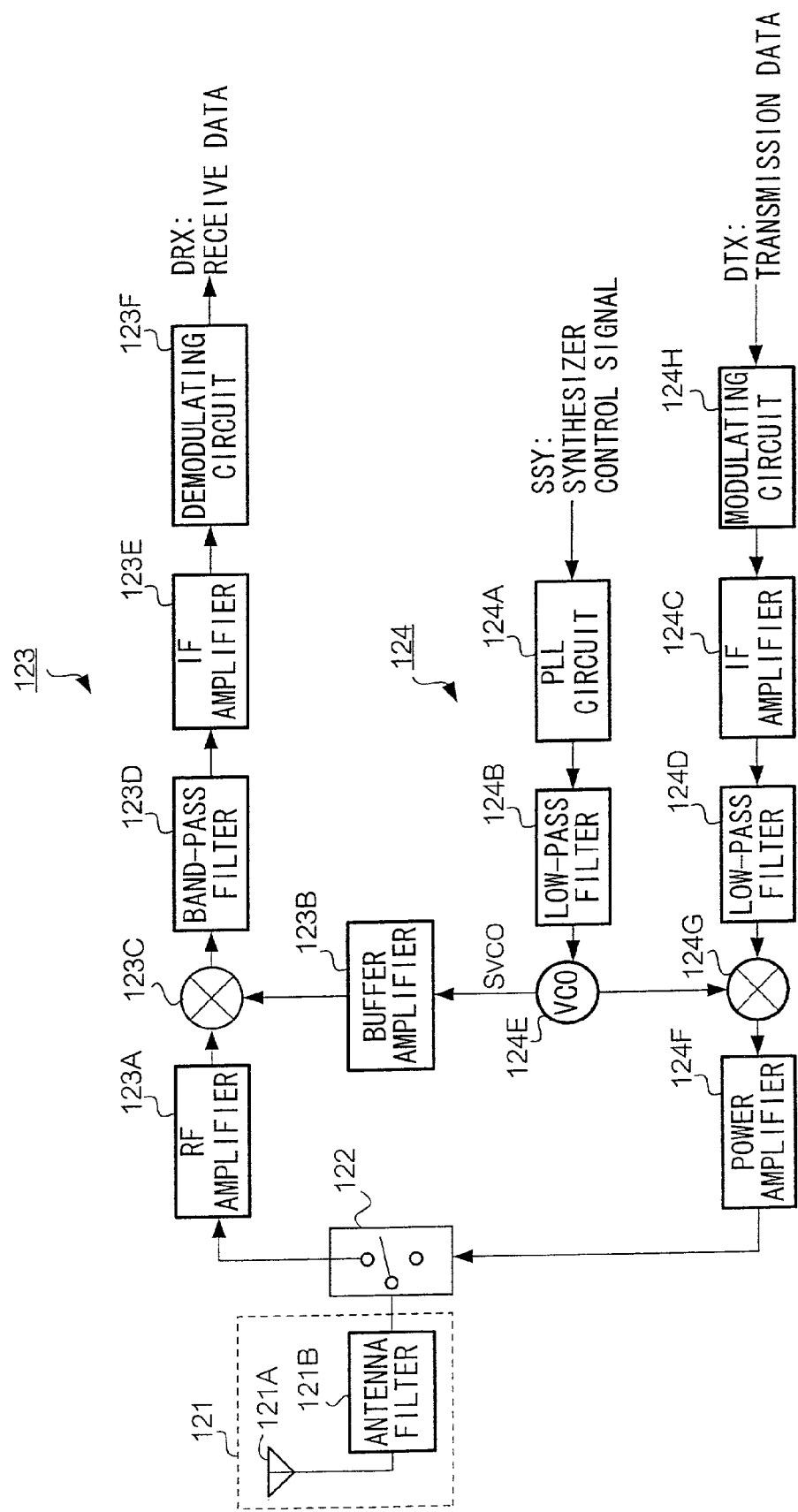
FIG. 16 is a block diagram showing a configuration of a receiving circuit and a transmitting circuit of the electronic device.

FIG. 16 is a block diagram showing a configuration of the antenna 121, the switching circuit 122, the receiving circuit 123 and the transmitting circuit 124. As shown in FIG. 16, the antenna 121 comprises an antenna body 121A and an antenna filter 121B. The antenna filter 121B eliminates unnecessary elements from receive signal of the antenna body 121A to output only the necessary elements to the receiving circuit 123. Further, the antenna filter 121B eliminates unnecessary elements from output signal from the transmitting circuit 124 to output only the necessary elements to the antenna body 121A.

At receiving circuit 123, an RF amplifier 123A amplifies high frequency of signal received by the antenna 121, for output to a mixer 123C. Oscillation signal SVCO is supplied to the mixer 123C from the transmitting circuit 124 through the buffer 123B. The mixer 123C mixes the oscillation signal SVCO with output signal of the RF amplifier 123A, for output to a band-pass filter 123D.

The band-pass filter 123D selects intermediate-frequency (IF) signal from among the output signal of the mixer 123C, for output to the IF amplifier 123E. The IF amplifier 123E amplifies the IF signal for output to the demodulating circuit 123F. The demodulating circuit 123F demodulates receive data DRX from the IF signal, for output to the central control circuit 125.

At the transmitting circuit 124, a phase-locked loop (PLL) circuit 124A, a low-pass filter 124B, and a voltage controlled oscillator (VCO) 124E constitute a circuit for generating the above-mentioned oscillation signal SVCO. The frequency of the oscillation signal SVCO is determined by synthesizer control signal SSY.

The modulating circuit 124H modulates carrier by transmission data DTX supplied from the central control circuit 125 to output IF signal. The IF signal is supplied to the mixer 124G through an IF amplifier 124C and a low-pass filter 124D. The mixer 124G mixes oscillation signal SVCO from the VCO 124E with the IF signal to output high-frequency signal. The high-frequency signal is amplified by a power amplifier 124F to be supplied to the antenna 121 through the switching circuit 122.

[4.3] Configuration of Display Unit and its Peripherals

Figure 17A:
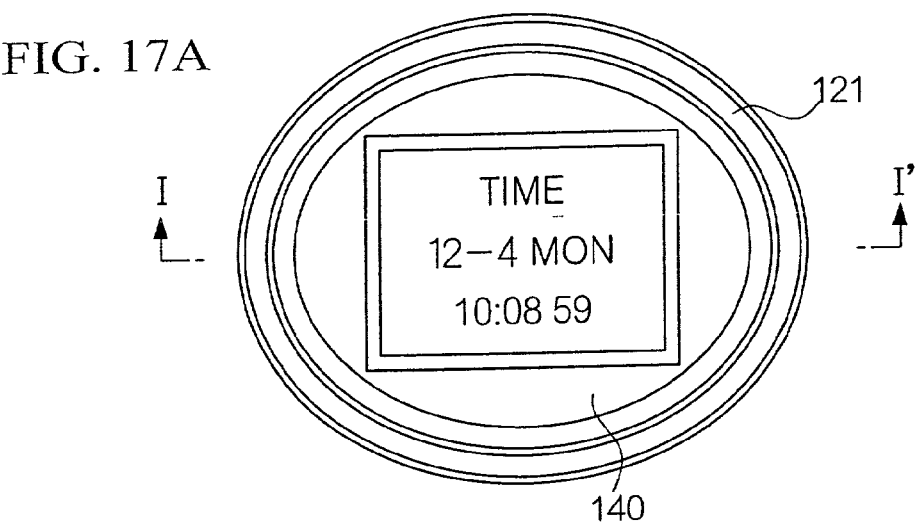
FIG. 17A is a plan view showing a configuration of modules inside the electronic device.
Figure 17B:
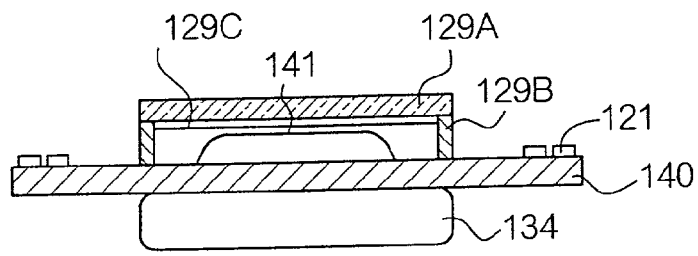
FIG. 17B is a section along the line I–I' of FIG. 17A.

FIG. 17A is a plan view showing the display unit and its peripherals accommodated in a wristwatch-type electronic device. FIG. 17B is a section along the line I–I' of FIG. 17A.

A circuit board 140 is fixed inside the wristwatch-type electronic device as shown. Among the two side of the circuit board 140, an IC chip 141 is mounted on the side with a watch dial (hereinafter will be referred to as front side), and a battery 134 is positioned on the back side. The IC chip 141 contains a receiving circuit 123, a transmitting circuit 124, a central control circuit 125, driving circuits 126D, 127D, 128D, 129D, a non-volatile memory 133, and others, to which power voltage is supplied from the battery 134. A liquid crystal display panel 129A, a display unit, is fixed so as to face the front side of the circuit board 140. The liquid crystal display panel 129A is connected with the circuit board 140 through a continuity terminal 129B. Further, an electroluminescent (EL) sheet 129C for backlighting the liquid crystal display panel 129A is positioned on the back side thereof. On the front side of the circuit board 140, a loop antenna 121 has been placed to form a loop around the liquid crystal display panel 129A.

In the present embodiment, the loop antenna 121 is provided on the front side (the side with a watch dial) of the circuit board 140. In other words, both the liquid crystal display panel 129A and the loop antenna 121 are placed on the front side of the circuit board 140, inevitably causing the antenna and the external transmitter-receiver 90 to be placed adjacent to each other. This is because it is required to bring the antenna as close as possible to the external transmitter-receiver 90 due to a small communication range thereof, as mentioned already.

Furthermore, the loop antenna 121 is placed so as to surround the liquid crystal display panel 129A because the larger the loop area is, the higher antenna gain can be achieved. It is better if the loop antenna 121 is placed as close as possible to the rim of the wristwatch-type electronic device 10C.

The number of turns for the loop antenna 121 is about several turns when the short-wave frequency band of 13.56 [MHz] is used for communication, and about several tens of turns when the long-wave frequency band of 125 [kHz] or 134 [kHz] is used.

Figure 18A:
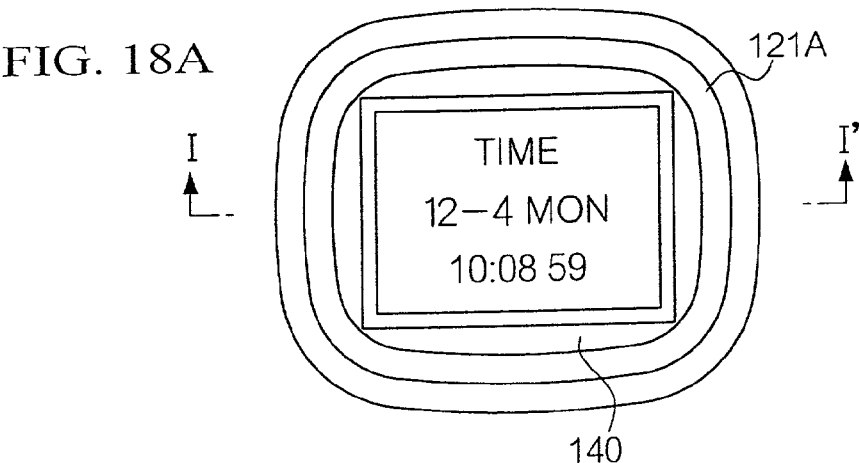
FIG. 18A is a plan view showing another configuration of modules inside the electronic device.
Figure 18B:
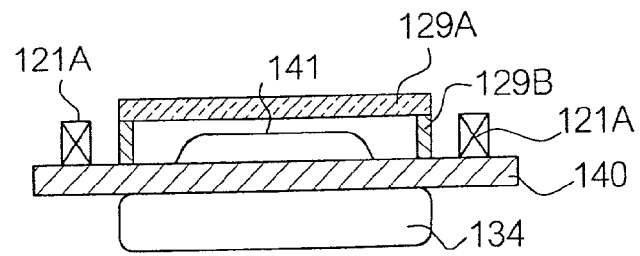
FIG. 18B is a section along the line I–I' of FIG. 18A.

Thus, the number of turns should be several tens of turns when using the long-wave frequency band. However, the area of the circuit board 140 is too small to form a copper pattern on the circuit board 140 so as to configure a loop antenna of several tens of turns. Therefore, in the case of using high-wave band, a solenoid loop antenna 121A will be configured by winding a copper wire and the like several tens of turns perpendicular to the diameter of the loop as shown in FIG. 18A and FIG. 18B.

[4.4] Operation of the Fourth Embodiment

Figure 19:
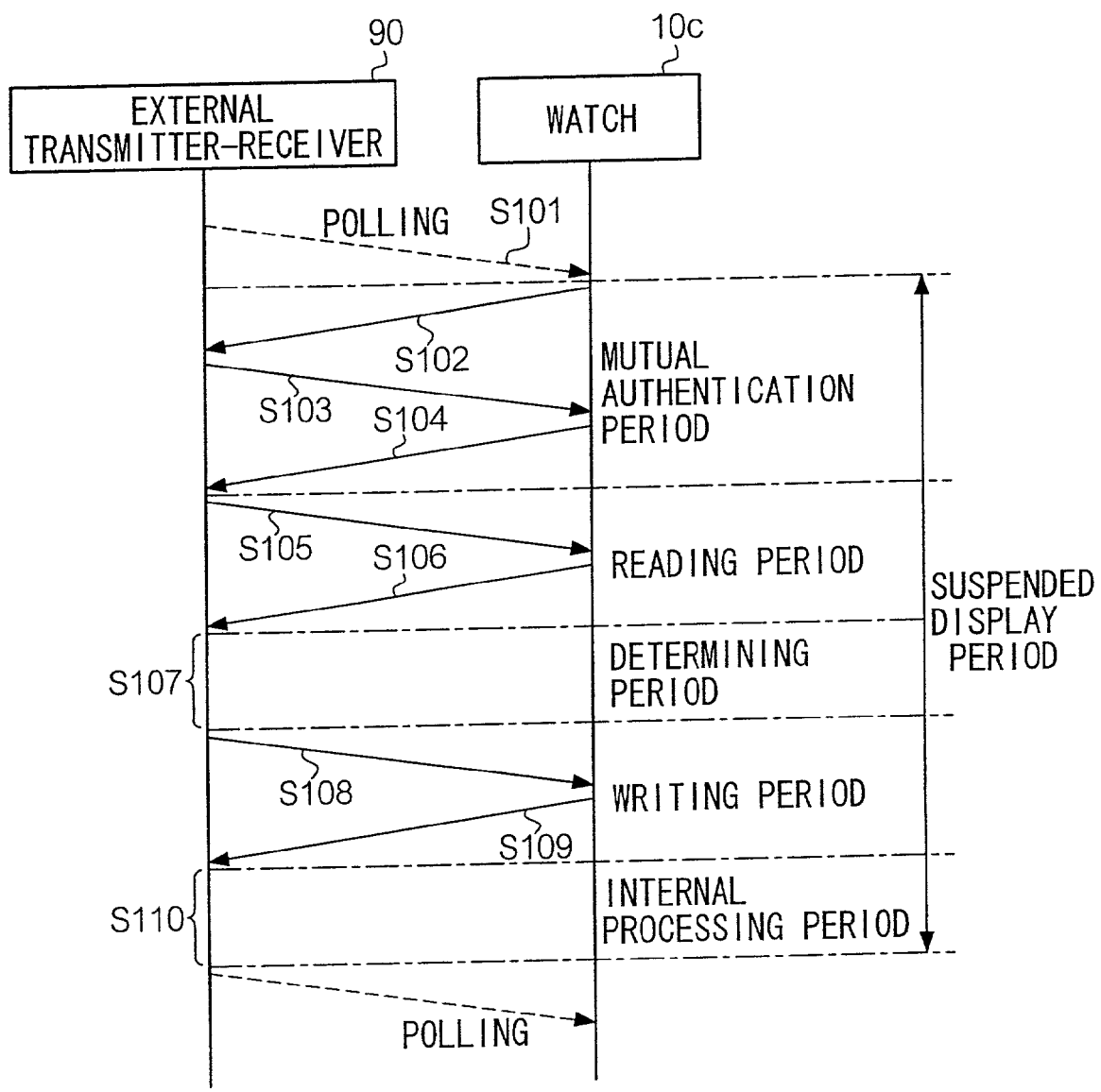
FIG. 19 is a sequence diagram showing a procedure of data communication between the electronic device and an external transmitter-receiver.

FIG. 19 is a sequence diagram showing a procedure of data communications between the wristwatch-type electronic device 10C and the external transmitter-receiver 90 with respect to the present embodiment.

As shown in FIG. 19, the external transmitter-receiver 90 repeatedly transmits polling signal (communication request) at a predetermined cycle through an asynchronous protocol (step S101). To be more concrete, the control unit 93 of the external transmitter-receiver 90 causes the transmitting circuit 94 to generate polling signal and keeps transmitting the polling signal through the high-frequency circuit 96 and the antenna 97. When the wristwatch-type electronic device 10C enters a communication range of the external transmitter-receiver 90 and receives the polling signal, it suspends a display operation to start a communication and transmits data for mutual authentication to the external transmitter-receiver 90 (step S102).

The procedure then advances to the mutual authentication period; the external transmitter-receiver 90 detects that the wristwatch-type electronic device 10C has entered in its own communication range and transmits data for mutual authentication to the wristwatch-type electronic device 10C (step S103).

The wristwatch-type electronic device 10C, upon receiving the data for mutual authentication from the external transmitter-receiver 90, transmits to the external transmitter-receiver 90 response data to the effect that the mutual authentication has completed (step S104).

After this, the procedure advances to a reading period, in which the external transmitter-receiver 90 transmits read request data so as to read data from the wristwatch-type electronic device 10C (step S105).

Having received the request, the wristwatch-type electronic device 10C reads data from a memory address of the non-volatile memory 133 corresponding to the read request data to transmit the data to the external transmitter-receiver 90 (step S106).

The procedure then proceeds to a determining period, in which the external transmitter-receiver 90 identifies from the transmitted data a data type such as train tickets or prepaid cards, expiration, and the like to determine whether the requested transaction is possible (step S107).

Then, the procedure advances to a writing period, where the external transmitter-receiver 90 transmits to the wristwatch-type electronic device 10C data such as remaining value that need to be updated (step S108).

Having received the data, the wristwatch-type electronic device 10C transmits to the external transmitter-receiver 90 response data to the effect that it has received the data (step S109), and the communication ends.

The procedure then transfers to an internal processing period, and the wristwatch-type electronic device 10C writes data such as remaining value that need to be updated into a corresponding memory address of the non-volatile memory 133. The external transmitter-receiver 90 confirms that the data transfer to the wristwatch-type electronic device 10C is completed to prepare itself for a next polling process (step S110).

The display operation of the wristwatch-type electronic device 10C remains suspended throughout the procedure during the periods of the mutual authentication, reading, determining, writing, and internal processing. When the internal processing period ends, the display operation is resumed in the wristwatch-type electronic device 10C.

Figure 20:
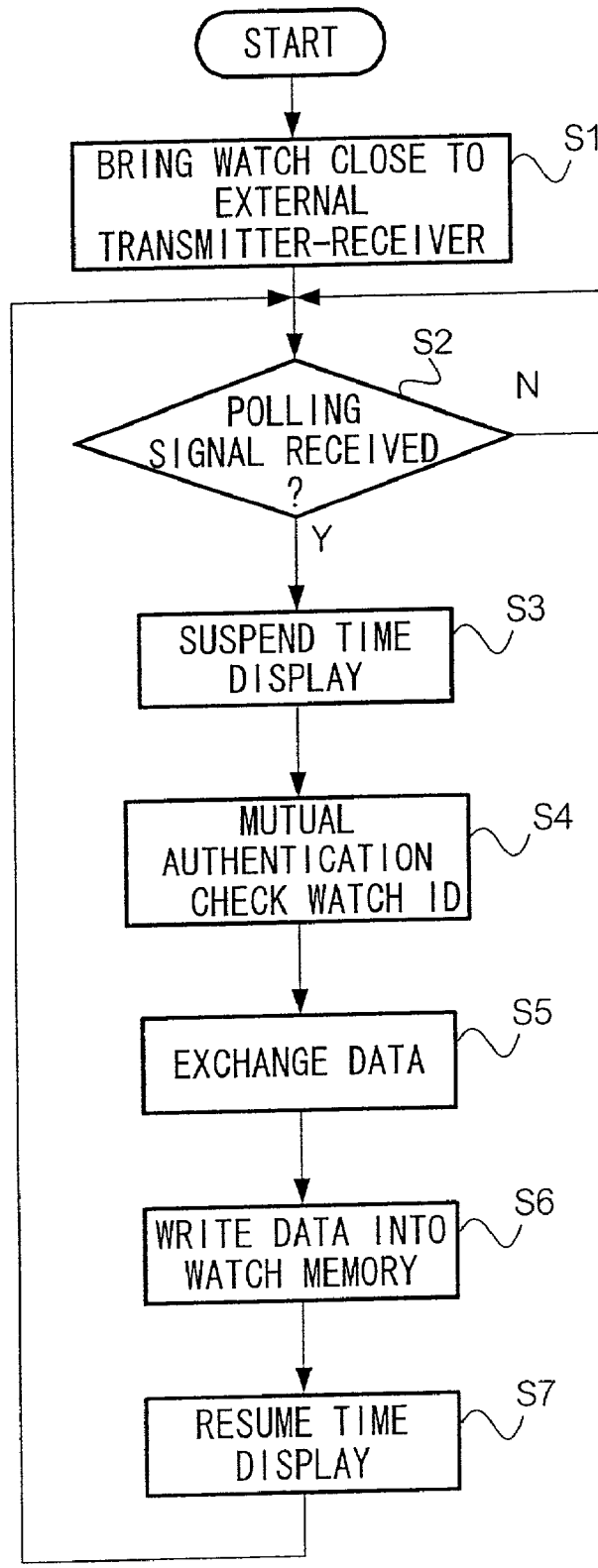
FIG. 20 is a flow chart showing an operation of the electronic device.

FIG. 20 is a flow chart showing operational examples of the present embodiment further in detail.

The wristwatch-type electronic device 10C constantly monitors for polling signal from the antenna 97 of the external transmitter-receiver 90 (step S2). When the wristwatch-type electronic device 10C is out of the communication range of the external transmitter-receiver 90 and does not receive polling signal, a display operation is performed on the liquid crystal display panel 129A. The diagram of waveform shown in the left half portion of the FIG. 21 shows the waveform of driving signal which drives the liquid crystal display panel 129A by a static drive system in order to perform a display operation.

When the static driving operation is being performed, control signal S is at level "L", and the voltage waveform of a common electrode that is output from the driving circuit 129D is a rectangular-pulse waveform which changes between 0[V] and E[V]. On the other hand, the voltage waveform of a segment electrode is also a rectangular-pulse waveform which changes between 0[V] and EM, but is 180 degrees out of phase from the voltage waveform of the common electrode. Therefore, the voltage waveform of a voltage applied across the common and the segment electrode is a rectangular-pulse waveform which changes between −E[V] and +E[V] as shown in the figure, thereby lighting segments of the liquid crystal display panel 129A to display a time. In other words, in the case of static driving, segments are lighted when the potential difference applied across the common and the segment electrode is equal to or larger than a predetermined potential difference. In this case, alternating waveform is applied as shown in FIG. 21 because continuous application of direct voltage to liquid crystal causes electrochemical reaction, thereby deteriorating the characteristics of the liquid crystal. However, the application of alternating waveform causes electromagnetic noises from the charge/discharge current of the liquid crystal display panel 129A or a boosting circuit contained in the driving circuit 129D. If a data communication is performed when such a noise is taking place, the data communication is adversely affected by the noise.

Returning to the description of the flow chart shown in FIG. 20, the user brings the dial of the wristwatch-type electronic device 10C close to the loop antenna 97 (refer to FIG. 2) in passing gate G (refer to FIG. 1)(step S1). When the wristwatch-type electronic device 10C enters the communication range of the external transmitter-receiver 90, polling signal therefrom being transmitted, the polling signal is input to the receiving circuit 123 through the antenna body 121A, the antenna filter 121B, and the switching circuit 122 (refer to FIG. 16) of the wristwatch-type electronic device 10C. When the polling signal is normally received by the receiving circuit 123, receive data DRX corresponding to the polling signal being output to the central control circuit 125, the central control circuit 125 determines that it has received the polling signal (step S2; YES) and changes control signal S that is output to the driving circuit 129D to level "H", thereby suspending a time display operation (step S3).

Figure 21:
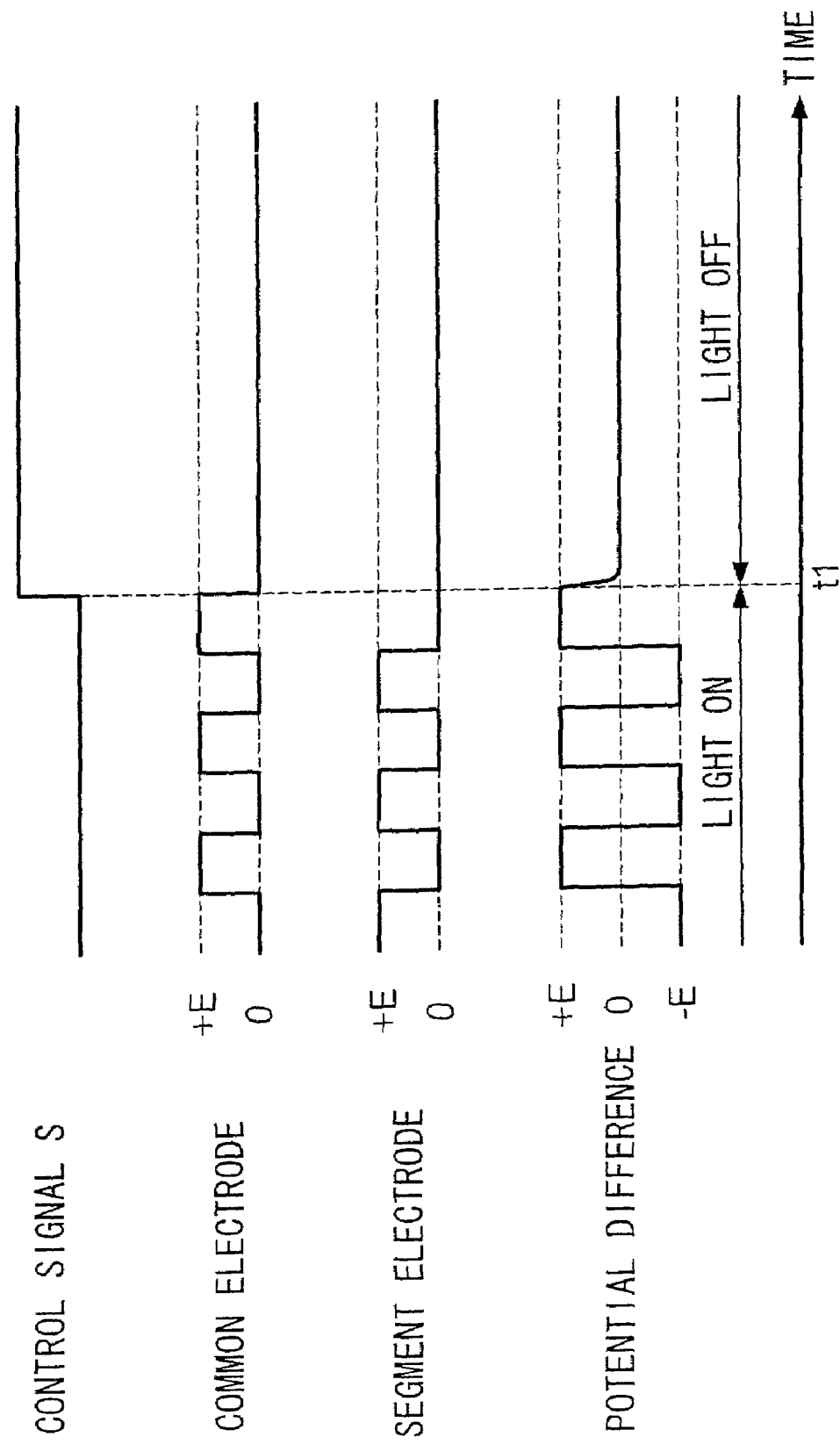
FIG. 21 is a diagram showing waveforms of driving signal which drives a liquid crystal display panel of the electronic device by a static drive system.

FIG. 21 shows changes in the driving signal waveform of the liquid crystal display panel 129A in a case where the operation of changing the control signal S from level "L" to "H" is performed at time t1. As shown in the right half portion of FIG. 21, since when the control signal S is made level "H", the voltage waveform of the common electrode output from the driving circuit 129D is 0[V], so is the voltage waveform of the segment electrode. As a result, the potential difference of voltage applied across the common and the segment electrode disappears, thereby stopping the time display of the liquid crystal display 129A. However, the timekeeping operation is maintained by the central control circuit 125 even when the time display has been suspended with the lighting of the liquid crystal display panel 129A shutoff.

Returning to FIG. 20, after the display at the liquid crystal display panel 129A is suspended, the wristwatch-type electronic device 10C performs mutual authentication between itself and the external transmitter-receiver 90, and the external transmitter-receiver 90 confirms an ID number NID of the wristwatch-type electronic device 10C (step S4).

To illustrate, the control unit 93 of the external transmitter-receiver 90 requests the wristwatch-type electronic device 10C to transmit the ID number NID of the wristwatch-type electronic device 10C.

In other words, the control unit 93 of the external transmitter-receiver 90 transmits ID information requesting signal as transmit signal through the transmitting circuit 94, the high-frequency circuit 96, and the antenna 97.

On the other hand, in the wristwatch-type electronic device 10C, the ID information requesting signal is input to the receiving circuit 123 through the antenna body 121A and the antenna filter 121B of the antenna 121, and the switching circuit 122. When receive data DRX corresponding to the ID information requesting signal is output from the receiving circuit 123, the central control circuit 125 reads the ID number NID from the non-volatile memory 133, before outputting transmission data DTX corresponding to the ID number NID to the modulating circuit 124H and synthesizer control signal SSY to the PLL circuit 124A (refer to FIG.

16). As a result, response signal corresponding to the ID number NID is output from the power amplifier 124F (FIG. 16), being transmitted as transmission signal to the external transmitter-receiver 90 through the switching circuit 122 and the antenna 121.

When the ID number NID is confirmed at the external transmitter-receiver 90, data is exchanged in the same procedure as the above, the data being required for identifying incoming and outgoing users (step S5). When the data exchange is completed, the central control circuit 125 writes in the non-volatile memory 133 necessary changes in flag and data of remaining value of the prepaid card (step S6).

When the data writing is completed, the central control circuit 125 changes the control signal S again to level "L" so as to light the liquid crystal display panel 129A (step S7). As already described, the timekeeping operation is maintained even when the time display is suspended with the lighting of the liquid crystal display panel 129A shutoff. Therefore, when a display operation is resumed, a precise time appears on the display right away.

The access to the gate is thus controlled, and in this example it is less than about 200 milliseconds required for the series of the procedure from the receiving of polling signal to the writing of data to the non-volatile memory of the wristwatch-type electronic device, thereby causing no practical trouble.

While power is supplied from a battery only during the period when a receiving and a transmitting circuit of the wristwatch-type electronic device performs a contactless data communication with an external transmitter-receiver in the present embodiment, it is possible to constantly supply power from the battery to the receiving and the transmitting circuit.

[4.5] Effects of the Embodiment

In the present embodiment, the suspension of a display operation at the display portion during data communication prevents the noise that adversely affects the data communication from occurring. Therefore, it is possible to inhibit the deterioration of communication sensitivity and the decrease of a communication range, thereby enabling to prevent communication errors.

[4.6] Modifications

Figure 22:
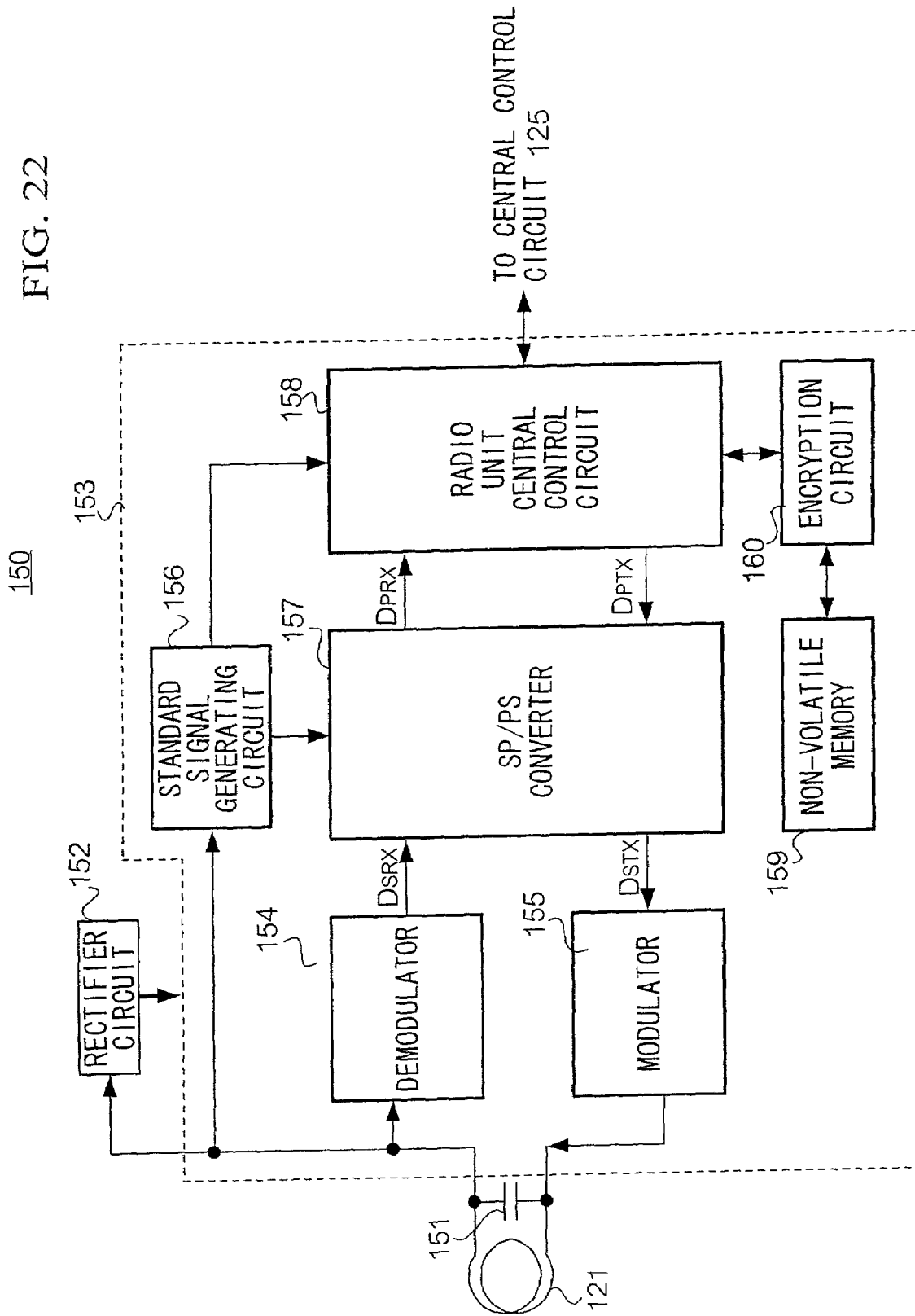
FIG. 22 is a block diagram showing a configuration of a modification of the embodiment.

FIG. 22 is an example of a modification of the fourth embodiment.

The present modification differs from the embodiment in FIG. 15 in that the driving power for an IC card function unit for implementing a contactless IC card function is acquired by rectifying carrier from an external transmitter-receiver and that an encryption processing circuit for encrypting data is provided.

The IC card function unit 150 comprises an antenna 121, a tuning capacitor 151, a rectifier circuit 152, a demodulator 154, a modulator 155, a standard signal generating circuit 156, a parallel/serial bi-directional converter (SP/PS converter)157, a radio unit central control circuit 158, a non-volatile memory 159, and an encryption processing circuit 160.

The antenna 121 is a loop antenna. The tuning capacitor 151 functions as a tank circuit in cooperation with the antenna 121. The rectifier circuit 152 rectifies carrier received from the external transmitter-receiver 90 for supply as power to the supplied power unit 153.

The demodulator 154 demodulates digital modulated receive signal input through the antenna 121 and outputs the demodulated receive signal as serial format receive data DSRX to the parallel/serial bi-directional converter 157.

The modulator 155 modulates serial format transmission data DSTX input from the parallel/serial bi-directional converter 157 (as will be described hereinafter) into digital signal and transmits the signal to the external transmitter-receiver 90 through the antenna 121.

The standard signal generating circuit 156 generates standard signal (standard clock signal) synchronized to carrier and outputs the generated standard signal to the parallel/serial bi-directional converter 157 and the radio unit central control circuit 158.

The parallel/serial bi-directional converter 157 converts receive signal DSRX from serial to parallel format for output as parallel-format receive data to the radio unit central control circuit 158. The converter 157 also converts the parallel-format transmission data DPTX input from the radio unit central control circuit 158 into data in serial format for output as serial format transmission data DSTX to the modulator 155.

The radio unit central control circuit 158 controls the entire IC card function unit 150 and exchanges various data including receive data DRX and transmission data DTX between itself and the central control circuit 125.

The non-volatile memory 159 stores various data.

The encryption processing circuit 160 encrypts various data input from the radio unit central control circuit 158 before storing the data in the non-volatile memory 159, and reads out data to be processed by the radio unit central control circuit 158 from the non-volatile memory 159 and decrypts the data for output.

Next, an operation of the present modification will be described.

The rectifier circuit 152 of the IC card function unit 150 rectifies carrier received from the external transmitter-receiver 90 for supply as power to the supplied power unit 153. As a result, the supplied power unit 153 starts operating.

When the power is supplied, the standard signal generating circuit 156 generates standard signal (standard clock signal) for output to the parallel/serial bi-directional converter 157 and the radio unit central control circuit 158.

Further, the demodulator 154 demodulates polling signal (communication requesting signal) that are transmitted as induction field from the external transmitter-receiver 90 and have been digital modulated by modulation methods such as an amplitude shift keying (ASK) and a frequency shift keying (FSK), for output to the parallel/serial bi-directional converter 157 as serial format receive data DSRX.

The parallel/serial bi-directional converter 157 converts receive data DSRX from a serial to a parallel format based on the input standard signal and outputs as parallel format receive data DPRX to the radio unit central control circuit 158.

The radio unit central control circuit 158, upon receiving receive data DPRX corresponding to the polling signal, performs mutual authentication between itself and the external transmitter-receiver 90 through the parallel/serial bi-directional converter 157, the modulator 155, the antenna 121, and the demodulator 154, before reading data through the encryption processing circuit 160 from a memory address of the non-volatile memory 159 specified by the external transmitter-receiver 90. In this case, because the subject data are to be transmitted to the external transmitter-receiver 90, the encryption processing circuit 160 does not perform decryption.

The read data are synchronized to the standard signal by the radio unit central control circuit 158 and output to the parallel/serial bi-directional converter 157 as transmission data DPTX.

The parallel/serial bi-directional converter 157 converts transmission data DPTX from a parallel to a serial format and outputs to the modulator 155 as serial format transmission data DSTX.

The modulator 155 has a tank circuit consisting of the antenna 121 and the tuning capacitor 151. The resonance frequency of the tank circuit is controlled by transmission data DSTX. This control of frequency causes signal that is PSK-modulated by the transmission data DSTX to be output from the modulator 155 and transmitted through the antenna 121.

[5] Fifth Embodiment

Next, a fifth embodiment of the present invention will be described.

In the present embodiment, a configuration of an entire data communication system is basically same as each of the above embodiments, except that the external transmitter-receiver PSK modulates carrier by transmission data and transmits the modulated carrier to the wristwatch-type electronic device and that the receive signal from the wristwatch-type electronic device is ASK modulated so as to recover receive data.

[5.1] Summary of Configuration

Figure 23:
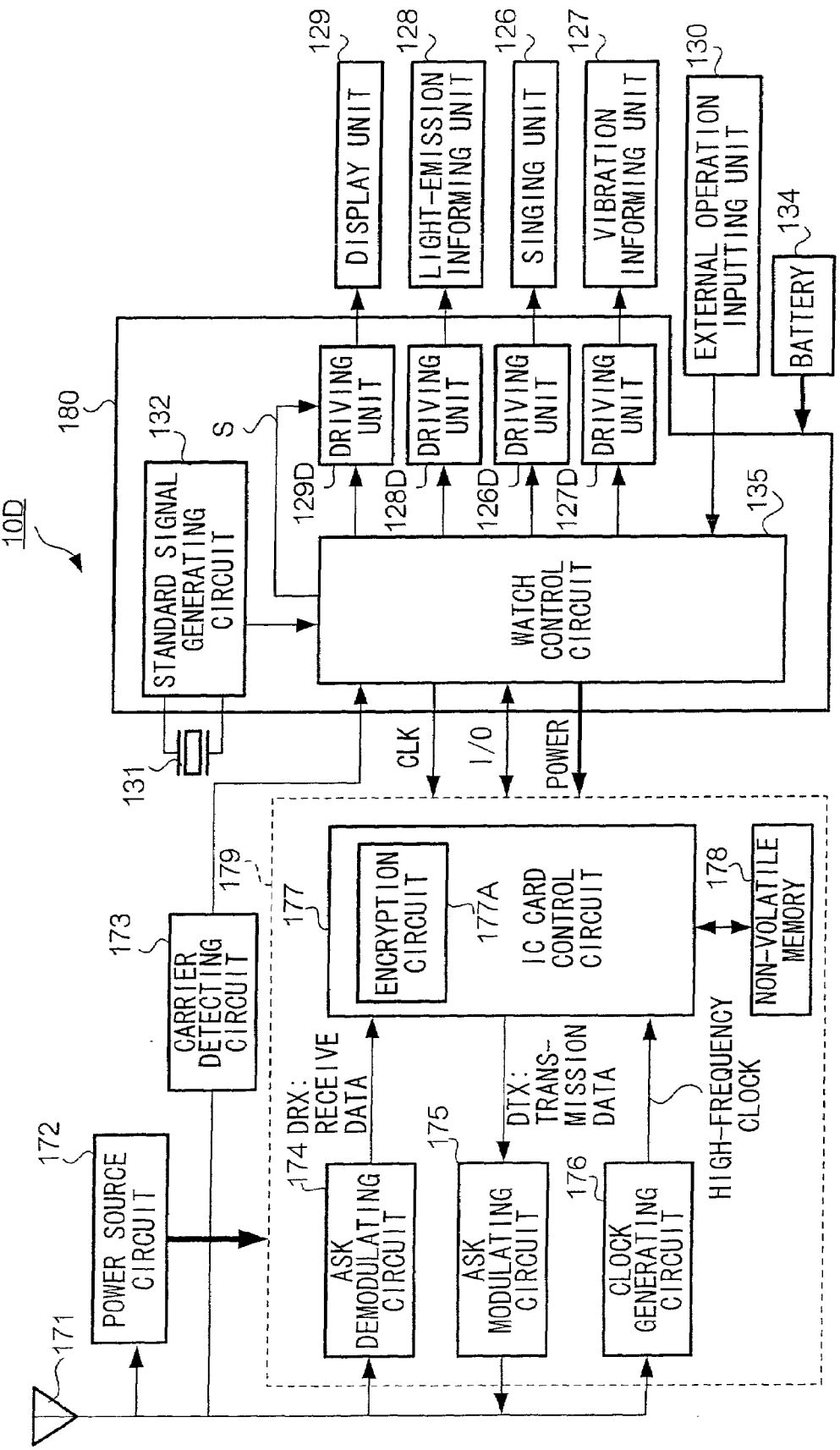
FIG. 23 is a block diagram showing a configuration of a wristwatch-type electronic device which is a fifth embodiment of the present invention.

FIG. 23 is a block diagram showing a configuration of a wristwatch-type electronic device 10D with respect to the present invention. The wristwatch-type electronic device 10D comprises an antenna 171, a power circuit 172, a carrier detecting circuit 173, an amplitude shift keying (ASK) demodulating circuit 174, an ASK modulating circuit 175, a clock generating circuit 176, an IC card controlling circuit 177, and a non-volatile memory 178.

The power circuit 172 rectifies high-frequency current that flows through the antenna 171 when receiving, and supplies it as driving power for transmitting and receiving operations of an IC card unit 179.

The carrier detecting circuit 173 detects for incoming carrier of a predetermined frequency, that is, whether any transmission is made to the wristwatch-type electronic device 10D.

The ASK demodulating circuit 174, the ASK modulating circuit, the clock generating circuit 176, and the non-volatile 178 constitute the IC card unit 179.

The ASK demodulating circuit 174 demodulates receive data DRX out of receive signal of the antenna 171 for output. The ASK modulating circuit 175 ASK modulates carrier of a predetermined frequency by transmission data DTX, and outputs the modulated carrier as transmission signal. The clock generating circuit 176 generates high-frequency clock signal from the received wave carrier for output.

The IC card controlling circuit 177 controls the entire IC card unit 179. The IC card controlling circuit 177 is also provided with an encryption circuit 177A, by which encrypted receive data are decrypted and transmission data are encrypted.

The non-volatile memory 178 stores various data in a non-volatile manner. For the sake of security, data having monetary value and significant data are stored as-encrypted, those data being decrypted at the encryption circuit 177A only when processed.

Further, the wristwatch-type electronic device 10D comprises a singing unit 126 and its driving circuit 126D, a vibration informing unit 127 and its driving circuit 127D, a light emission informing unit 128 and its driving circuit 128D, a display unit 129 and its driving circuit 129D, an external operation inputting unit 130, an oscillator 131, a standard signal generating circuit 132, a battery 134, and a watch control circuit 135.

The driving circuits 126D, 127D, 128D, and 129D, and the standard signal generating circuit 132, and the watch control circuit 135 constitute an informing/timekeeping control unit 180.

The singing unit 126 is driven by the driving circuit 126D under the control of the watch control circuit 135 and informs a user of the state of the wristwatch-type electronic device 10D by a buzzer or an electronic beeper.

The vibration informing unit 127 is driven by the driving circuit 127D under the control of the watch control circuit 135 and informs a user of the state of the wristwatch-type electronic device 10D by vibration.

The light emission informing unit 128 is driven by the driving circuit 128D under the control of the watch control circuit 135 and informs a user of the state of the wristwatch-type electronic device 10D by light.

The display unit 129 is driven by the driving circuit 129D under the control of the watch control circuit 135 and displays various information.

The external operation inputting unit 130 is for users' performing various operations and informs the state of an operation to the watch control circuit 135.

The standard signal generating circuit 132 generates various standard signal based on the oscillation signal generated by an oscillator 131 and outputs the signal to the watch control circuit 135.

The battery 134 supplies driving power to the informing/timekeeping control unit 180, the singing unit 126, the vibration informing unit 127, the light emission informing unit 128, the display unit 129, and the external operation inputting unit 130.

[5.2] Operation of the Embodiment

Next, an operation of the fifth embodiment will be described. The operation of the present embodiment follows the flow chart shown in FIG. 20 as in the above fourth embodiment.

The watch control circuit 135 of the wristwatch-type electronic device 10D, by always monitoring whether carrier is detected by the carrier detecting circuit 173, determines whether it has received polling signal transmitted from the external transmitter-receiver 90 by an asynchronous protocol (step S2). In cases where the wristwatch-type electronic device 10D is away from gate G, so that the wave from the external transmitter-receiver 90 does not reach the wristwatch-type electronic device 10D, the result of the determination in step S2 turns to be "NO" and the determination is repeated. At this time, the wristwatch-type electronic device 10D is in a standby state and performing a time display operation. Further, when the wave from the external transmitter-receiver 90 does not reach the wristwatch-type electronic device 10D, power is not supplied to the IC card unit 179 of the wristwatch-type electronic device 10D.

Then, when a user passes gate G (refer to FIG. 1) and brings the dial side of the wristwatch-type electronic device 10D close to the loop antenna 97 (FIG. 2) of an external transmitter-receiver 90 (step S1), the wristwatch-type electronic device 10D enters the communication range of the external transmitter-receiver 90. As a result, polling signal from the external transmitter-receiver 90 is received by the antenna 171, and a result of the determination at step S2 turns out "YES". The watch control circuit 135 thereby changes control signal S to be output to the driving circuit 129D to level "H" and stops time display (step S3). Further, when the wristwatch-type electronic device 10D enters the communication range of the external transmitter-receiver 90, high-frequency current that flows through the antenna 171 by receiving data from the external transmitter-receiver 90 is rectified by the power circuit 172, and power obtained as a result thereof is supplied to the IC card unit 179. The IC card unit 179 operates on the power and performs data communication with the external transmitter-receiver 90 as follows.

First of all, the external transmitter-receiver 90 and the IC card unit 179 perform mutual authentication, and the external transmitter-receiver 90 confirms the ID number NID of the IC card unit 179 (step S4).

To be more concrete, the control unit 93 of the external transmitter-receiver 90 transmits an ID information requesting signal for requesting the ID number NID of the IC card unit 179 through the transmission circuit 94, the high-frequency circuit 96, and the antenna 97 (refer to FIG. 2).

The power circuit 172 of the wristwatch-type electronic device 10D rectifies alternating current that flows through the antenna 171 when receiving the signal, for supply to the IC card unit 179.

The ASK demodulating circuit 174 demodulates the ID information requesting signal and outputs receive data DRX corresponding thereto to the IC card control circuit 177. The IC card control circuit 177 reads an ID number NID from the non-volatile memory 178, and outputs to the ASK modulating circuit 175 transmission data DTX corresponding to the ID number NID. The ASK modulating circuit 175 performs amplitude modulation of the transmission data DTX and transmits response signal corresponding the ID number NID as transmission signal through the antenna 171 to the external transmitter-receiver 90.

When the ID number NID is identified at the external transmitter-receiver 90, data is exchanged in the same procedure as the above, the data being actual data required for identifying incoming and outgoing users (step S5).

When the data exchange is completed, the central control circuit 125 writes necessary changes in flag and data of remaining values of the prepaid card after the used amount is deducted in the non-volatile memory 178 (step S6). When the data writing is completed, the IC card control circuit 177 enters a standby state.

Because no more carrier is detected by the carrier detector 173 once the data exchange is completed, the watch control circuit 135 changes the control signal S again to level "L" so as to light the liquid crystal display panel 129A (step S7).

Then, the watch control circuit 135 supplies power and clock signal CLK with the IC card unit 179, reads data updated along with the data exchanges from the non-volatile memory 178 through the IC card control circuit 177 and stores them in a RAM (not shown). Then, the watch control circuit 135 controls the driving circuit 129D based on the read data and displays the updated data on the display unit 129.

[5.3] Effects of the Embodiment

As described above, also in the present embodiment, the suspension of a display operation at the display portion during a data communication prevents the noise from the display portion from affecting the data communication. Therefore, it is possible to inhibit the deterioration of communication sensitivity and the decrease of a communication range, thereby enabling to prevent communication errors.

Also, data exchanges at the IC card unit are performed utilizing power of waves transmitted from the external transmitter-receiver 90, thereby minimizing power consumption and extending the operating life of the wristwatch-type electronic device.

[5.4] Modifications of the Fifth Embodiment

[5.4.1] First Modification

While in the above description the device is configured to detect through the carrier detecting circuit 173 that the IC card unit 179 is exchanging data and displaying the updated data at the display unit, it is possible to configure the device to supply power to the IC card unit 179 only when a data display button on the external operation inputting unit 130 is operated and reading data from the non-volatile memory 178 for display.

[5.4.2] Second Modification

In the above description, the device is configured to detect through the carrier detecting circuit 173 that the IC card unit 179 is exchanging data. However, instead of such a configuration, it is possible to configure in such a way as to transmit some kind of electric signal to the watch control circuit 135 from the IC card control circuit 177 through a signal line (I/O) when IC card control circuit 177 starts operating, wherein the watch control circuit 135 detects the start of the operation of the IC card control circuit 177 by a change in the voltage level of the signal line (I/O), thereby suspending a display operation. According to this configuration, the provision of the carrier detecting circuit 173 is no more necessary, thus enabling the simplification of the circuit configuration. Also in this case, it is possible to supply power to the IC card unit 179 only when a data display button on the external operation inputting unit 130 is operated and to read data from the non-volatile memory 178 for display.

[5.4.3] Third Modification

A third modification and the following modifications can be applied not only to the fifth embodiment but also to the fourth embodiment.

In the above embodiment, since data communication is performed with the wristwatch-type electronic device on the arm, a user cannot see the display unit 129 at the timing when time display disappears, but causing no inconvenience to the user. For this reason, the time display is set to be resumed after the writing of data into the non-volatile memory is completed.

However, in a system such that there are so much data that time for data exchange becomes too long, it is possible to configure the device in such a way that the time display is resumed before data are written into the non-volatile memory.

[5.4.4] Fourth Modification

In the above description, the time display is suspended until all the data exchanges and the writing of the data into the memory are completed. However, in such a system where there are so much data communication that the time for exchanging data becomes too long, it is possible to alternately repeat data communication and time display.

Figure 24:
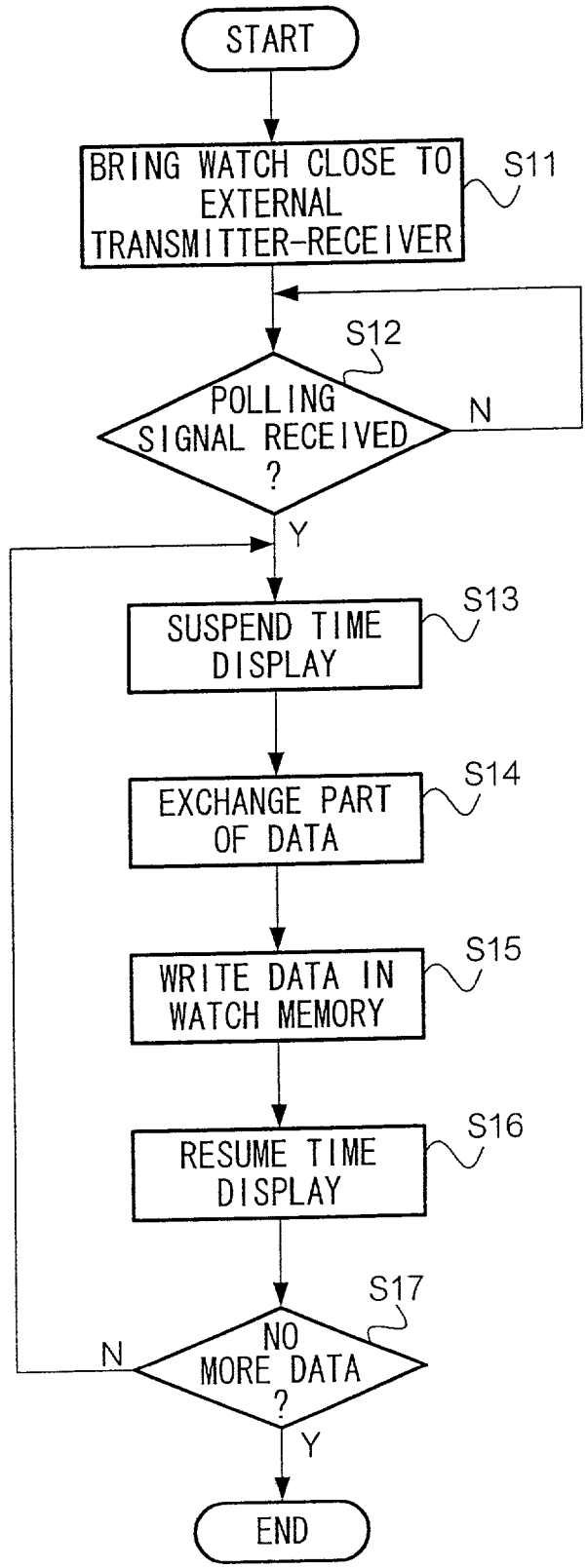
FIG. 24 is a flow chart showing an operation of a modification of the embodiment.

To be more concrete, it is described in the flow chart shown in FIG. 24.

When a user passes through gate G (refer to FIG. 1), the user brings the dial side of the wristwatch-type electronic device 10D close to the loop antenna 97 (refer to FIG. 2) (step S11).

On the other hand, the wristwatch-type electronic device 10D determines whether or not it has received polling signal from the antenna 97 of the external transmitter-receiver 90 (step S12).

In the determination of step S12, when polling signal is not received (step S12; NO), the wristwatch-type electronic device 10D enters a standby state, and time is displayed on the liquid crystal display panel 129A.

Also, in the determination of step S12, when polling signal is received (step S12; YES), the watch control circuit 135 changes control signal S to be output to the driving circuit 129D to level "H", thereby suspending time display (step S13).

Subsequently, a part of data is transmitted and received (step S14). When the transmitting and receiving of a part of the data is completed, the watch control circuit 135 writes in the subject data into a non-volatile memory (not shown) (step S15).

The writing of the data is completed, the watch control circuit 135 again changes the control signal S to level "L" to make the liquid crystal display panel 129A a light state and resumes time display (step S16).

Then, it is determined whether all the data have been received (step S17), and when all the data have been received (step S17; YES), the procedure ends.

On the other hand, in the determination of step S17, when all the data have not been received (step S17; NO), the routine again goes back to step S13 and repeats the same procedure.

In the present modification, although data exchange and time display are alternately repeated, the time during which time display is being suspended by the data exchanges is short. Therefore, a user can perform data communication without being aware of the time display being suspended by data transfer.

[5.4.5] Fifth Modification

In the above description, the operation of the driving circuit for the display unit is suspended when a display operation at the display unit is suspended. However, it is possible to inhibit the input of driving control signal for controlling the driving circuit. Further, the watch control circuit can be configured so as to control through a control program stored in a memory such as RAM and ROM, utilizing a microprocessor unit (MPU). It is also possible to configure in such a way as to inhibit the input of a boosting clock of the boosting circuit of the driving circuit.

[5.4.6] Sixth Modification

In the above description, a description was not given as to the format of a bi-directional radio communication, but any format can be used if a local communication within the range of one to ten meters can be implemented. For example, a communication protocol such as Bluetooth using the radio frequency band of 2.45 GHz can be used.

[5.4.7] Seventh Modification

In the above description, a wristwatch-type electronic device is described for an example of a hand-held radio communication device, but various embodiments can be conceived such as a necklace type and a pendant type that can be put on by a user.

[5.4.8] Eighth Modification

In the above description, it is assumed that control programs for an external transmitter-receiver and a wristwatch-type electronic device are installed in a ROM or a RAM in advance.

However, it is possible to store control programs in a recording medium capable of storing control programs such as optical disks including a semi-conductor memory, CD, CD-R, digital versatile disk (DVD), DVD-Rewritable (DVD-R), DVD-Random Access Memory (DVD-RAM); magneto-optical disks including a magneto-optical (MO) and mini disk (MD); and magnetic disks including a hard disk and flexible disk, to install the control programs in a memory (rewritable ROM or RAM) in the external transmitter-receiver or in the wristwatch-type electronic device through an appropriate drive device so that the MPU controlling the external transmitter-receiver or the wristwatch-type electronic device operates based on the installed control programs.

Further, it is possible to get control programs delivered to the external transmitter-receiver or the wristwatch-type electronic device through a network such as the Internet, a private line (radio or cable), and a public line (radio or cable). In this case, the delivered control programs are installed in a memory (rewritable ROM or RAM) of the external transmitter-receiver or the wristwatch-type electronic device so that the MPU controlling the external transmitter-receiver or the wristwatch-type electronic device operates based on the installed control programs.

[6] Sixth Embodiment

Although a watch with a built-in compact low-profile contactless IC card has been invented, if a user wishes to take advantage of such a watch, it is uneconomical for the user to purchase a new watch in addition to the hitherto used watch the user has been using. Since the old watch is not capable of supporting a contactless IC card function, there has been a problem that the user's own watch becomes no longer useful.

In consideration of the above problems, the present embodiment has an object of providing a radio device for watches which enables the user's presently-owned watch to easily support the contactless IC card function.

[6.1] Overall Configuration

Figure 25:
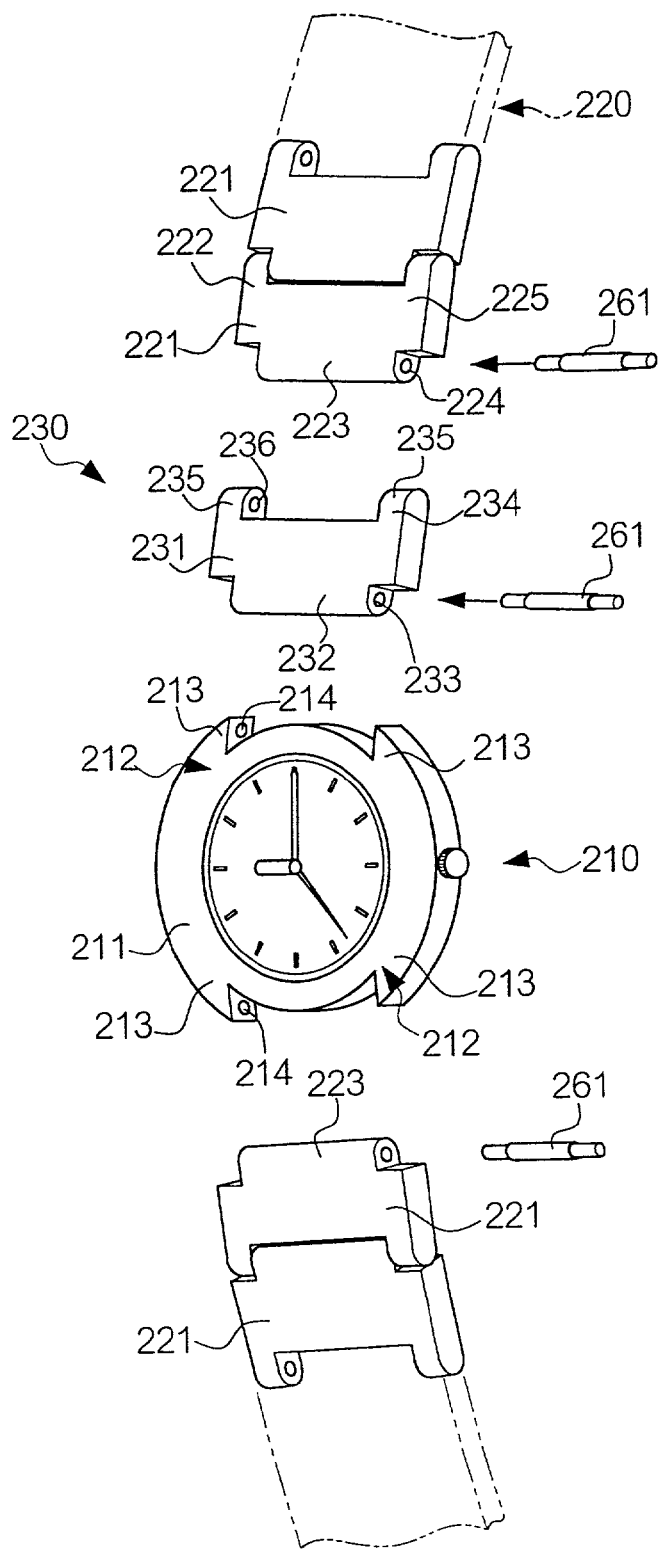
FIG. 25 is an exploded perspective view of a radio device and a watch that are a sixth embodiment of the present invention.

FIG. 25 is an exploded perspective view of a watch 201 with respect to the present embodiment.

The watch 201 comprises a watch body 210, bands 220 that are attached to the both sides of the watch body 210. A radio device for watches (hereinafter will be referred to as radio device 230) is inserted between the twelve-o'clock side (top side) of the watch body 210 and the band 220, thereby composing a part of the watch 201.

The watch body 210 comprises a watch case 211 which contains a watch function (not shown) and a mounting portion 212 that is formed protruded to top and down sides (in the direction of twelve and six o'clock) of the watch case 211. The mounting portion 212 comprises a pair of projecting portions 213 protruded from the watch body 210, and an engaging hole 214 bored at a predetermined position on a mutually-faced surface of each projecting portion 213. The point of a spring bar 261 is engaged to each engaging hole 214.

The band 220 is made by connecting a plurality of links 221 in a chain, each link being made of metal materials. Also, of these links 221, a link 221 close to the watch body 210 comprises a link body 222, a mounting portion 223 protruded on one side of the link body 222 with a penetrating hole 224 through which the spring band 261 is drawn, and a link mounting unit 225 protruded on the other side of the link body 222.

[6.2] Configuration of the Watch Radio Device 230

Next, a configuration of the radio device 230 will be described based on FIG. 25 to FIG. 28.

The radio device 230 is mounted between the watch body 210 and the band 220. The radio device 230 comprises a rectangular casing 231 made of insulating materials (for example, resins materials such as plastics), a body side mounting portion 232 protruded to one side of the casing 231, a band side mounting portion 234 protruded to the other side. Also, the surface of the casing 231 is colored with the same color as the band 220 by means of coating or printing, thereby preventing the aesthetic value of the watch 201 itself from being detracted.

The body side mounting portion 232 has a penetrating hole 233 through which a spring band 261 is drawn, and the band side mounting portion 234 has a pair of projecting portions 235 protruded from the casing 231 and engaging holes 236 bored at a predetermined position on a mutually-faced surface of each projecting portion 235.

The body side mounting portion 232 of the radio device 230 is attached to the mounting portion 212 of the watch body 210 by a spring bar 261, and the band side mounting portion 234 of the radio device 230 is attached to the mounting portion 223 of the band 220 by a spring bar 261. Thus, the radio device 230 can be easily inserted between the watch body 210 and the band 220 by a user, thereby enabling to add the contactless IC card function to a user's own watch.

Figure 26:
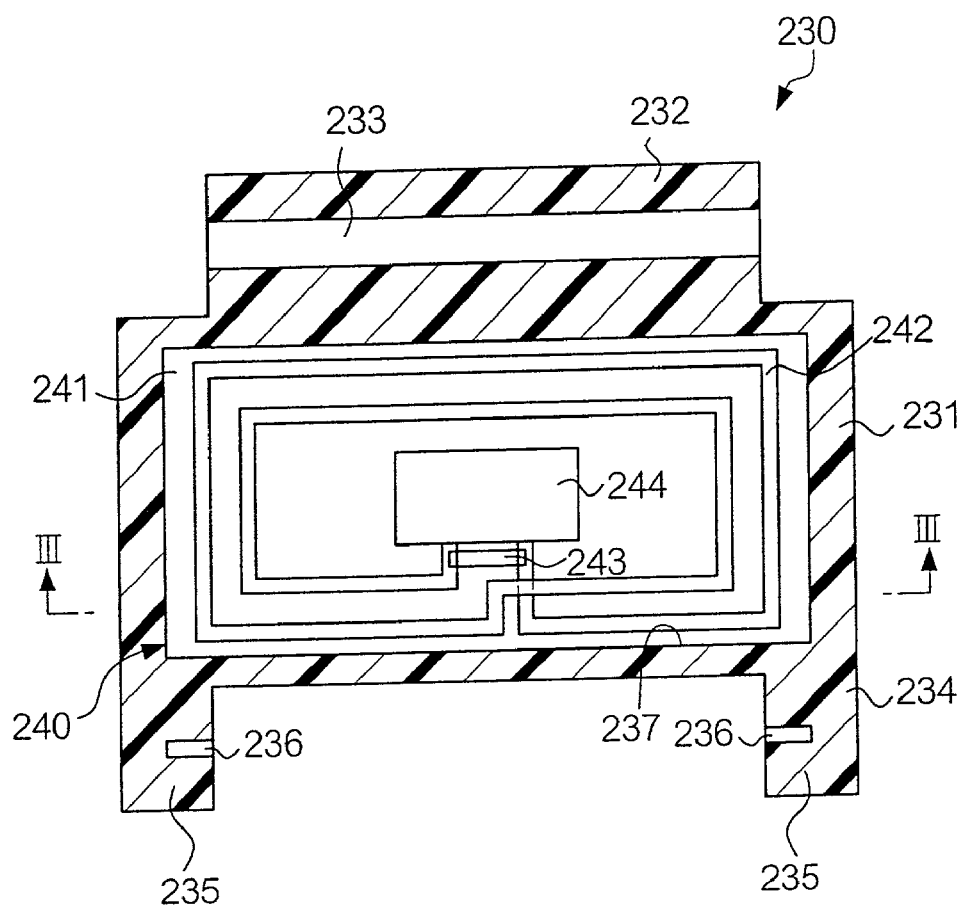
FIG. 26 is a section view showing a configuration of the radio device.
Figure 27:
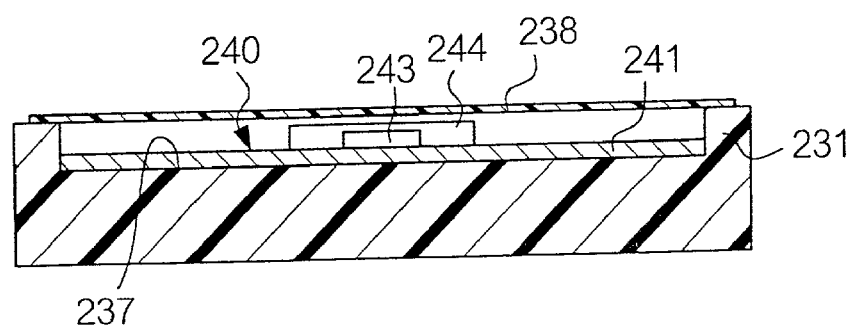
FIG. 27 is a section along the line III–III' of FIG. 26.

Also, as shown in FIG. 26 and FIG. 27, there is provided an accommodating room 237 for accommodating a contactless IC card 240 (as will be described hereinafter) in the casing 231, and an opening of the accommodating room 237 is covered by a cover 238.

Figure 28:
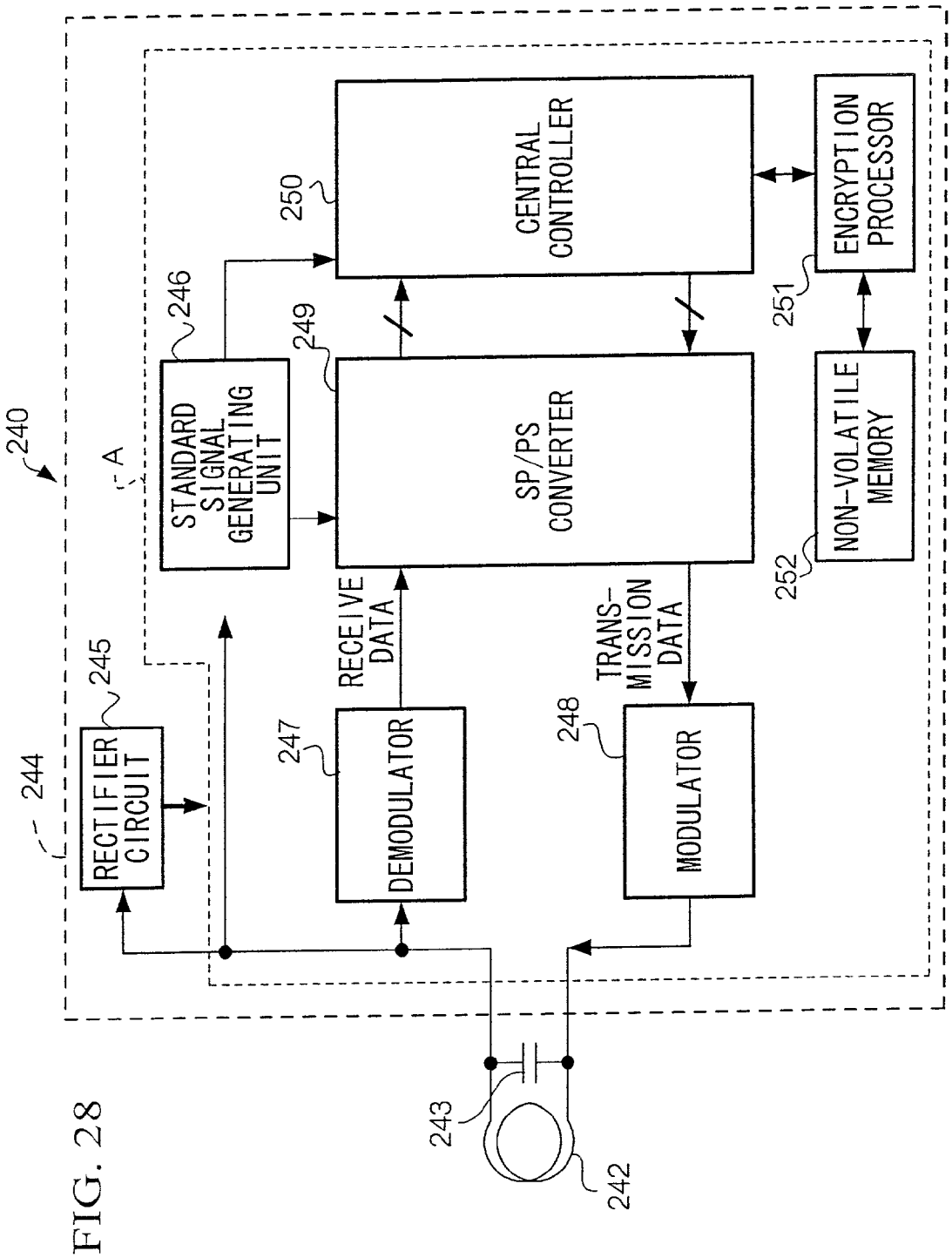
FIG. 28 is a block diagram showing a configuration of a contactless IC card according to the embodiment.

FIG. 28 is a block diagram showing an electric configuration of the contactless IC card 240.

The contact IC card 240 comprises a film board 241, a double winding loop antenna 242 made by pasting copper foil thereon; a tuning capacitor 243, and an IC chip 244.

In order to enhance the antenna efficiency of the loop antenna 242, it is preferred to have a larger loop area of the loop antenna 242. The communication quality is enhanced when the IC chip 244 is placed outside the loop antenna 242 if the space allows, thereby extending a communication range between the radio device 230 and an external communication device.

The number of turns for the loop antenna 242 is about several turns when the short-wave frequency band of 13.56 [MHz] is used for communication, and about several tens of turns when the long-wave frequency band of 125 [kHz] or 134 [kHz] is used. Because, for a loop antenna of several tens of turns, it is difficult area-wise to form a loop antenna 242 with a copper pattern on the film board 241, a solenoid loop antenna 242 may be configured by winding a copper wire and the like perpendicular to the diameter of the loop. Further, in cases where the microwave band of 2.45 [GHz] is used as communication frequency, it is possible to form a microstrip antenna on the film board 241.

The IC chip 244 comprises a rectifier circuit 245 for generating driving voltage by rectifying received signal, a standard signal generator 246 for generating standard clock signal from signal, a demodulator 247 for demodulating signal, a modulator 248 (RF unit) for performing modulations, a serial/parallel bi-directional converter 249 (hereinafter referred to as SP/PS converter 249) for performing serial/parallel or parallel/serial conversions between the demodulator 247 and the modulator 248, a central controller 250 for controlling each unit, an encryption processor 251 for encrypting and decrypting data, and a non-volatile memory 252 for storing data.

Further, the standard signal generator 246, the demodulator 247, the modulator 248, the central controller 250, the encryption processor 251, and the non-volatile memory 252 constitute a driving unit A driven by driving power output from the rectifier circuit 245.

The rectifier circuit 245, upon receiving induction field as signal from an external radio device (for example, a contactless automatic ticket gate) through the loop antenna 242 and the tuning capacitor 243, outputs driving power obtained by rectifying the signal to the driving unit A. Further, the rectifier circuit 245 is made of diode, thereby outputting driving power of half-wave or full-wave rectification. This enables a contactless IC card 240 to drive the driving unit A without having a power source.

The standard signal generating unit 246 generates standard clock signal from received signal through the loop antenna 242 and the tuning capacitor 243 and outputs the generated signal to the central controller 250.

The demodulator 247 demodulates received signal through the loop antenna 242 and the tuning capacitor 243, and the SP/PS converter 249 converts the demodulated signal into parallel signal for output to the central controller 250. The modulator 248 modulates transmission data from the central controller 250 that are converted into serial data through the SP/PS converter 249, for supply to the tuning capacitor 243 and the loop antenna 242.

The SP/PS converter 249 is driven based on the standard clock signal output from the standard signal generator 246.

The central controller 250 performs various types of control based on the standard clock signal from the standard signal generator 246 and has a CPU, RAM, and ROM (none of them is shown). The ROM stores control programs for performing various types of control, parameters, and so forth. The central controller 250 exchanges data with a demodulator 247, a modulator 248, and the encryption processor 251.

The encryption processor 251 encrypts non-encrypted data when receiving them, and supplies the encrypted data to the non-volatile memory 252 as well as decrypting data read from the non-volatile memory 252 under the instruction of the central controller 250, f6r supply to the central controller 250.

The non-volatile memory 252 is configured by, for example, EEPROM, and writes decrypted data supplied from the encryption processor 251 as well as reading out stored data under the instruction of the central controller 250.

[6.4] Operation

An operation of the present embodiment will be described hereinafter.

The central controller 250 of the contactless IC card 240 receives a digital (ASK or FSK) modulated polling signal by detecting the magnetic field induced by the loop antenna 242 and the tuning capacitor 243 and reads parallel data from a specified memory address. The parallel data read from the memory are then synchronized to transmitted modulating signal into parallel-serial (PS) conversion, and the converted data are output as serial transmission data. The modulator 248 modulates the transmission data and changes the resonance frequency of a tank circuit comprising the loop antenna 242 and the tuning capacitor 243, thereby transmitting the transmission data to an external radio device.

On the other hand, the contactless IC card 240 needs no battery because all necessary power is supplied from an external radio device and also because non-volatile memories such as EEPROM and ferroelectric memories are used for a data memory.

[6.4] Intended Uses of the Present Embodiment

The present embodiment enables a user to use the radio device 230 of the watch 201 worn on the arm, for example, as a train ticket, which eliminates the need for the user to be bothered taking out a train ticket.

Additionally, in the present embodiment, the radio device 230 is positioned on the twelve-o'clock side of the watch body 210, which means that the radio device would be closer to the antenna of an external transmitter-receiver of the automatic ticket gate than being mounted on the six-o'clock side of the watch body 210. Thus, it becomes possible to ensure reliable implementation of radio communication between the external transmitter-receiver and the radio device 230. Also, in bringing the watch close to the antenna, the reliable implementation will be further ensured by an easy action of holding the watch 201 up over the antenna of the external transmitter-receiver.

It is also possible to utilize the watch 201 with the radio device 230 as a prepaid card. It is assumed in this case that information on remaining value of the prepaid card and the like are stored in the non-volatile memory 252 in advance and that an external communication device is provided at the cashier of shops.

When a user purchases a product in a shop, a salesperson at the cashier enters the amount of purchase for the product, and data exchanges are performed between the non-volatile memory 252 of the radio device 230 and the cashier communication device when the user brings the watch 201 close to the communication device.

This radio communication transmits the information on the remaining value to the cashier communication device, and a receipt is issued from the cashier. On the other hand, the amount of purchase for the product is written into the non-volatile memory 252 of the radio device 230. As a result, the remaining value changes to an amount obtained by deducting the amount of purchase.

Thus, a user does not need to take out money or a prepaid card out of a wallet in purchasing a product and makes a payment because the user can use the radio device 230 of the watch 201 on the arm as a prepaid card.

Other uses can be envisioned in various ways as follows:

1) the radio device 230 mounted on the watch 201 can used as a credit card or an electronic money;

2) the use of the radio device 230 mounted on the watch 201 is not restricted to a train ticket but as a lift pass for the ski lift, an admission and ride tickets of amusement parks, an admission pass for movie theaters, and various admission tickets or ride tickets; and 3) further, the radio device 230 mounted on the watch 201 is not restricted to the above mentioned uses but can be used for various purposes to which a contactless IC card can be applied such as telephone cards, library cards, medical records, and the like.

[6.5] Actions and Effects of the Embodiment

As shown in FIG. 25, the radio device 230 of the present embodiment can be connected easily by a user between the watch body 210 and the band 220, thereby providing a contactless IC card function easily with a hitherto used watch.

As a result, the user can continue using the hitherto used watch to add the contactless IC card function to the watch without unwillingly spending money for a new watch.

Further, the surface of the radio device 230 is colored with the same color as the band 220, thereby using the watch without loss of aesthetic value of the watch 201 itself.

Also, even in the case of purchasing a new watch, the hitherto used radio device 230 can be easily used to the new watch, and the IC card function can be kept using.

[7] Seventh Embodiment

[7.1] Overall Configuration

Figure 29:
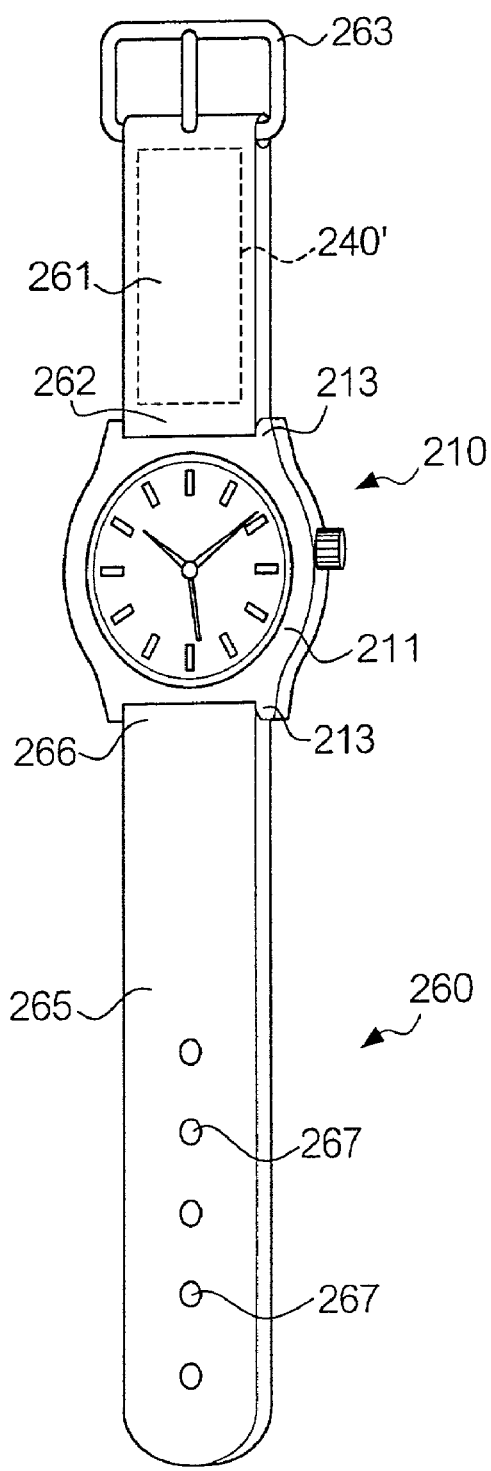
FIG. 29 is an outside drawing showing a watch which is a seventh embodiment of the present invention.
Figure 30:
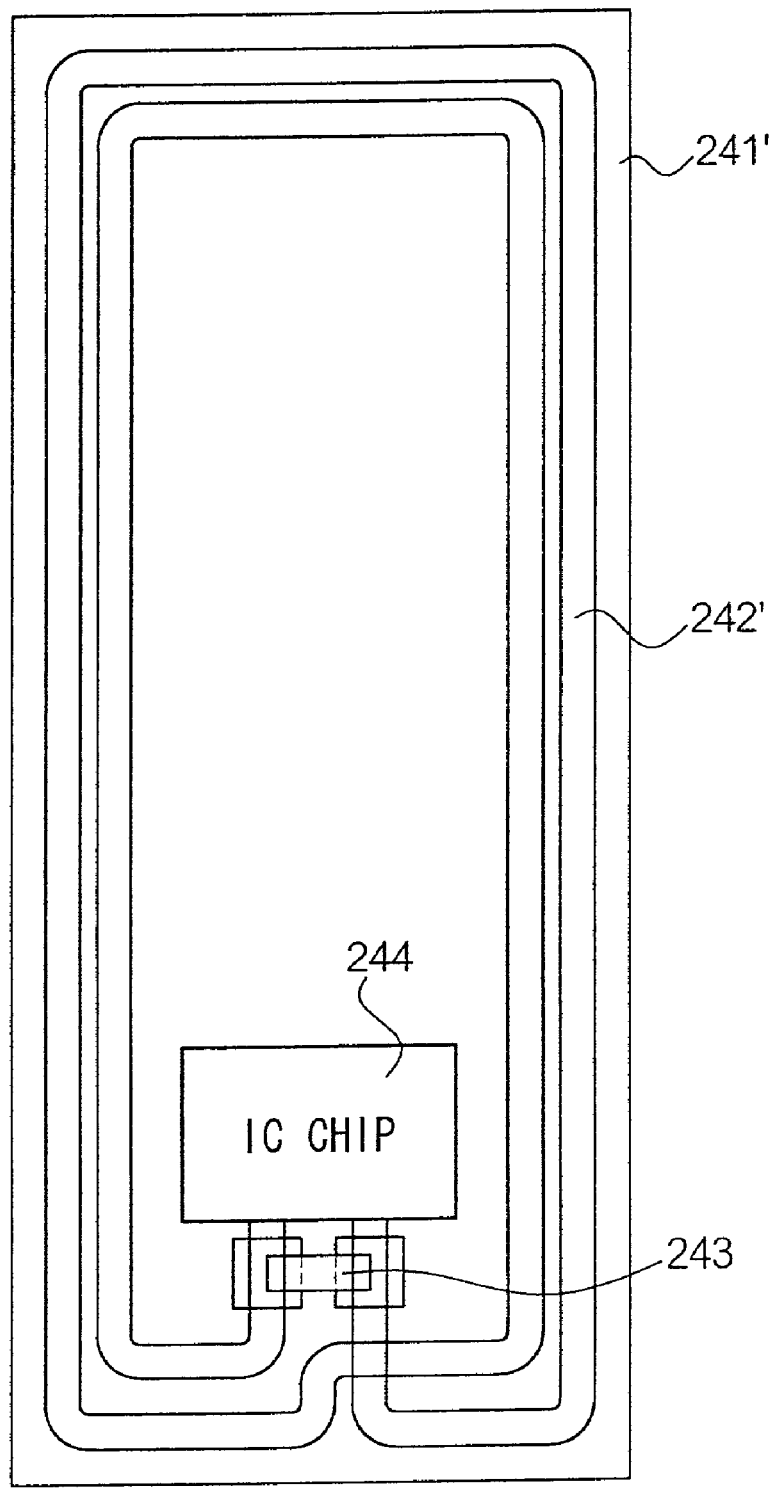
FIG. 30 is a diagram showing a configuration of a contactless IC card according to the embodiment.

Next, a seventh embodiment with respect to the present invention will be described based on FIG. 29 and FIG. 30. The characteristics of the present embodiment lies in that a band is formed of a pair of strap bands and that a contactless IC card is provided inside one of the strap bands. In the present embodiment, components identical with the above-mentioned components are given the same reference numerals, and the description thereof will be omitted.

A watch with respect to the present embodiment comprises a watch body 210 and a band 260 having strap bands 261 and 265.

The strap bands 261 and 265 are made of leather materials or plastics such as urethane and silicon. One of the strap bands 261 has a body mounting portion 262 on one end and a buckle 263 on the other end. The other strap band 265 has a body mounting portion 266 on one end, and punch holes 267 are perforated from the middle portion of its length to the other end. The band 260 is attached to the watch body by fixing each body mounting portion 262 or 266 to each band mounting portion 213 of the watch body 210 by a spring bar 261, thus forming a watch.

A user engages the pin of the buckle 263 of the band 260 with one of the punch holes 267, with the watch wrapped around the arm, thus wearing the watch on the arm.

In the present embodiment, a contactless IC card 240' is provided within the strap band 261. As shown in FIG. 30, the contactless IC card 240' comprises a rectangular film board 241', a double winding loop antenna 242' formed by pasting copper foil on the film board 241', a tuning capacitor 243, and an IC chip 244. The configuration of the IC chip 244 is identical with that of the sixth embodiment; therefore, the description thereof will be omitted. The contactless IC card 240' can be fixed to the strap band 261 by sandwiching the card 240' in leathers if the strap band is made of two-ply leather stitched together. If the band is made of one-play leather, it is possible to paste the card by adhesives and the like or to cover the surface.

[7.2] Effects of the Present Embodiment

The present embodiment enables a user to add a contactless IC card function to the hitherto watch without purchasing a new watch and by replacing the band of the watch to a band in which a contactless IC card 240' is contained.

[8] Modifications of the Sixth or Seventh Embodiment

[8.1] First Modification

In the above sixth embodiment, the outside shape of the radio device 230 is made to the shape of a link, and in the seventh embodiment, a contactless IC card 240' is provided in a strap band 261. However, the present invention is not restricted thereto, but can employ embodiments such as below.

Figure 31:
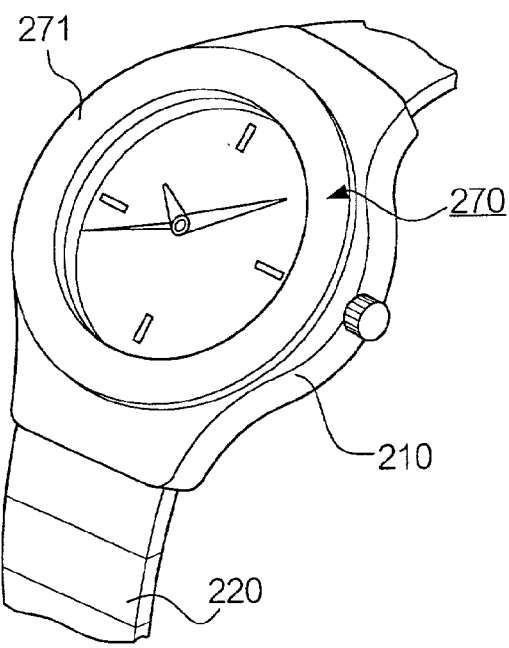
FIG. 31 is a perspective view showing main components of a watch which is a modification of the embodiment.

1) As shown in FIG. 31, the radio device 270 may be formed of a detachable ring-shaped casing 271 that can be attached to the outer rim of the glass portion of the watch body 210; and a contactless IC card provided on the ring-shaped casing 271. In this case, it is possible to add a contactless IC card function to the hitherto owned watch by changing the bezel to the ring-shaped casing 271.

2) A part of a protector for protecting the glass of the watch body can be made to a casing, in which a contactless IC card can be provided.

Figure 32:
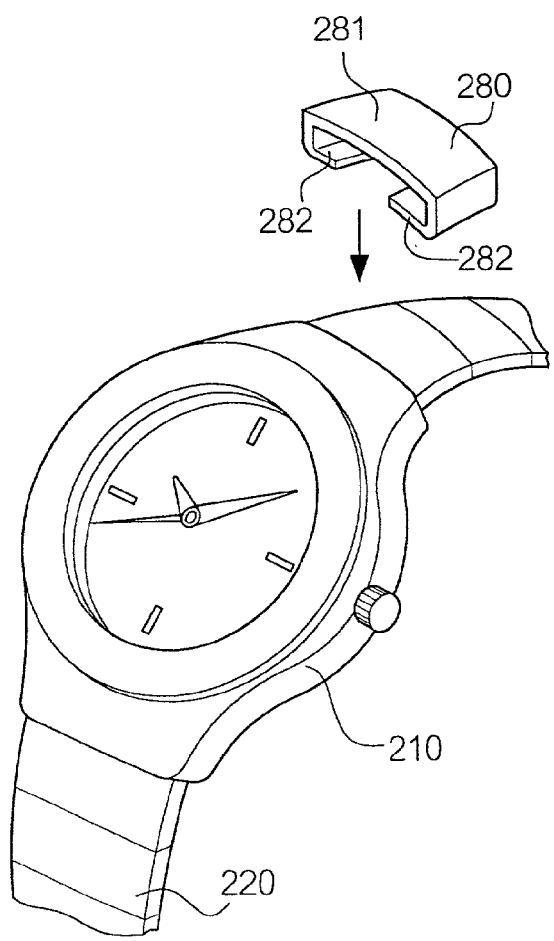
FIG. 32 is a perspective view showing main components of a watch which is another modification of the embodiment.

3) It is possible to attach a radio device to the band. As shown in FIG. 32, the radio device 280 is formed of a casing 281 having two engaging lugs 282 engaged by being bent in the direction of the band 220 to both sides and a contactless IC card provided inside the casing 281.

Alternatively, the casing can be attached to the band by providing a hole on the casing to draw the band therethrough.

4) A contactless IC card can be pasted to the band, or on the glass surface of the watch body 210. In the case of pasting on the glass surface, it is possible to make a film board of transparent materials to be pasted so as not to hinder the time display.

In the above 1) to 3) modifications, it is preferable that the casing is made of non-conductive materials because the casing contains a contactless IC including an antenna.

[8.2] Second Modification

In each of the above embodiments, it has been described that no battery is provided in contactless IC cards, but a battery may be provided.

[8.3] Third Modification

In each of the above embodiments, the case of mounting one radio device on a watch has been described. The present invention is not restricted thereto, but it is possible to provide both a radio device used for a ride ticket and another radio device used as a credit card can be mounted to a single watch. In this case, a user can ride on vehicles and purchase products by performing radio communications between the radio devices of the watch and an external communication device without taking in and out money.

[8.4] Fourth Modification

The above radio device can be mounted not only to watches but to other items.

The invention claimed is:

1. A hand-held electronic device comprising:
    a contactless communication unit for performing contactless data communication with an external transmitter-receiver, wherein said contactless data communication unit (i) comprises a memory and a voltage power generating circuit for generating voltage power from a signal received from said external transmitter-receiver to supply the generated voltage power to a circuit in said contactless communication unit including said memory, (ii) receives data through contactless communication utilizing voltage power generated by said voltage power generating circuit, and (iii) writes in said memory data acquired by the contactless data communication or updates data in said memory with data acquired by the contactless data communication;
    a power source;
    a switch provided between said power source and said contactless communication unit;
    a display unit;
    an information processing unit which operates on power provided from said power source, for receiving data from said memory of said contactless communication unit to display the data on said display unit or process the data and then display the processed data on said display unit;
    a carrier detecting unit for detecting a carrier transmitted from said external transmitter-receiver; and
    a power supply controlling unit for bringing said switch into an on state, in response to a signal from said carrier detecting unit indicating that a carrier is no longer being input to said hand-held electronic device, so as to trigger a power supply from said power source to said contactless communication unit.

2. A hand-held electronic device as claimed in claim 1, wherein said switch is a transistor.

3. A hand-held electronic device as claimed in claim 1, wherein said contactless communication unit includes an antenna and a high-frequency circuit connected thereto.

4. A hand-held electronic device as claimed in claim 1, wherein said contactless communication unit has a clock generating unit for generating a clock from a carrier received from said external transmitter-receiver and receives data from said external transmitter-receiver by the clock.

5. A hand-held electronic device as claimed in claim 1, wherein said voltage power generating circuit includes a rectifier circuit for rectifying the signal received from said external transmitter-receiver to generate said voltage power.

6. A hand-held electronic device as claimed in claim 1, wherein, during a period of time in which the carrier is detected by said carrier detecting unit, said contactless communication unit performs contactless data communication with said external transmitter-receiver, and during a period of time in which the carrier is not detected by said carrier detecting unit, said information processing unit receives data from said contactless communication unit.

7. A hand-held electronic device as claimed in claim 1, wherein said carrier detecting unit operates on power from said power source.

8. A hand-held electronic device as claimed in claim 1, wherein, during a period of time in which the carrier is detected by said carrier detecting unit, said contactless communication unit receives data through the contactless data communication utilizing voltage power generated by said voltage power generating circuit, and writes into said memory data acquired by said contactless data communication or updates data in said memory through the contactless data communication; and
    wherein, during a period of time in which the carrier is not detected by said carrier detecting unit, said contactless communication unit utilizes power from said battery, reads the data from said memory to transmit the data to said information processing unit.

9. A hand-held electronic device as claimed in claim 8, further comprising a clock generating unit for generating a clock for timing control of said contactless communication unit during a period of time that the carrier is not detected by said carrier detecting unit.

10. A hand-held electronic device as claimed in claim 8, wherein, when a carrier detection state changes from a state where the carrier is detected by said carrier detecting unit to a state where the carrier is not detected by said carrier detecting unit, with the change acting as a trigger, data transfer from said contactless communication unit to said information processing unit is initiated.

11. A hand-held electronic device as claimed in claim 1, wherein, according to an operation initiated by an operator, said power supply controlling unit brings said switch to an on state so as to supply power from said power source to said contactless communication unit via said switch and said information processing unit receives data from said contactless communication unit.

12. A hand-held electronic device as claimed in claim 11, wherein said information processing unit, when termination of a display operation is instructed by an operator, terminates the display operation of the received data from said contactless communication unit or the results obtained by processing the data.

13. A hand-held electronic device as claimed in claim 11, wherein said information processing unit terminates the display operation after maintaining the display operation for a predetermined period of time of the received data from said contactless communication unit or the results obtained by processing the data.

14. A hand-held electronic device as claimed in claim 11, wherein said information processing unit displays the received data from said contactless communication unit or the results obtained by processing the data on said display unit and terminates the display operation, and, when the start of a display operation is instructed by an operator thereafter, resumes the terminated display operation.

15. A hand-held electronic device as claimed in claim 1, wherein said information processing unit, when it does not display received data from said contactless communication unit or results obtained by processing the data, displays other information on said display unit.

16. A hand-held electronic device as claimed in claim 15, wherein said information processing unit has a timekeeping unit for performing timekeeping operations to generate time information, and, when the data received from said contactless communication unit or the results obtained by processing the data are not displayed, displays the time information obtained from said timekeeping unit.

17. A hand-held electronic device as claimed in claim 1, further comprising:
a timekeeping unit for performing timekeeping operations to generate time information; and
an analog hand display unit for automatically driving analog hands based on said time information to perform time display operations.

18. A hand-held electronic device as claimed in claim 17, wherein said display unit includes a transparent liquid crystal display element positioned in front of said analog hands, and said analog hands can be viewed through the transparent liquid crystal display element.

19. A hand-held electronic device as claimed in claim 17, wherein said display unit includes a transparent organic electroluminescence light emitting element, and said analog hands can be viewed through the transparent organic electroluminescence light emitting element.

20. A hand-held electronic device as claimed in claim 17, wherein said display unit includes a liquid crystal display element positioned behind said analog hands.

21. A hand-held electronic device as claimed in claim 17, wherein said display unit includes an organic electroluminescence light emitting element positioned behind said analog hands.

22. A hand-held electronic device as claimed in claim 17, wherein said analog hand display unit includes a driving motor which stepwisely drives said analog hands; and
wherein said hand-held electronic device comprises a motor drive prohibiting unit which inhibits supply of a driving signal to said driving motor, during a period of time that said contactless communication unit is performing contactless data communication with said external transmitter-receiver.

23. A hand-held electronic device as claimed in claim 1, further comprising a memory for storing the data received from said contactless communication unit or storing results obtained by processing the data,
wherein said information processing unit, when start of a display operation is instructed by an operator, reads from said memory stored data or results obtained by processing the data and displays on said display unit the stored data or results obtained by processing the data.

24. A hand-held electronic device as claimed in claim 23, wherein said information processing unit, when termination of a display operation is instructed by an operator, terminates the display operation of the stored data or results obtained by processing the data.

25. A hand-held electronic device as claimed in claim 23, wherein said information processing unit terminates the display operation of the stored data or results obtained by processing the data after maintaining the display operation for a predetermined period of time.

26. A hand-held electronic device as claimed in claim 1, further comprising a display prohibiting unit for suspending a display operation of said display unit during a period of time that said contactless communication unit performs contactless data communication with said external transmitter-receiver at the other end.

27. A hand-held electronic device as claimed in 26, wherein said display prohibiting unit detects that a radio communication start signal is received from said external transmitter-receiver by said contactless communication unit, thereby detecting start of said contactless data communication.

28. A hand-held electronic device as claimed in claim 26, further comprising a memory,
wherein said display prohibiting unit resumes the display operation of said display unit when data acquired by said contactless data communication are written into said memory, or when data in said memory is updated through said contactless s data communication.

29. A hand-held electronic device as claimed in claim 26, further comprising a controller for causing said contactless data communication to be divided into multiple timings and performed intermittently,
wherein said display prohibiting unit causes the display operation of said display unit to be suspended when said contactless data communication is initiated or resumed, and the operation to be resumed when said contactless data communication is suspended or terminated.

30. A hand-held electronic device as claimed in claim 26, wherein said display unit comprises a display panel unit for performing display operations and a display driving unit for driving said display panel unit; and
wherein said display prohibiting unit suspends the display operation by suspending the operation of said display driving unit.

31. A hand-held electronic device as claimed in claim 26, wherein said display unit comprises a display panel unit for performing display operations and a display driving unit for driving said display panel unit according to a display control signal; and
wherein said display prohibiting unit suspends the display operation by cutting off supply of said display control signal to said display driving unit.

32. A hand-held electronic device as claimed in claim 26, further comprising:
a lighting unit which is placed at a front or back side of said display unit, for lighting said display unit; and
a light prohibiting unit for prohibiting said lighting unit from performing lighting operations during a period of said contactless data communication.

33. A hand-held electronic device as claimed in claim 1, having a form resembling that of a wristwatch that can be mounted on the arm of a user.

34. A hand-held electronic device as claimed in claim 1, wherein said power source is a battery.

35. A device as claimed in claim 1, wherein:
said power supply controlling unit brings said switch into an on state during a period of time in which the carrier is detected by said carrier detecting unit; and said information processing unit receives data within the period of time in which the carrier is detected by said carrier detecting unit.

36. A device as claimed in claim 1, wherein:
said contactless communication unit further comprises a microprocessor that operates on power from said power source and a level shifter for shifting a level of a signal received from said external transmitter-receiver into another level that is sufficient to be processed by said microprocessor, before transmitting the signal to the microprocessor; and
said information processing unit process data corresponding to the output signal of said level shifter.

37. A hand-held electronic device, comprising:
a contactless communication unit for performing contactless data communication with an external transmitter-receiver;
a display unit for displaying information by digital control;
an information processing unit which receives data obtained through said contactless data communication from said contactless communication unit to display the data or results obtained after processing the data on said display unit; and
a display prohibiting unit for suspending the display operation of said display unit on receipt of a polling signal transmitted from said external transmitter-receiver.

38. A method for controlling a hand-held electronic device comprising a contactless communication unit for performing contactless data communication with an external transmitter-receiver, a power source, a switch provided between said power source and said contactless communication unit, a display unit, an information processing unit which operates on power from said power source, a carrier detecting unit for detecting a carrier transmitted from said external transmitter-receiver, a power supply controlling unit for controlling power supply from said power source to said contactless communication unit, a memory, and a voltage power generating circuit for generating voltage power from a signal received from said external transmitter-receiver, the method comprising the steps of:
causing said contactless communication unit to write, in said memory, data acquired by the contactless data communication or update data in said memory with data acquired by the contactless data communication, wherein said contactless communication unit including said memory obtains power from said voltage power generating circuit at least when receiving data from said external transmitter-receiver;
causing said information processing unit to receive data from said memory of said contactless communication unit, display the data on said display unit or process the data and then display the processed data on said display unit;
causing said carrier detecting unit to detect a carrier transmitted from said external transmitter-receiver; and
causing said power supply controlling unit to bring said switch into an on state, in response to a signal from said carrier detecting unit indicating that a carrier is no longer being input to said hand-held electronic device, so as to trigger a power supply from said power source to said contactless communication unit.

39. A method for controlling a hand-held electronic device comprising a contactless communication unit for performing contactless data communication with an external transmitter-receiver and a display unit, including the step of: suspending a display operation of said display unit on receipt of a polling signal transmitted from said external transmitter-receiver.

40. A computer program product for controlling a hand-held electronic device comprising a contactless communication unit for performing contactless data communication with an external transmitter-receiver, a power source, a switch provided between said power source and said contactless communication unit, a display unit, an information processing unit which operates on power from said power source, a carrier detecting unit for detecting a carrier transmitted from said external transmitter-receiver, a power supply controlling unit for controlling power supply from said power source to said contactless communication unit, a memory, and a voltage power generating circuit for generating voltage power from a signal received from said external transmitter-receiver, the computer program product comprising:
computer readable program means for causing said contactless communication unit to write, in said memory, data acquired by contactless data communication or update data in said memory with data acquired by the contactless data communication, wherein said contactless communication unit including said memory obtains power from said voltage power generating circuit at least when receiving data from said external transmitter-receiver; and
computer readable program means for causing said information processing unit to receive data from said memory of said contactless communication unit, display the data on said display unit or process the data and then display the processed data on said display unit;
computer readable program means for causing said carrier detecting unit to detect a carrier transmitted from said external transmitter-receiver; and
computer readable program means for causing said power supply controlling unit to bring said switch into an on state, in response to a signal from said carrier detecting unit indicating that a carrier is no longer being input to said hand-held electronic device, so as to trigger a power supply from said power source to said contactless communication unit.

41. A computer control program product,
wherein the control program is executed by a hand-held electronic device having a contactless communication unit for performing contactless data communication with an external transmitter-receiver and a display unit,
comprising computer readable program means for causing a computer to suspend a display operation of said display unit on receipt of a polling signal transmitted from said external transmitter-receiver.

42. A recording medium in which control program means for controlling a hand-held electronic device is stored, the hand-held electronic device comprising a contactless communication unit for performing contactless data communication with an external transmitter-receiver, a power source, a switch provided between said power source and said contactless communication unit, a display unit, an information processing unit which operates on power from said power source, a carrier detecting unit for detecting a carrier transmitted from said external transmitter-receiver, a power supply controlling unit for controlling power supply from said power source to said contactless communication unit, a memory, and a voltage power generating circuit for generating voltage power from a signal received from said external transmitter-receiver, the control program means performing the steps of:

causing said contactless communication unit to write, in said memory, data acquired by contactless data communication or update data in said memory with data acquired by the contactless data communication, wherein said contactless communication unit including said memory obtains power from said voltage power generating circuit at least when receiving data from said external transmitter-receiver;

causing said information processing unit to receive data from said memory of said contactless communication unit, display data on said display unit or process the data and then display the processed data on said display unit;

causing said carrier detecting unit to detect a carrier transmitted from said external transmitter-receiver; and causing said power supply controlling unit to bring said switch into an on state, in response to a signal from said carrier detecting unit indicating that a carrier is no longer being input to said hand-held electronic device, so as to trigger a power supply from said power source to said contactless communication unit.

43. A computer readable recording medium in which control program means for controlling a hand-held electronic device is stored, the hand-held electronic device having a contactless communication unit for performing contactless data communication with an external transmitter-receiver, and a display unit, wherein said control program means suspends a display operation of said display unit on receipt of a polling signal transmitted from said external transmitter-receiver.

44. A hand-held electronic device as claimed in claim 1, wherein said carrier detecting unit operates on power from said power source.

45. A hand-held electronic device as claimed in claim 1, wherein said memory is a non-volatile memory.

46. A hand-held electronic device as claimed in claim 1, wherein said power supply controlling unit, when a data signal is transmitted from said contactless communication unit to said external transmitter-receiver, brings said switch into an on state so as to supply power from said power source to said contactless communication unit via said switch.

47. A hand-held electronic device as claimed in claim 35, wherein said power supply controlling unit, when a data signal is transmitted from said contactless communication unit to said external transmitter-receiver, brings said switch into an on state so as to supply power from said power source to said contactless communication unit via said switch.

48. A hand-held electronic device as claimed in claim 35, wherein said contactless communication unit includes an antenna and a high-frequency circuit connected thereto.

49. A hand-held electronic device as claimed in claim 35, wherein said contactless communication unit has a clock generating unit for generating a clock from a carrier received from said external transmitter-receiver and receives data from said external transmitter-receiver by the clock.

50. A hand-held electronic device as claimed in claim 35, wherein said information processing unit, when termination of a display operation is instructed by an operator, terminates the display operation of the received data from said contactless communication unit or the results obtained by processing the data.

51. A hand-held electronic device as claimed in claim 35, wherein said information processing unit terminates a display operation of the received data from said contactless communication unit or the results obtained by processing the data after maintaining the display operation for a predetermined period of time.

52. A hand-held electronic device as claimed in claim 51, wherein, in a case that a display operation of the received data from said contactless communication unit or the results obtained by processing the data is performed when termination of the display operation is instructed by an operator, said information processing unit terminates the display operation.

53. A hand-held electronic device as claimed in claim 35, wherein said information processing unit displays the received data from said contactless communication unit or the results obtained by processing the data on said display unit and terminates the display operation, and, when start of a display operation is instructed by an operator thereafter, resumes the terminated display operation.

54. A hand-held electronic device as claimed in claim 36, wherein said information processing unit, when it does not display received data from said contactless communication unit or results obtained by processing the data, may display other information on said display unit.

55. A hand-held electronic device as claimed in claim 54, wherein said information processing unit has a timekeeping unit for performing timekeeping operations to generate time information, and, when the received data from said contactless communication unit or the results obtained by processing the data are not displayed, displays the time information obtained from said timekeeping unit.

56. A hand-held electronic device as claimed in claim 35, further comprising:

a timekeeping unit for performing timekeeping operations to generate time information; and an analog hand display unit for automatically driving analog hands based on said time information to perform time display operations.

57. A hand-held electronic device as claimed in claim 56, wherein said display unit includes a transparent liquid crystal display element positioned in front of said analog hands, and said analog hands can be viewed through the transparent liquid crystal display element.

58. A hand-held electronic device as claimed in claim 56, wherein said display unit includes a transparent organic electroluminescence light emitting element, and said analog hands can be viewed through the transparent organic electroluminescence light emitting element.

59. A hand-held electronic device as claimed in claim 56, wherein said display unit includes a liquid crystal display element positioned behind said analog hands.

60. A hand-held electronic device as claimed in claim 56, wherein said display unit includes an organic electroluminescence light emitting element positioned behind said analog hands.

61. A hand-held electronic device as claimed in claim 56, wherein said analog hand display unit includes a driving motor which stepwisely drives said analog hands; and wherein said hand-held electronic device comprises a motor drive prohibiting unit which inhibits supply of a driving signal to said driving motor, during a period of time that said contactless communication unit is performing contactless data communication with said external transmitter-receiver.

62. A hand-held electronic device as claimed in claim 35, further comprising a memory for storing the data received from said contactless communication unit or storing results obtained by processing the data,
wherein said information processing unit, when start of a display operation is instructed by an operator, reads from said memory stored data or results obtained by processing the data and displays on said display unit the stored data or results obtained by processing the data.

63. A hand-held electronic device as claimed in claim 62, wherein said information processing unit, when termination of a display operation is instructed by an operator, terminates the display operation of the stored data or results obtained by processing the data.

64. A hand-held electronic device as claimed in claim 62, wherein said information processing unit terminates the display operation after maintaining the display operation for a predetermined period of time of the data received from said contactless communication unit or the results obtained by processing the data.

65. A hand-held electronic device as claimed in claim 35, having a form like that of a wristwatch that can be mounted on the arm of a user.

66. A hand-held electronic device as claimed in claim 35, wherein said power source is a battery.

67. A hand-held electronic device as claimed in claim 36, wherein said contactless communication unit includes an antenna and a high-frequency circuit connected thereto.

68. A hand-held electronic device as claimed in claim 36, wherein said contactless communication unit has a clock generating unit for generating a clock from a carrier received from said external transmitter-receiver and receives data from said external transmitter-receiver by the clock.

69. A hand-held electronic device as claimed in claim 36, further comprising a voltage power generating circuit for generating voltage power from signal received from said external transmitter-receiver,
wherein said contactless communication unit receives power for performing radio communication with an external transmitter-receiver from said voltage power generating circuit.

70. A hand-held electronic device as claimed in claim 69, wherein said voltage power generating circuit includes a rectifier circuit for rectifying a signal received from said external transmitter-receiver to generate said voltage power.

71. A hand-held electronic device as claimed in claim 36, wherein said information processing unit, when termination of a display operation is instructed by an operator, terminates the display operation of the received data from said contactless communication unit or the results obtained by processing the data.

72. A hand-held electronic device as claimed in claim 36, wherein said information processing unit terminates a display operation of the received data from said contactless communication unit or the results obtained by processing the data after maintaining the display operation for a predetermined period of time.

73. A hand-held electronic device as claimed in claim 72, wherein, when termination of a display operation is instructed by an operator, in a case that a the display operation of the data received from said contactless communication unit or the results obtained by processing the data is performed, said information processing unit terminates the display operation.

74. A hand-held electronic device as claimed in claim 36, wherein said information processing unit displays the data received from said contactless communication unit or the results obtained by processing the data on said display unit and terminates the display operation, and, when start of a display operation is instructed by an operator thereafter, resumes the terminated display operation.

75. A hand-held electronic device as claimed in claim 36, wherein said information processing unit, when it does not display data received from said contactless communication unit or results obtained by processing the data, displays other information on said display unit.

76. A hand-held electronic device as claimed in claim 75, wherein said information processing unit has a timekeeping unit for performing timekeeping operations to generate time information, and, when the data received from said contactless communication unit or the results obtained by processing the data are not displayed, displays the time information obtained from said timekeeping unit.

77. A hand-held electronic device as claimed in claim 36, further comprising:
a timekeeping unit for performing timekeeping operations to generate time information; and
an analog hand display unit for automatically driving analog hands based on said time information to perform time display operations.

78. A hand-held electronic device as claimed in claim 77, wherein said display unit includes a transparent liquid crystal display element positioned in front of said analog hands, and said analog hands can be viewed through the transparent liquid crystal display element.

79. A hand-held electronic device as claimed in claim 77, wherein said display unit includes a transparent organic electroluminescence light emitting element, and said analog hands can be viewed through the transparent organic electroluminescence light emitting element.

80. A hand-held electronic device as claimed in claim 77, wherein said display unit includes a liquid crystal display element positioned behind said analog hands.

81. A hand-held electronic device as claimed in claim 77, wherein said display unit includes an organic electroluminescence light emitting element positioned behind said analog hands.

82. A hand-held electronic device as claimed in claim 77, wherein said analog hand display unit includes a driving motor which stepwisely drives said analog hands; and
wherein said hand-held electronic device comprises a motor drive prohibiting unit which inhibits supply of a driving signal to said driving motor, during a period of time that said contactless communication unit is performing contactless data communication with said external transmitter-receiver.

83. A hand-held electronic device as claimed in claim 36, further comprising a memory for storing the data received from said contactless communication unit or storing results obtained by processing the data,
wherein said information processing unit, when start of a display operation is instructed by an operator, reads from said memory stored data or results obtained by processing the data and displays on said display unit the stored data or results obtained by processing the data.

84. A hand-held electronic device as claimed in claim 83, wherein said information processing unit, when termination of the display operation is instructed by an operator, terminates the display operation of the stored data or results obtained by processing the data.

85. A hand-held electronic device as claimed in claim 83, wherein said information processing unit terminates the display operation of the data received from said contactless communication unit or the results obtained by processing the data after maintaining the display operation for a predetermined period of time.

86. A hand-held electronic device as claimed in claim 36, further comprising a display prohibiting unit for suspending a display operation of said display unit during a period of time that said contactless communication unit performs contactless data communication with said external transmitter-receiver.

87. A hand-held electronic device as claimed in 86, wherein said display prohibiting unit detects that radio communication start signal is received from said external transmitter-receiver by said contactless communication unit, thereby detecting the start of said contactless data communication.

88. A hand-held electronic device as claimed in claim 36, having a form like that of a wristwatch that can be mounted on the arm of a user.

89. A hand-held electronic device as claimed in claim 36, wherein said power source is a battery.

90. A hand-held electronic device as claimed in claim 37, wherein said display prohibiting unit detects that a radio communication start signal is received from said external transmitter-receiver by said contactless communication unit, thereby detecting start of said contactless data communication.

91. A hand-held electronic device as claimed in claim 37, further comprising a memory, wherein said display prohibiting unit resumes the display operation of said display unit when data acquired by said contactless data communication are written into said memory, or when data in said memory is updated through said contactless s data communication.

92. A hand-held electronic device as claimed in claim 37, comprising a controller for causing the contactless data communication to be divided into multiple timings and performed intermittently, wherein said display prohibiting unit causes a display operation of said display unit to be suspended when the contactless data communication is initiated or resumed, and the operation to be resumed when said contactless data communication is suspended or terminated.

93. A hand-held electronic device as claimed in claim 37, wherein said display unit comprises a display panel unit for performing display operations and a display driving unit for driving said display panel unit; and wherein said display prohibiting unit suspends a display operation by suspending the operation of said display driving unit.

94. A hand-held electronic device as claimed in claim 37, wherein said display unit comprises a display panel unit for performing display operations and a display driving unit for driving said display panel unit according to a display control signal; and wherein said display prohibiting unit suspends a display operation by cutting off supply of said display control signal to said display driving unit.

95. A hand-held electronic device as claimed in claim 94, wherein said hand-held electronic device further comprises a circuit board, and said contactless communication unit comprises an antenna, and both of said display panel unit and said antenna are provided on one of the two sides of said circuit board.

96. A hand-held electronic device as claimed in claim 37, further comprising:
a lighting unit which is placed at a front or back side of said display unit, for lighting said display unit; and
a light prohibiting unit for prohibiting said lighting unit from performing lighting operations during a period of the contactless data communication.

97. A hand-held electronic device as claimed in claim 96, wherein said lighting unit has a electroluminescence lighting device.

* * * * *

UNITED STATES PATENT AND TRADEMARK OFFICE
CERTIFICATE OF CORRECTION

PATENT NO. : 7,181,179 B1 Page 1 of 1
APPLICATION NO. : 10/048441
DATED : February 20, 2007
INVENTOR(S) : Teruhiko Fujisawa et al.

It is certified that error appears in the above-identified patent and that said Letters Patent is hereby corrected as shown below:

Title page, Item [30], Foreign Application Priority Data, please add:

--June 19, 2000 (JP) 2000-183674--

--March 23, 2001 (JP) 2001-086141--

Column 45, line 42, please change "through said contactless s data" to

--through said contactless data--

Signed and Sealed this

Twenty-sixth Day of June, 2007

JON W. DUDAS
*Director of the United States Patent and Trademark Office*